(12) United States Patent
Ajioka

(10) Patent No.: US 7,396,168 B2
(45) Date of Patent: Jul. 8, 2008

(54) ROTATION SYSTEM WITH THREE DEGREES OF FREEDOM AND APPLICATION OF THE SAME

(75) Inventor: Yoshiaki Ajioka, Gamagori (JP)

(73) Assignee: Ecchandes Inc., Gamagori-shi (JP)

(*) Notice: Subject to any disclaimer, the term of this patent is extended or adjusted under 35 U.S.C. 154(b) by 554 days.

(21) Appl. No.: 10/522,306

(22) PCT Filed: Jul. 16, 2003

(86) PCT No.: PCT/JP03/09058

§ 371 (c)(1),
(2), (4) Date: Jan. 25, 2005

(87) PCT Pub. No.: WO2004/011824

PCT Pub. Date: Feb. 5, 2004

(65) Prior Publication Data
US 2006/0050173 A1  Mar. 9, 2006

(30) Foreign Application Priority Data

Jul. 25, 2002 (JP) .............................. 2002-216381
Aug. 1, 2002 (JP) .............................. 2002-224487
Aug. 30, 2002 (JP) .............................. 2002-252960

(51) Int. Cl.
G03B 17/00 (2006.01)
H04N 5/225 (2006.01)
(52) U.S. Cl. .................. 396/428; 396/419; 348/373
(58) Field of Classification Search .................. 396/12, 396/419, 427, 428; 348/373
See application file for complete search history.

(56) References Cited

U.S. PATENT DOCUMENTS 5,319,577 A  6/1994  Lee

FOREIGN PATENT DOCUMENTS

| JP | 61-228158 | 10/1986 |
| JP | 62-228392 | 10/1987 |
| JP | 9-133165 | 6/1997 |
| JP | 2001-82913 | 3/2001 |

OTHER PUBLICATIONS

Dynamic Modelling and Control of a Ball-joint-Like Variable-Reluctance Spherical Motor Journal of Dynamic Systems, Measurements, and Control Mar. 1996, vol. 118, pp. 29-40.
Basic Consideration of Actuators with Multi Degrees of Freedom Having an Identical Center of Rotation Tomoaki Yano Makoto Kaneko vol. 11 No. 6, pp. 875-882, 1993.

Primary Examiner—Rodney E Fuller
(74) Attorney, Agent, or Firm—Antonelli, Terry, Stout & Kraus, LLP.

(57) ABSTRACT

A first guide rail (11), and a second guide rail (12) and a third guide rail (13) that are parallel to each other are installed on a base (2) so as to be perpendicular to each other, and these guide rails are rotated about shafts (4) installed on both ends. When the guide rails are rotated, an indication bar (3) installed on a rotor (1) is moved synchronously with the movement of the guide rails, so that the rotor (1) is also rotated. A slider (22) installed on the indication bar (3) slides along a slit (21) of the third guide rail (13). Then a rotation angle of the rotor (1) about the indication bar (3) is determined by the distance between the guide rails.

22 Claims, 40 Drawing Sheets

1

ROTATION SYSTEM WITH THREE DEGREES OF FREEDOM AND APPLICATION OF THE SAME

This application is a National Stage Application, filed under 35 USC 371, of International (PCT) Application No. PCT/JP03/09058, filed Jul. 16, 2003.

FIELD OF THE INVENTION

The present invention relates to a rotation system with three degrees of freedom, using at least three guide rails, wherein one of the guide rails and two other guide rails are installed on a base so as to be orthogonal to each other, an indication bar is installed on a rotor, and at least one slider is installed on the indication bar, which detect a direction of the rotor by rotating the guide rails, sliding along the guide rails, and rotate the rotor by rotating the guide rails by actuators.

BACKGROUND OF THE INVENTION

Many motors with three degrees of freedom like ones using a piezoelectric element (refer to Published Unexamined Japanese Patent Application No. S62-228392, Published Unexamined Japanese Patent Application No. H09-34409, Published Unexamined Japanese Patent Application No. H09-219980, Published Unexamined Japanese Patent Application No. H11-18459 and PCT Publication Number WO 02/15358), ones using a synchronous motor (refer to Tomoaki Yano, Makoto Kaneko, "Basic Consideration of Actuators with Multi Degrees of Freedom Having an Identical Center of Rotation", Journal of Robotics Society of Japan, Vol. 11, No. 6, pp. 875-882, 1993), ones using a stepping motor (refer to Tomoaki Yano, Takeo Suzuki, Masuo Sonoda, Makoto Kaneko, "An Actuator with Three Degrees of Freedom Having an Identical Center of Rotation (4th Report) Development of a Stepping Motor and its Basic Experiments", Proceedings of Robotics and Mechatronics, No. E307, pp. 1210-1211, The Japan Society of Mechanical Engineers, 1994), and ones using an electromagnet (refer to Published Unexamined Japanese Patent Application No. S62-221856, Published Unexamined Japanese Patent Application No. H05-64417 and Published Unexamined Japanese Patent Application No. H09-168275) have been developed. In a case of detecting angles of three rotation axes by using three encoders, however, it is necessary for at least one encoder to be rotated together with a motor. Therefore, not only they must make their structure more complex, but also they must make torque of their motor more bigger than a desired amount. Moreover, they can decide a precise position in a case of using some stepping motors. However, even though they do not use the encoders, they have to rotate at least one stepping motor centering around at least one rotation axis. Therefore, as a position detection method for transfer organization with multi degrees of freedom, one using an acceleration detector (refer to Published Unexamined Japanese Patent Application No. H05-64417 and Published Unexamined Japanese Patent Application No. H09-168275), one using an electromagnet (refer to Tomoaki Yano, Makoto Kaneko, "An Actuator with Multi Degrees of Freedom Having an Identical Center of Rotation (6th Report) Position Control of the Multi-Pole Synchronous Motor", 12th meeting of Robotic Society, No. 1354, pp. 193-194, 1994), and so on have also been developed. However, there are the following problems about these methods: For example, in a case of using an acceleration detector, their accuracy of a position becomes worse as time goes by because of accumulation of errors even though their structure is simple and can detect for all of three degrees of freedom without limit. In addition, in a case of using an electromagnet, weight of a device itself becomes heavy, a part detecting a line of magnetic force is desired, and the line of magnetic force has a bad influence on some electronic parts.

For applications of a motor with multi degrees of freedom, now, we can consider many cases that it has only to rotate freely within a specific range, for example, like a moving camera and a back mirror, besides a case of rotating endlessly around three rotation axes. Here, rotation with three degrees of freedom can be realized by using a spherical surface bearing if it is not necessary to drive like a motor (for example, refer to Published Unexamined Japanese Patent Application No. H07-317758, Published Unexamined Japanese Patent Application No. H09-166135 and Published Unexamined Japanese Patent Application No. 2000-304039). Therefore, it can detect rotation angles up to 180 degrees around two rotation axes, by installing an indication bar on a rotor of the spherical surface bearing, moreover by rotating two orthogonal guide rails by using the indication bar. This method, however, can not only detect an inclination angle of the rotor rotating centering around the indication bar, but also stop rotation of the rotor centering around the indication bar. Suppose then that a new guide rail is installed as it becomes parallel for either one of two guide rails. In this case, if a slider installed on the indication bar moves parallel along to the new guide rail, the guide rail can always keep inclination of the rotor constantly, without almost making an action range of two rotation axes narrow. In addition, for some applications like a moving camera and a back mirror, it is seldom necessary to rotate the rotor 360 degrees, centering around the indication bar. Therefore, if inclination of the rotor can be fine-tuned, a motor with multi degrees of freedom is practical enough. If the slider can slide along one of two guide rails which are parallel even though a gap between these guide rails varies, these guide rails can detect inclination of the rotor up to 180 degrees.

Considering these facts, since a guide rail and two guide rails which are parallel are combined so as to be orthogonal with each other, the number of rotation axes of these guide rails is two, where three encoders are desired to detect each rotation angle of the guide rails. In short, since it is not necessary for these encoders to move according to rotation of a rotor, the rotor comes to be able to detect rotation angles of three rotation axes easily. Of course, the rotor comes to be able to rotate independently around three rotation axes, by rotating these guide rails by actuators.

In the present invention described in claims, a rotation system with three degrees of freedom is developed, where one guide rail and two guide rails which are parallel are combined so as to be orthogonal, moreover some encoders installed on a base detect rotation angles of these guide rails. In addition, in the present invention described in claims, a rotation system with three degrees of freedom, which rotates these guide rails by using actuators installed on a base, is also developed.

SUMMARY OF THE INVENTION

The first invention described herein is a rotation system with three degrees of freedom comprising a rotor comprising a part or a whole of a sphere, an indication bar, at least one slider, at least one base, four shafts, six bearings, and three first to third guide rails, wherein said rotor includes said indication bar, said first guide rail is installed on said base by using two said shafts and two said bearings, said second guide rail and said third guide rail are installed on said base by using two remaining said shafts and four remaining said bearings, and at least one said slider is installed on or concatenated with said indication bar, moreover wherein said rotor rotates centering around two said shafts supporting said first guide rail, sliding said indication bar along said first guide rail, said rotor rotates centering around two said shafts supporting said first guide rail, sliding said indication bar along said second guide rail, and said rotor rotates centering around said indication bar, sliding at least one said slider along said third guide rail.

The present invention is an enforcement form of a rotation system with three degrees of freedom, said rotor of which rotates with three degrees of freedom. In the present invention, said first guide rail, said second guide rail and said third guide rail are formed in a shape of an arc, centering around said rotor mainly. Said rotor rotates according to rotation of these said guide rails, while these said guide rails rotate according to rotation of this said rotor. Each of these said guide rails may be in a shape of a bar, or may have a slit. In particular, in a case that each of these said guide rails has this said slit, this said guide rail may be cut out from a plate, or may be constructed by combining with at least two wires. Said indication bar is installed on said rotor in a direction passing through a center of this said rotor on an extension line of this said indication bar. Here, this said indication bar may be in a shape of a pipe. Moreover, this said rotor may be hollow. Four said shafts may be fixed to any of said first guide rail, said second guide rail, said third guide rail and at least one said base. Moreover, in a case that these said shafts are fixed to said bases, these said shafts may be installed on these said bases via spacers. Note that two rotation axes connecting to two pairs of said shafts are orthogonal, and pass through a center of this said rotor, respectively. A ball bearing also can be used for said bearing. Since said first guide rail rotates centering around two said shafts, a direction of said indication bar coincides with a direction of this said guide rail. Therefore, said rotor rotates centering around these said shafts according to said direction of this said guide rail. Said second guide rail and said third guide rail rotate centering around the same two said shafts, respectively. However, since two said bearings are installed on each of these said shafts, these said guide rails can rotate independently, respectively. Moreover, here, these guide rails may be in a shape of a nest or may be alternative. In addition, both terminals of said third guide rail are formed as a part in a shape of an arc of this said guide rail and said base become orthogonal. Therefore, in a case that this said guide rail makes a specific angle centering around a rotation axis passing through these said shafts, a gap of this said guide rail and said second guide rail keeps constant in spite of a place. At least one said slider slides along said third guide rail. Therefore, when said gap of these guide rails becomes big, an angle made by a line, which passes through this said slider and said indication bar, and these said guide rails approaches to 90 degrees. Oppositely, when said gap of these guide rails becomes small, an angle made by this said line and these said guide rails approaches to 0 degree. By varying said gap of these guide rails, thus, a rotation angle of said rotor centering around an indication bar can be changed. Since said rotor can be rotated with three degrees of freedom without moving all said bases, in the present invention, many problems on a rotation system with three degrees of freedom are solved very well.

The second invention described herein is a rotation system with three degrees of freedom according to the first invention, wherein said indication bar passes through slits, which are opened in at least one of said first guide rail and a second guide rail. Said first guide rail and said second guide rail may be cut out from a plate, respectively, or may be constructed by combining at least two wires. Said first guide rail rotates centering around two said shafts. Therefore, since said indication bar passes through said slit opened in this guide rail, a direction of this said indication bar coincides with a direction of this said guide rail. Said second guide rail rotates centering around two remaining said shafts. Therefore, since this said indication bar passes through said slit opened in this guide rail, a direction of this said indication bar coincides with a direction of this said guide rail. By detecting a direction of these guide rails, thus, a direction of this said indication bar is derived precisely. Since a direction of said indication bar can be decided without spending time and effort too much, in the present invention, many problems on a rotation system with three degrees of freedom are solved very well.

The third invention described herein is a rotation system with three degrees of freedom according to the first and second inventions, wherein a fourth guide rail is installed on said indication bar, and said slider slides along said fourth guide rail. Said fourth guide rail may be in a shape of a bar, or may have a slit. In particular, in a case that this said guide rail has this said slit, this said guide rail may be cut out from a plate, or may be constructed by combining with at least two wires. Suppose moreover that this said guide rail is in a shape of an umbrella. In this case, this said guide rail can increase the strength. This said guide rail rotates centering around said indication bar. Therefore, since at least one said slider slides along this said guide rail, a rotation direction of this said indication bar coincides with a direction of this said slider viewed from this said indication bar. By detecting a direction of this said indication bar and a direction of these guide rails, thus, a rotation direction of this said indication bar is derived precisely. Since said rotor can be rotated with three degrees of freedom without moving all said bases, in the present invention, many problems on a rotation system with three degrees of freedom are solved very well.

The fourth invention described herein is a rotation system with three degrees of freedom comprising a rotor comprising a part or a whole of a sphere, an indication bar, at least two sliders, at least one base, four shafts, six bearings, and three first to third guide rails, wherein said rotor comprises said indication bar, said first guide rail is installed on said base by using two said shafts and two said bearings, said second guide rail and said third guide rail are installed on said base by using two remaining said shafts and four remaining said bearings, and at least two said sliders are installed on or concatenated with said indication bar, moreover wherein said rotor rotates centering around two said shafts supporting said first guide rail, sliding said indication bar along said first guide rail, said rotor rotates centering around two said shafts supporting said second guide rail and said third guide rail, sliding at least two said sliders along these guide rails, and said rotor rotates centering around said indication bar, sliding at least two said sliders along said second guide rail and said third guide rail.

The present invention is an enforcement form of a rotation system with three degrees of freedom, said rotor of which rotates with three degrees of freedom. In the present invention, said first guide rail, said second guide rail and said third guide rail are formed in a shape of an arc, centering around said rotor mainly. Said rotor rotates according to rotation of these said guide rails, while these said guide rails rotate according to rotation of this said rotor. Each of these said guide rails may be in a shape of a bar, or may have a slit. In particular, in a case that each of these said guide rails has this said slit, this said guide rail may be cut out from a plate, or may be constructed by combining with at least two wires. Said indication bar is installed on said rotor in a direction passing through a center of this said rotor on an extension line of this said indication bar. Here, this said indication bar may be in a shape of a pipe. Moreover, this said rotor may be hollow. Four said shafts may be fixed to any of said first guide rail, said second guide rail, said third guide rail and at least one said base. Moreover, in a case that these said shafts are fixed to said bases, these said shafts may be installed on these said bases via spacers. Note that two rotation axes connecting to two pairs of said shafts are orthogonal, and pass through a center of this said rotor, respectively. A ball bearing also can be used for said bearing. Since said first guide rail rotates centering around two said shafts, a direction of said indication bar coincides with a direction of this said guide rail. Therefore, said rotor rotates centering around these said shafts according to said direction of this said guide rail. Said second guide rail and a third guide rail rotate centering around the same two said shafts, respectively. However, since two said bearings are installed on each of these said shafts, these said guide rails can rotate independently, respectively. Moreover, here, these guide rails may be in a shape of a nest or may be alternative. In addition, both terminals of these said guide rails are formed as a part in a shape of an arc of each of these said guide rails and said base become orthogonal. Therefore, in a case that these said guide rails make a specific angle centering around a rotation axis passing through these said shafts, a gap of these said guide rails keeps constant in spite of a place. At least two said sliders are installed on or connected with said indication bar so as to face with each other, and slide along these said guide rails, respectively. Therefore, when said gap of these guide rails becomes big, an angle made by these said sliders and these said guide rails approaches to 90 degrees. Oppositely, when said gap of these guide rails becomes small, an angle made by these said sliders and these guide rails approaches to 0 degree. By varying said gap of these guide rails, thus, a rotation angle of said rotor centering around said indication bar can be changed. In addition, suppose that positions of these said sliders are adjusted as this said indication bar is located at a center of said gap of these said guide rails. In this case, since a direction of this said indication bar coincides with said direction of said center of said gap of these said guide rails, said rotor rotates centering around two said shafts supporting these said guide rails, according to this said direction. Since said rotor can be rotated with three degrees of freedom without moving all said bases, in the present invention, many problems on a rotation system with three degrees of freedom are solved very well.

The fifth invention described herein is a rotation system with three degrees of freedom according to the fourth invention, wherein said indication bar passes through a slit, which is opened in said first guide rail. Said first guide rail may be cut out from a plate, or may be constructed by combining at least two wires. Said first guide rail rotates centering around two said shafts. Therefore, since said indication bar passes through said slit opened in this guide rail, a direction of this said indication bar coincides with a direction of this said guide rail. By detecting a direction of this guide rail, thus, a rotation angle of this said indication bar centering around two said shafts supporting this said guide rail is derived precisely. Since a direction of said indication bar can be decided without spending time and effort too much, in the present invention, many problems on a rotation system with three degrees of freedom are solved very well.

The sixth invention described herein is a rotation system with three degrees of freedom according to the fourth or fifth invention, wherein a fourth guide rail and a fifth guide rail are installed on said indication bar, and two said sliders slide along these said guide rails, respectively. Said fourth guide rail and said fifth guide rail may be in a shape of a bar, or may have a slit. In particular, in a case that these said guide rails have this said slit, these said guide rails may be cut out from a plate, or may be constructed by combining with at least two wires. Suppose moreover that these said guide rails are in a shape of an umbrella, by combining with each other. In this case, these said guide rails can increase the strength. These said guide rails rotate centering around said indication bar. Therefore, since at least two said sliders slide along these said guide rails, a rotation direction of this said indication bar coincides with a direction of at least one said slider viewed from this said indication bar. By detecting a direction of this said indication bar and a direction of these guide rails, thus, a rotation direction of this said indication bar is derived precisely. Since said rotor can be rotated with three degrees of freedom without moving all said bases, in the present invention, many problems on a rotation system with three degrees of freedom are solved very well.

The seventh invention described herein is a rotation system with three degrees of freedom comprising a rotor comprising a part or a whole of a sphere, an indication bar, at least two sliders, at least one base, four shafts, six bearings, and four first to third and sixth guide rails, wherein said rotor comprises said indication bar, said first guide rail and said sixth guide rail are installed on said base by using two said shafts and two said bearings, said second guide rail and said third guide rail are installed on said base by using two remaining said shafts and four remaining said bearings, and at least two said sliders are installed on or concatenated with said indication bar, moreover wherein said rotor rotates centering around two said shafts supporting said first guide rail and said sixth guide rail, sliding at least two said sliders along these said guide rails, said rotor rotates centering around two said shafts supporting said second guide rail and said third guide rail, sliding at least two said sliders along these guide rails, and said rotor rotates centering around said indication bar, sliding at least two said sliders along said second guide rail and said third guide rail.

The present invention is an enforcement form of a rotation system with three degrees of freedom, said rotor of which rotates with three degrees of freedom. In the present invention, said first guide rail, said second guide rail, said third guide rail and said sixth guide rail are formed in a shape of an arc, centering around said rotor mainly. Said rotor rotates according to rotation of these said guide rails, while these said guide rails rotate according to rotation of this said rotor. Note that said first guide rail and said sixth guide rail are connected, or are made from one material originally. Each of these said guide rails may be in a shape of a bar, or may have a slit. In particular, in a case that each of these said guide rails has this said slit, this said guide rail may be cut out from a plate, or may be constructed by combining with at least two wires. Said indication bar is installed on said rotor in a direction passing through a center of this said rotor on an extension line of this said indication bar. Here, this said indication bar may be in a shape of a pipe. Moreover, this said rotor may be hollow. Four said shafts may be fixed to any of said first guide rail, said second guide rail, a third guide rail and at least one said base. Moreover, in a case that these said shafts are fixed to said bases, these said shafts may be installed on these said bases via spacers. Note that two rotation axes connecting to two pairs of said shafts are orthogonal, and pass through a center of this said rotor, respectively. A ball bearing also can be used for said bearing. Since said first guide rail and said sixth guide rail rotate together centering around two said shafts, a direction of said indication bar coincides with a direction of this said guide rail, by adjusting positions of these guide rails as this said indication bar is located at a center of a gap of these said guide rails. Therefore, said rotor rotates centering around these said shafts according to this said direction. Said second guide rail and a third guide rail rotate centering around the same two said shafts, respectively. However, since two said bearings are installed on each of these said shafts, these said guide rails can rotate independently, respectively. Moreover, here, these guide rails may be in a shape of a nest or may be alternative. In addition, both terminals of these said guide rails are formed as a part in a shape of an arc of each of these said guide rails and said base become orthogonal. Therefore, in a case that these said guide rails make a specific angle centering around a rotation axis passing through these said shafts, a gap of these said guide rails keeps constant in spite of a place. At least two said sliders are installed on or connected with said indication bar so as to face with each other, and slide along these said guide rails, respectively. Therefore, when said gap of these guide rails becomes big, an angle made by these said sliders and these said guide rails approaches to 90 degrees. Oppositely, when said gap of these guide rails becomes small, an angle made by these said sliders and these guide rails approaches to 0 degree. By varying said gap of these guide rails, thus, a rotation angle of said rotor centering around an indication bar can be changed. In addition, suppose that positions of these said sliders are adjusted as this said indication bar is located at a center of said gap of these said guide rails. In this case, since a direction of this said indication bar coincides with said direction of said center of said gap of these said guide rails, said rotor rotates centering around two said shafts supporting these said guide rails, according to this said direction. Since said rotor can be rotated with three degrees of freedom without moving all said bases, in the present invention, many problems on a rotation system with three degrees of freedom are solved very well.

The eighth invention described herein is a rotation system with three degrees of freedom according to the seventh invention, wherein at least two said sliders pass through slits, respectively, which are opened in said first guide rail and said sixth guide rail. Said first guide rail and said sixth guide rail may be cut out from a plate, respectively, or may be constructed by combining at least two wires. Note that these said guide rails rotates together centering around two said shafts. These said guide rails rotate centering around these said shafts. Therefore, since at least two said sliders pass through said slits opened in these guide rails, respectively, moreover said indication bar is located at a center of these said sliders, a direction of this said indication bar coincides with a direction of these said guide rails. By detecting a direction of these guide rails, thus, a rotation angle of this said indication bar centering around two said shafts supporting these said guide rails is derived precisely. Since a direction of said indication bar can be decided without spending time and effort too much, in the present invention, many problems on a rotation system with three degrees of freedom are solved very well.

The ninth invention described herein is a rotation system with three degrees of freedom according to the seventh or eighth invention, wherein a fourth guide rail and a fifth guide rail are installed on said indication bar, and two said sliders slide along these said guide rails, respectively. Said fourth guide rail and said fifth guide rail may be in a shape of a bar, or may have a slit. In particular, in a case that these said guide rails have this said slit, these said guide rails may be cut out from a plate, or may be constructed by combining with at least two wires. Suppose moreover that these said guide rails are in a shape of an umbrella, by combining with each other. In this case, these said guide rails can increase the strength. These said guide rails rotate centering around said indication bar. Therefore, since at least two said sliders slide along these said guide rails, a rotation direction of this said indication bar coincides with a direction of at least one said slider viewed from this said indication bar. By detecting a direction of this said indication bar and a direction of these said guide rails, thus, a rotation direction of this said indication bar is derived precisely. Since said rotor can be rotated with three degrees of freedom without moving all said bases, in the present invention, many problems on a rotation system with three degrees of freedom are solved very well.

The tenth invention described herein is a rotation system with three degrees of freedom according to any one of the first through ninth inventions, wherein said indication bar is a pipe, and at least one wire passes through said indication bar. In the present invention, said rotor is said sphere or a part of this said sphere, where an internal part of this said sphere may be hollow. An electronic part or a mechanical part is installed on said rotor, and at least one said wire is connected with this said electronic part and this said mechanical part. Note that at least one of these said wires connected with this said electronic part is an electric cable. Therefore, these said wires can be taken out to an external part without twining them round all guide rails. Since all said wires can be taken out from said rotor in spite of a direction of this said rotor, in the present invention, many problems on a rotation system with three degrees of freedom are solved very well.

The eleventh invention described herein is a rotation system with three degrees of freedom according to any one of the first through tenth inventions, wherein all said shafts are installed on at least one said base so as to face with each other every two shafts. Four said shafts may be embedded in said base, may be cut out from at least one said base or may be installed on it via spacers. Note that two rotation axes connecting to two pairs of said shafts are orthogonal, and pass through a center of said rotor, respectively. Each said bearing is installed on or formed at both terminals of said second guide rail and a third guide rail, respectively, moreover is connected to two corresponding said shafts, respectively. Therefore, these said guide rails can rotate independently, respectively. Two said bearings are installed on or formed at both terminals of at least one of said first guide rail, said fourth guide rail and said fifth guide rail, and are connected to two corresponding said bearings, respectively. Since said rotor can be rotated with three degrees of freedom without moving all said bases, in the present invention, many problems on a rotation system with three degrees of freedom are solved very well.

The twelfth invention described herein is a rotation system with three degrees of freedom according to any one of the first through tenth inventions, wherein four said bearings are installed on at least one said base so as to face with each other every two shafts, two said shafts installed on a terminal of said second guide rail and said third guide rail are installed on two said bearings installed on said base, respectively, and two said bearings installed on another terminal of said second guide rail and said third guide rail are installed on said shafts of said third guide rail and said second guide rail, respectively. Four said bearings may be formed from at least one said base or may be installed on it via spacers. Note that two rotation axes connecting two pairs of said shafts connected to these said bearings are orthogonal, and pass through a center of said rotor, respectively. Each said shaft is installed on or formed at said terminal of said second guide rail and a third guide rail, respectively, moreover is connected to two corresponding said bearings, respectively. In addition, said bearings are installed on or formed at either one of both terminals, which does not have said shaft, and corresponding said shafts penetrate. Therefore, these said guide rails can rotate independently, respectively. Two said shafts are installed on or formed at both terminals of at least one of said first guide rail, said fourth guide rail and said fifth guide rail, moreover are connected to two corresponding said bearings, respectively. Since said rotor can be rotated with three degrees of freedom without moving all said bases, in the present invention, many problems on a rotation system with three degrees of freedom are solved very well.

The thirteenth invention described herein is a rotation system with three degrees of freedom according to any one of the first through tenth inventions, wherein four said bearings are installed on at least one said base so as to face with each other every two shafts, two said shafts installed on both terminals of said second guide rail are installed on two said bearings installed on said base, respectively, and two said bearings installed on both terminal of said third guide rail are installed on said shafts of said second guide rail, respectively. Four said bearings may be formed from at least one said base or may be installed on it via spacers. Note that two rotation axes connecting two pairs of said shafts connected to these said bearings are orthogonal, and pass through a center of said rotor, respectively. Each said shaft is installed on or formed at both said terminals of said second guide rail, respectively, moreover is connected to two corresponding said bearings, respectively. In addition, said bearings are installed on or formed at both said terminals of said third guide rail, respectively, and corresponding said shafts penetrate. Therefore, these said guide rails can rotate independently, respectively. Two said shafts are installed on or formed at both terminals of at least one of said first guide rail, said fourth guide rail and said fifth guide rail, moreover are connected to two corresponding said bearings, respectively. Since said rotor can be rotated with three degrees of freedom without moving all said bases, in the present invention, many problems on a rotation system with three degrees of freedom are solved very well.

The fourteenth invention described herein is a rotation system with three degrees of freedom according to any one of the first through thirteenth inventions, wherein at least one encoder detects a direction of said rotor, by detecting at least one rotation angle of said guide rails, said shafts and said bearings. By detecting at least one said rotation angle of said guide rails, said shafts and said bearings, said encoder can detect said rotation angle of a corresponding said guide rail. Here, said encoder may be fixed directly to at least one said base, or may be connected to these said bases via spacers and a case. Even in a case of using three said encoders, since a direction of said rotor can be detected without moving these said encoders, in the present invention, many problems on a rotation system with three degrees of freedom are solved very well.

The fifteenth invention described herein is a rotation system with three degrees of freedom according to the fourteenth invention, wherein at least one encoder detects said direction of said rotor, by concatenating it to at least one of said guide rails, said shafts and said bearings via plurality of gears. A Bevel gear, a Spur gear, a cylindrical gear and a Worm gear can be used for plurality of said gears. Said rotation angle of said guide rail can be detected finely by combining these said gears. Note that a center of at least one of these said gears is installed so as to overlap said shaft corresponding to this said guide rail. Even in a case of using three said encoders, since a direction of said rotor can be detected finely without moving these said encoders, in the present invention, many problems on a rotation system with three degrees of freedom are solved very well.

The sixteenth invention described herein is a rotation system with three degrees of freedom according to the fourteenth or fifteenth invention, wherein each of at least one said encoder comprises an actuator. Suppose that one said encoder and one said actuator share the same rotor element. In this case, this said actuator can change said rotation angle of said guide rail, according to said rotation angle of this said guide rail detected by this said encoder. Even in a case of using three said encoders and three said actuators, since a direction of said rotor can be detected finely without moving these said encoders and these said actuators, in the present invention, many problems on a rotation system with three degrees of freedom are solved very well.

The seventeenth invention described herein is a rotation system with three degrees of freedom according to any one of the first through thirteenth inventions, wherein at least one actuator rotates said rotor, by rotating at least one of said guide rails, said shafts and said bearings. By rotating at least one of said guide rails, said shafts and said bearings centering around said shafts, said actuator can rotate a corresponding said guide rail. Here, said actuator may be fixed directly to at least one said base, or may be connected to these said bases via spacers and a case. Even in a case of using three said actuators, since said rotor can be rotated with three degrees of freedom without moving these said actuators, in the present invention, many problems on a rotation system with three degrees of freedom are solved very well.

The eighteenth invention described herein is a rotation system with three degrees of freedom according to the seventeenth invention, wherein at least one actuator rotates said rotor, by concatenating it to at least one of said guide rails, said shafts and said bearings via plurality of gears. A Bevel gear, a Spur gear, a cylindrical gear and a Worm gear can be used for plurality of said gears. Said actuator can rotate said guide rail by small torque and finely, by combining these said gears. Note that a center of at least one of these said gears is installed so as to overlap said shaft corresponding to this said guide rail. Even in a case of using three said actuators, since a direction of said rotor can be rotated finely without moving these said actuators, in the present invention, many problems on a rotation system with three degrees of freedom are solved very well.

The nineteenth invention described herein is a rotation system with three degrees of freedom according to the fourteenth, fifteenth or sixteenth invention, wherein a computer system calculates a rotation angle of said rotor, by connecting at least one said encoder to said computer system. Said computer system inputs an electric signal corresponding to at least one rotation angle of said guide rails, said shafts and said bearings, where said electric signal is outputted from at least one said encoder. Therefore, even though said electric signal of said encoder is not in proportion to said rotation angle of said rotor, said computer system can calculate this said rotation angle from this said electric signal, by using equations and tables. Since a gap between said electric signal of said encoder, which is generated according to a position of said indication bar, and said rotation angle of said rotor can be corrected, in the present invention, many problems on a rotation system with three degrees of freedom are solved very well.

The twentieth invention described herein is a rotation system with three degrees of freedom according to the sixteenth, seventeenth or eighteenth invention, wherein a computer system rotates said rotor, by connecting at least one said actuator to said computer system. At least one said actuator inputs an electric signal outputted by said computer system. Therefore, even though said electric signal of said computer system is not in proportion to said rotation angle of said rotor, said computer system can calculate this said rotation angle by using equations and tables. Since a gap between said electric signal of said computer system, which is generated according to a position of said indication bar, and said rotation angle of said rotor can be corrected, in the present invention, many problems on a rotation system with three degrees of freedom are solved very well.

The twenty-first invention described herein is an artificial eye comprising a rotation system with three degrees of freedom according to the twentieth invention, wherein a camera taking a picture in a direction opposite to said indication bar is embedded in said rotor. Said camera is embedded in said rotor as a lens of this said camera faces to a direction opposite to said indication bar, moreover said optical axis of this said lens passes through this said indication bar. In addition, an electric cable of this said camera is taken out to an external part, passing through said indication bar which is in a shape of a pipe. Therefore, this said camera can take a picture widely by indicating from an external part. Since a direction of said optical axis of said camera can be controlled by said computer system, in the present invention, many problems on an artificial eye are solved very well.

The twenty-second invention described herein is an artificial eye according to the twenty-first invention, wherein an image rotates by that said computer system memorizes said image taken by said camera, and outputs each pixel of said image, exchanging an order of said pixels. Said computer system can rotate said image up to about 90 degrees, centering around an optical axis of said camera, by using a rotation system with three degrees of freedom. Moreover, this said computer system can rotate this said image within 360 degrees every 90 degrees, without performing affine transform, by changing an order of each pixel of this said image. Therefore, this said computer system can rotate this said image about 360 degrees, without using a special image processing system. Since said image taken by said camera can be rotated with any angle without using this special said image processing system, in the present invention, many problems on an artificial eye are solved very well.

DETAILED DESCRIPTION

Some enforcement forms of a rotation system with three degrees of freedom using a first guide rail 11, a second guide rail 12 and a third guide rail 13 in the present invention are shown below. With reference to the drawings, then, it is explained about the enforcement forms.

Figure 1:
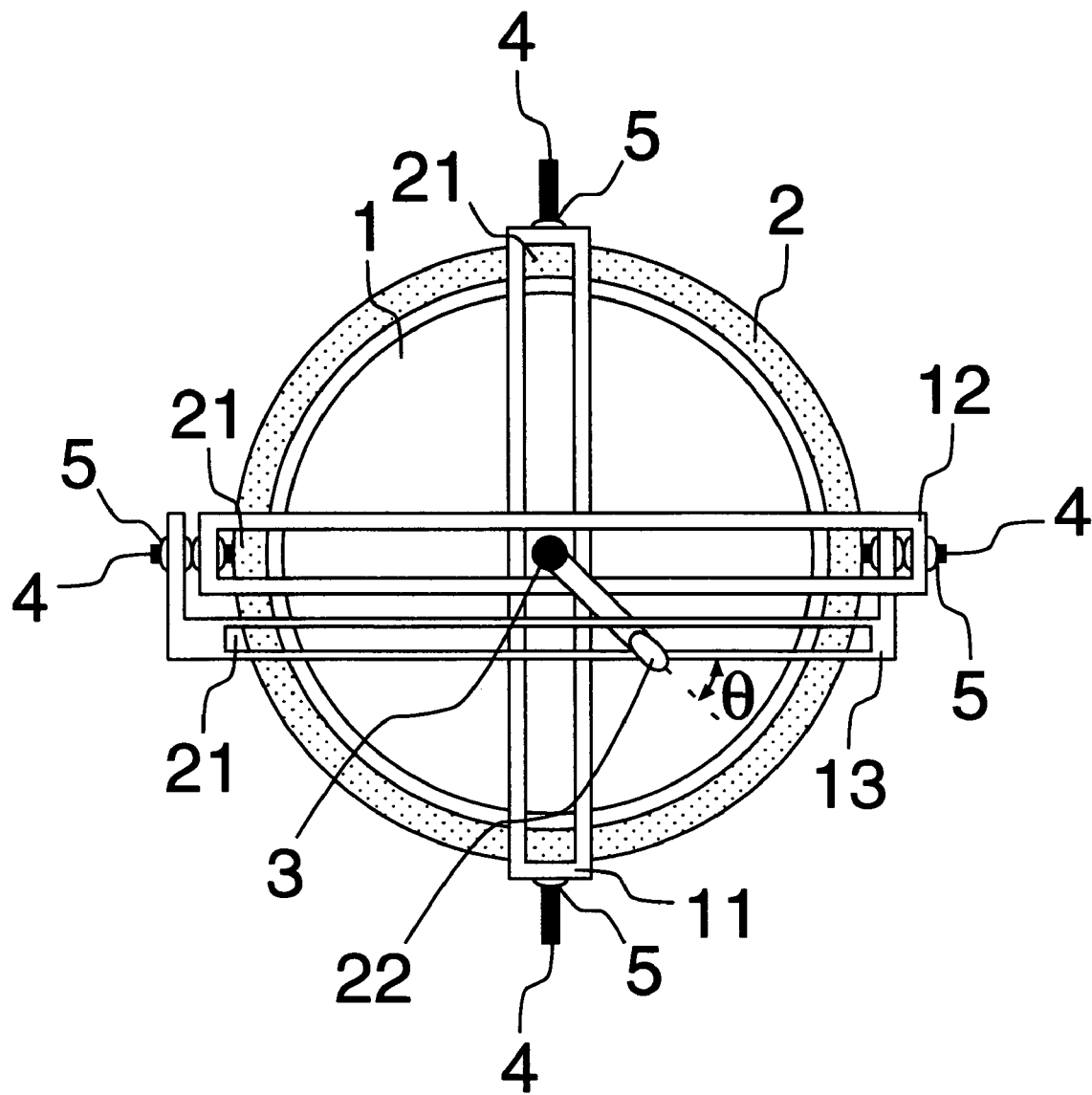
FIG. 1 is an explanation view for a rotation system with three degrees of freedom, in which a second guide rail and a third guide rail are installed on a base alternately.
Figure 2:
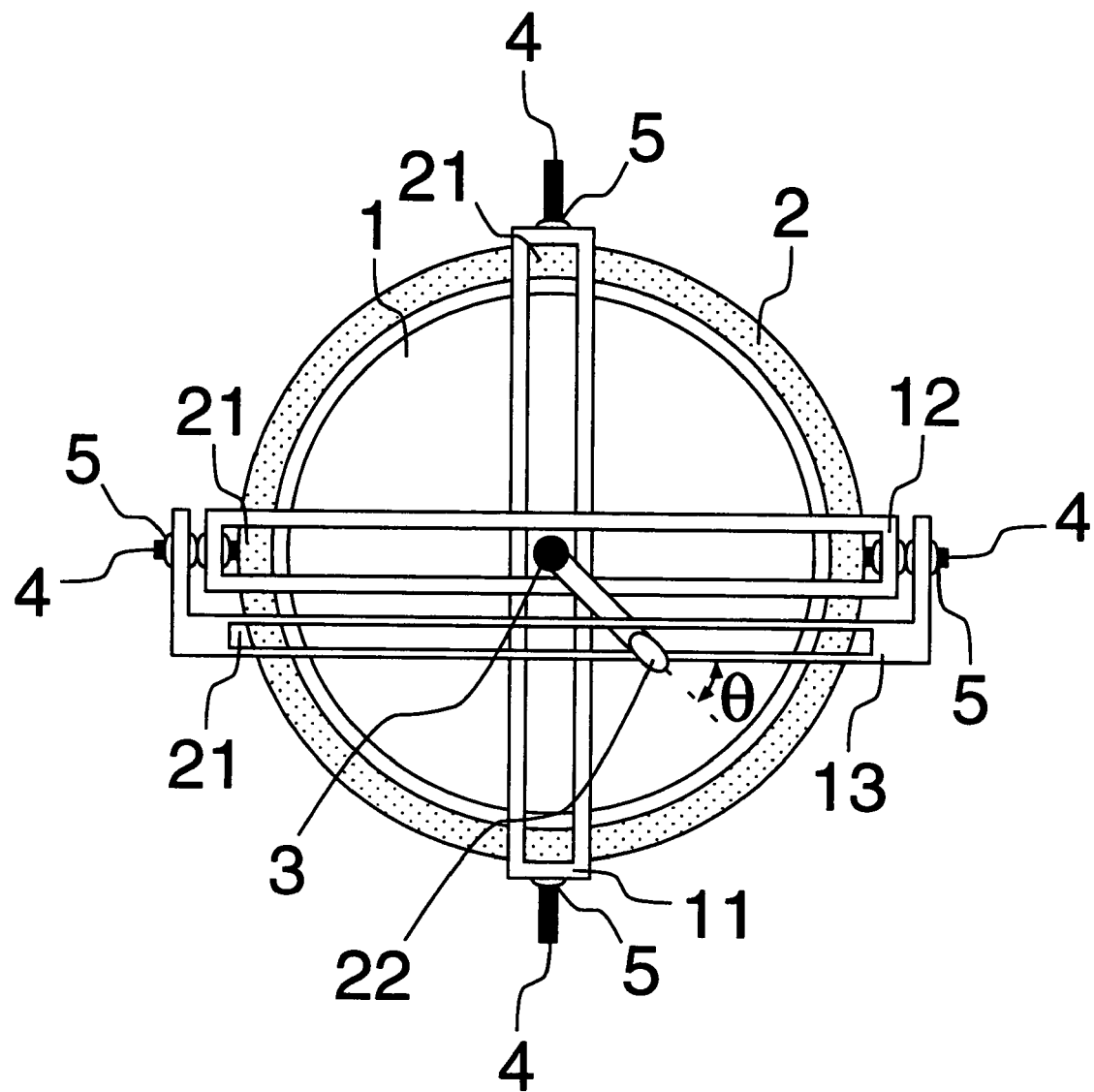
FIG. 2 is an explanation view for a rotation system with three degrees of freedom, in which a third guide rail is installed on a base so as to be located at the outside of a second guide rail.

As shown in FIG. 1 and FIG. 2, basic structure of a rotation system with three degrees of freedom is spherical surface bearing structure which is combined a spherical rotor 1 and a base 2 hollowed out circularly. An indication bar 3 is installed on the rotor 1. Moreover, two shafts 4, on which a first guide rail 11 is installed, and two shafts 4, on which a second guide rail 12 and a third guide rail 13 are installed, are installed on the base 2 so as to be orthogonal each other. Suppose here that the indication bar 3 is arranged at a place where the first guide rail 11, and the second guide rail 12 and the third guide rail 13 cross. In this case, the indication bar 3 can move along these guide rails. That is, the rotor 1 can rotate with three degrees of freedom according to a direction of the indication bar 3. With reference to the drawings, then, it is explained about a function of each part of a rotation system with three degrees of freedom.

Figure 3:
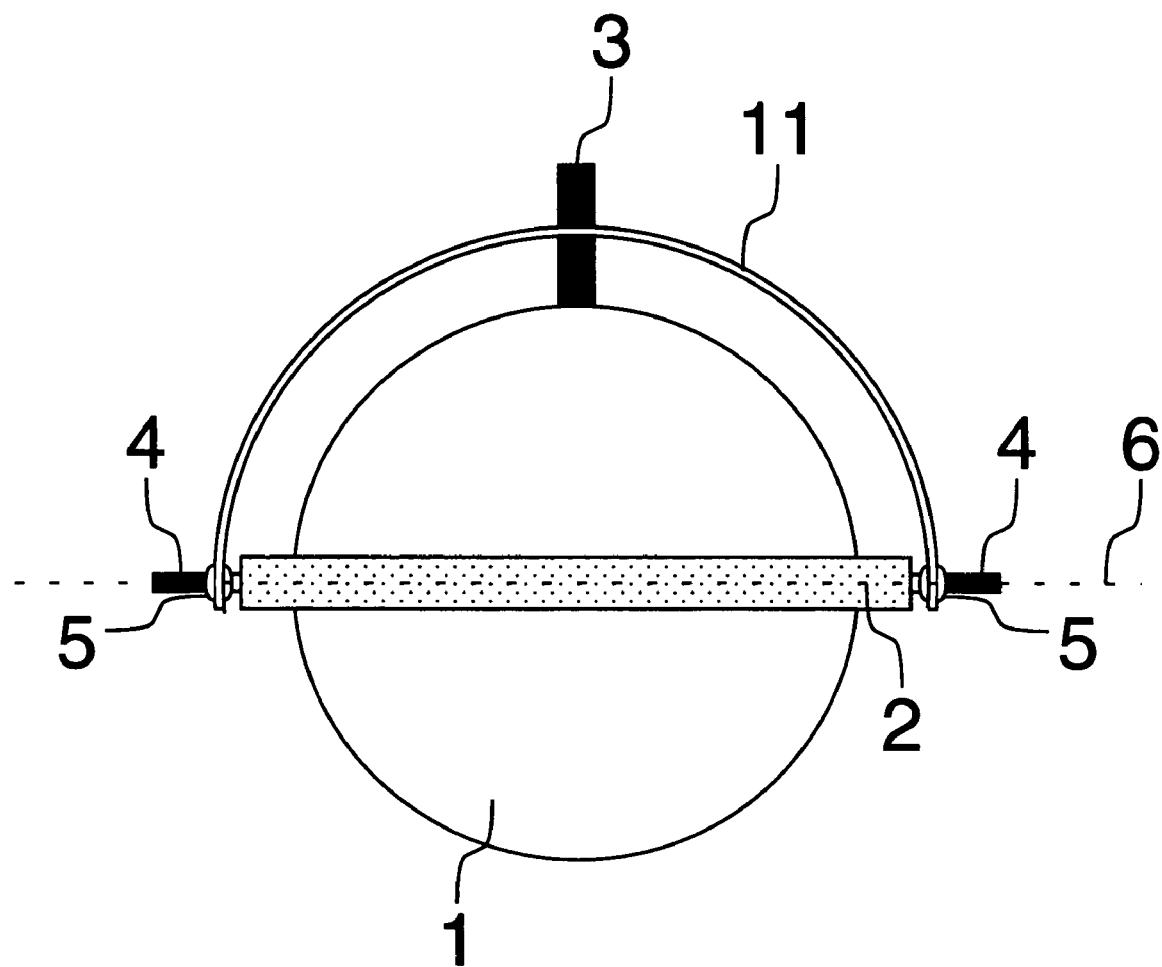
FIG. 3 is an explanation view for a first guide rail installed on a base.
Figure 4:
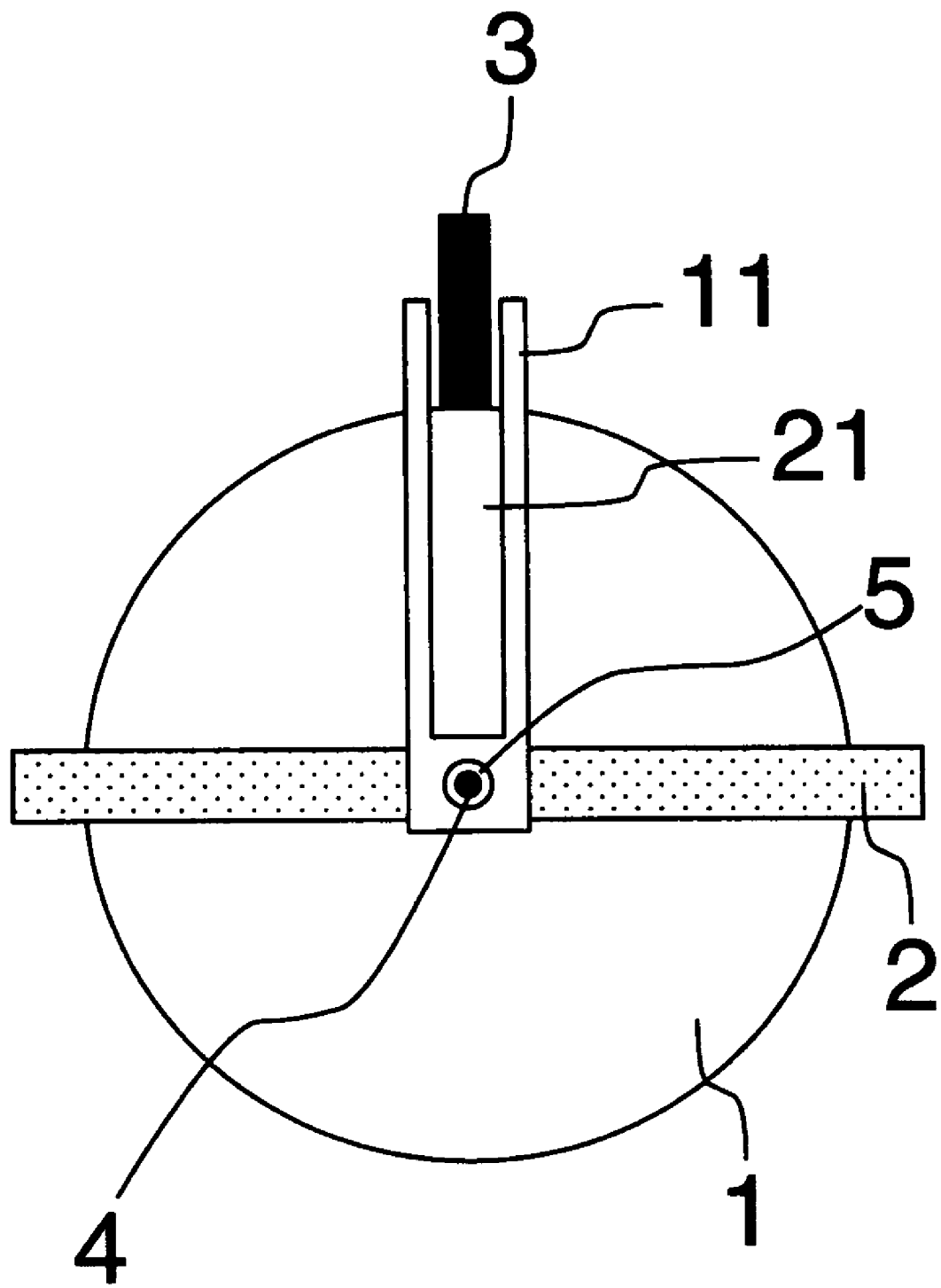
FIG. 4 is an explanation view for an indication bar passing through a slit of a first guide rail.

First, a rotor 1 and a first guide rail 11 rotating centering around rotation axis 6 are shown in FIG. 3 and FIG. 4. As is clear from FIG. 3, the rotor 1 is arranged at a center of a base 2 as a center of the rotor 1 is located on the rotation axis 6, moreover two shafts 4 are installed on the base 2 so as to face each other on the rotation axis 6. Since a central part of the base 2 is here formed circularly, the rotor 1 can rotate freely. Note that an outward form of the base 2 may be voluntary. Two bearings 5 are installed on or formed at both terminals of a first guide rail 11, respectively. As the first guide rail 11 arcs along a surface of the rotor 1, the bearings 5 are installed on the corresponding shafts 4, respectively. Therefore, the first guide rail 11 can rotate centering around the rotation axis 6. Note that some ball bearings can be used as the bearings 5.

As is clear from FIG. 4, moreover, an indication bar 3 is installed on or formed at the rotor 1 as an extension line of the indication bar 3 passes through a center of the rotor 1. In addition, since a slit 21 is opened at the first guide rail 11, the indication bar 3 can slide in the slit 21. Therefore, in a case that the rotor 1 rotates centering around the rotation axis 6, the first guide rail 11 also rotates only with the same rotation angle as the rotor 1, centering around the rotation axis 6 because the indication bar 3 pushes the first guide rail 11. Oppositely, in a case that the first guide rail 11 rotates centering around the rotation axis 6, the rotor 1 also rotates only with the same rotation angle as the first guide rail 11, centering around the rotation axis 6 because the first guide rail 11 pushes the indication bar 3.

However, in a case that the rotor 1 rotates along a longitudinal direction of the slit 21, the first guide rail 11 does not rotate because the indication bar 3 only slides in the slit 21. Therefore, the rotor 1 can rotate until the indication bar 3 reaches at a terminal of the slit 21. Moreover, in a case that the rotor 1 rotates centering around the indication bar 3, the first guide rail 11 does not rotate because the indication bar 3 does not add force to the first guide rail 11. Therefore, the rotor 1 can rotate infinitely centering around the indication bar 3.

Figure 5:
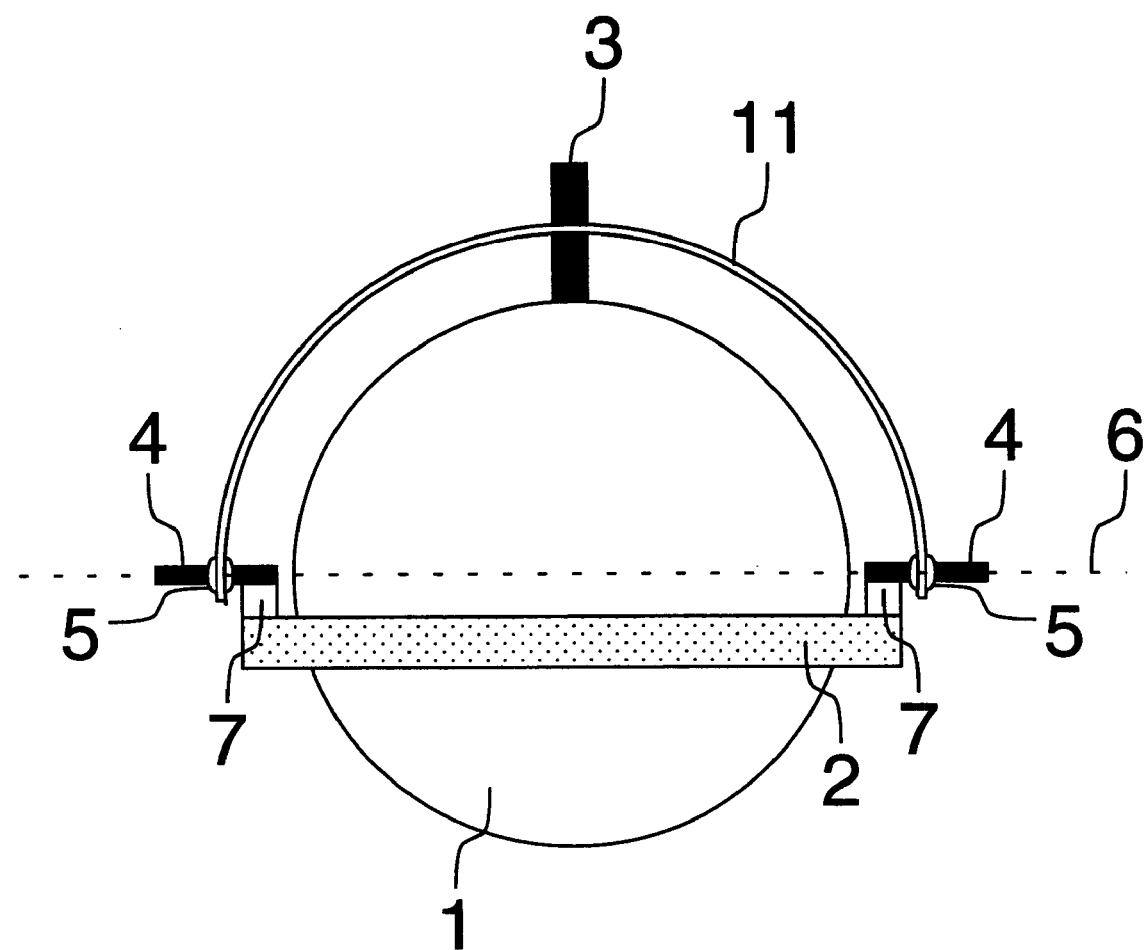
FIG. 5 is an explanation view for a first guide rail installed on a base via spacers.

By the way, although a base 2 is arranged just at a center of a rotor 1 in FIG. 3 and FIG. 4, the rotor 1 becomes unstable with this and gets out of the base 2 easily. As shown in FIG. 5, then, the base 2 can support the rotor 1 by shifting a position of the base 2 from a rotation axis 6 and fixing it to the base 2 by a spacer 7. In addition, since the base 2 stands in a way of an indication bar 3, a first guide rail 11 can rotate 180 or more degrees. Note that a central part of the base 2 is formed circularly, according to a contact surface of the rotor 1, and contact surfaces of the rotor 1 and the base 2 are processed so as to make fraction between the rotor 1 and the base 2 very small, respectively.

Figure 6:
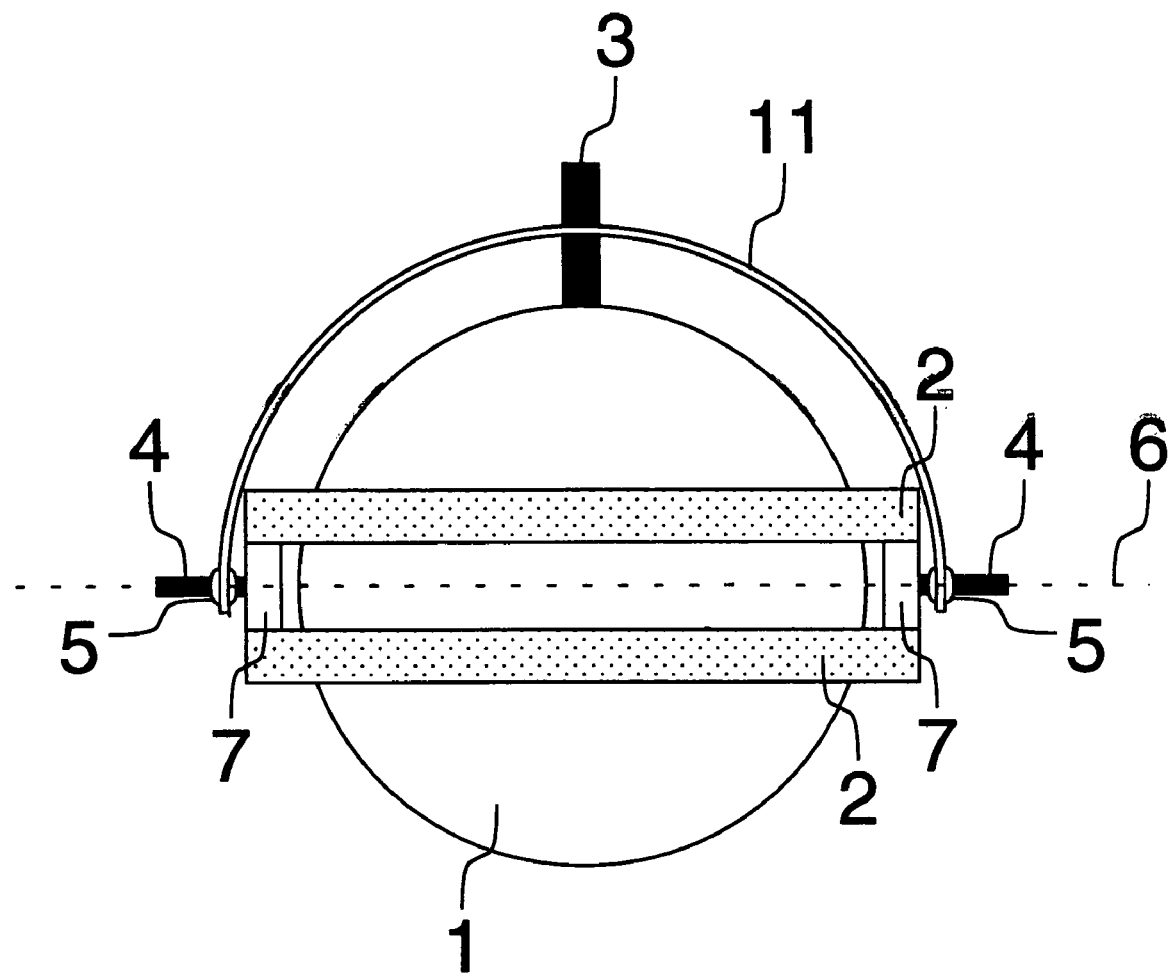
FIG. 6 is an explanation view for a rotor held by two bases via spacers.

However, the rotor 1 hops within the base 2 at this rate. As shown in FIG. 6, therefore, the rotor 1 can be stabilized by holding this rotor 1 by two bases 2. Moreover, assembly of a rotation system with three degrees of freedom becomes easily, if it does in this way. Suppose here that many roll bodies (in general, balls) are arranged between the rotor 1 and the base 2. In this case, they make fraction between the rotor 1 and the base 2 extremely small, and reduce vibration of the rotor 1.

Figure 8:
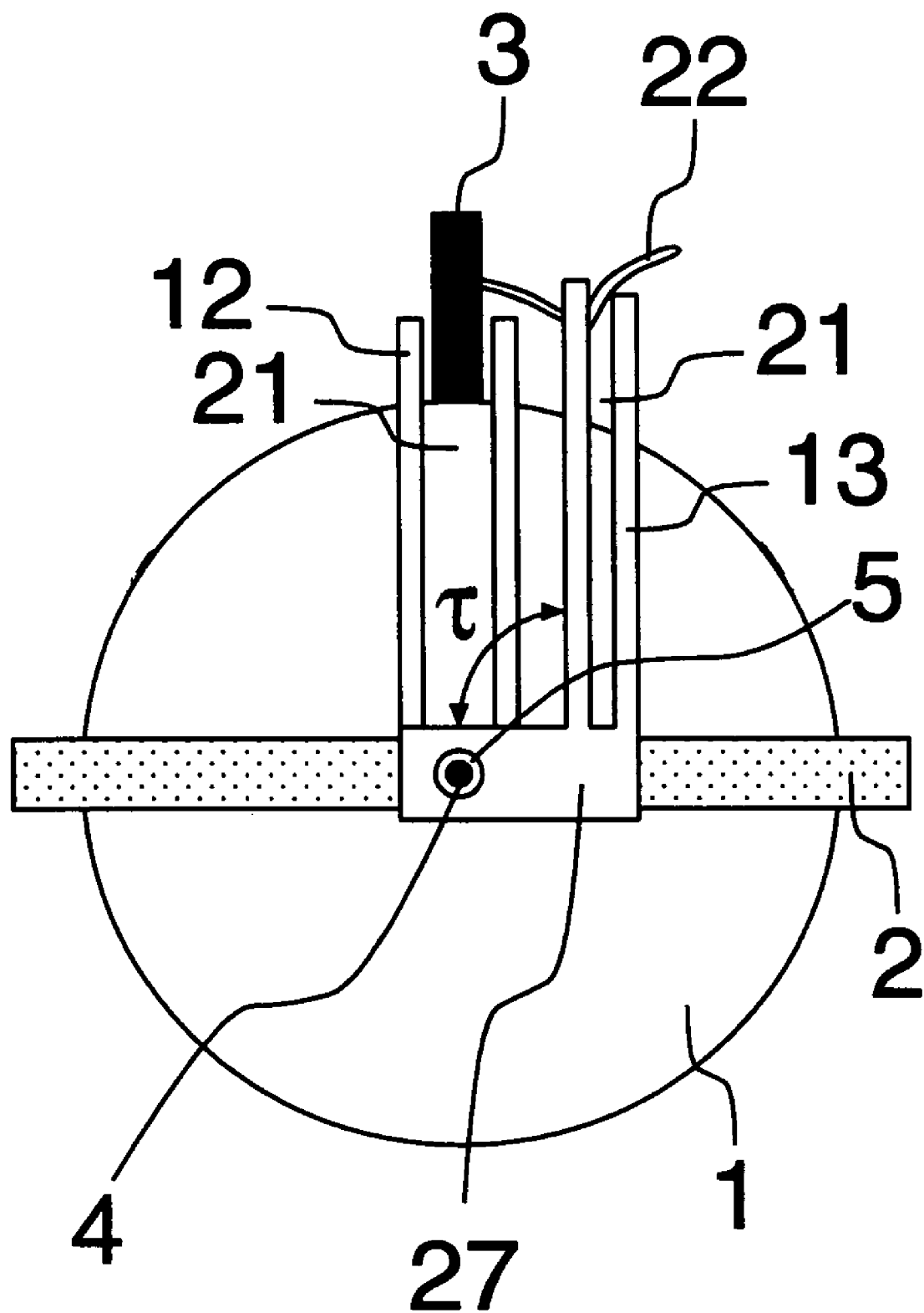
FIG. 8 in an explanation view for a slider passing through a slit of a third guide rail.

Now, it has been described above about a rotation system with three degrees of freedom using a first guide rail 11. However, this system can detect only a rotation angle centering around one rotation axis 6 of three rotation axes 6 of a rotor 1. Note that FIG. 8 is illustrated as a rotation axis 6 of a second guide rail 12 is orthogonal to a rotation axis 6 of a first guide rail 11. If a second guide rail 12 is installed on a base 2, it is clear that two rotation angles centering around two of three rotation axes 6 of a rotor 1 can be detected. It is explained here about a method detecting a rotation angle centering around a remaining one of three rotation axes 6 of a rotor 1, using a third guide rail 13.

Figure 7:
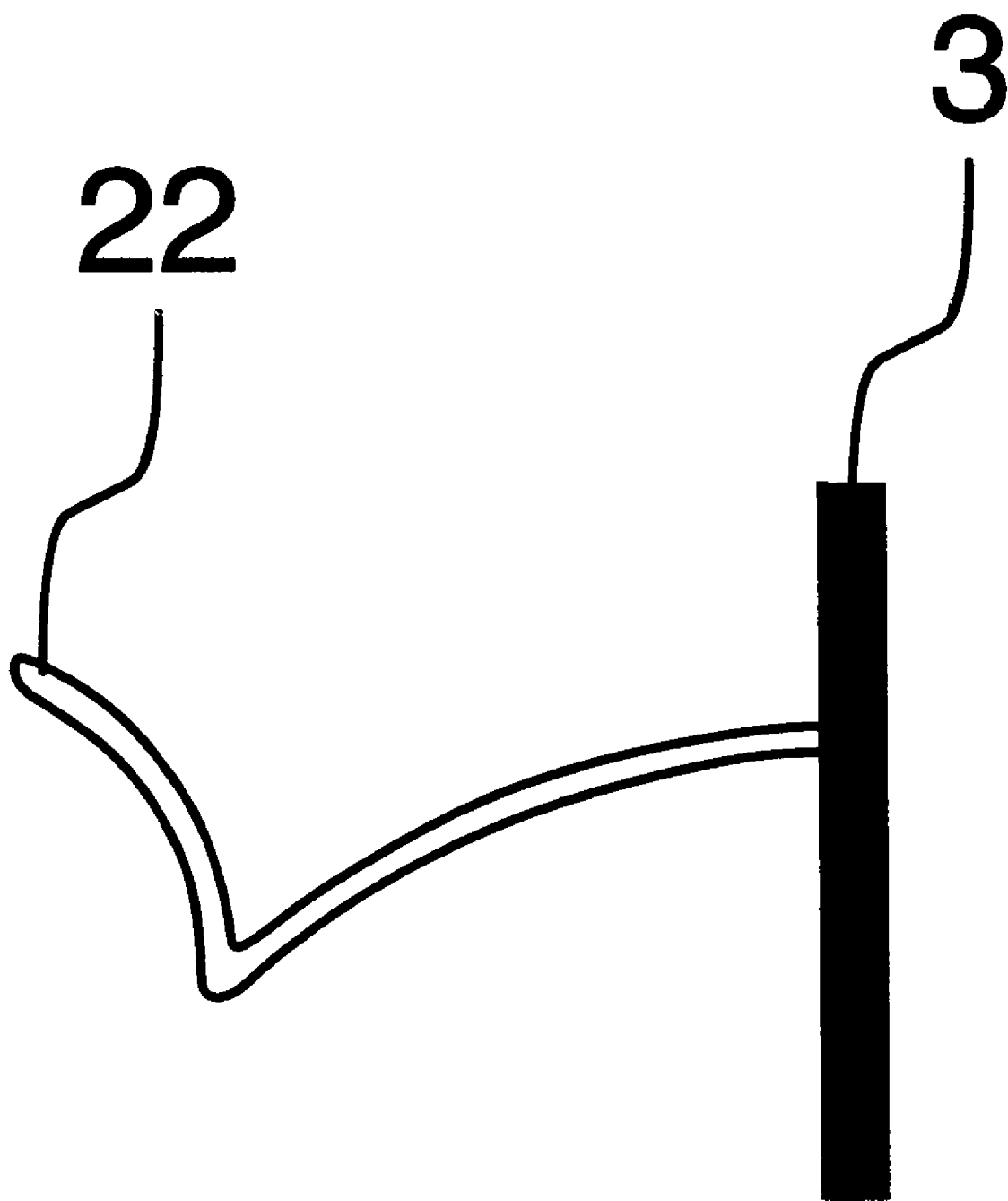
FIG. 7 is an explanation view for a case that a terminal of a slider is bent toward the outside.

First, as shown in FIG. 7, a slider 22 whose terminal is bent toward the outside is installed on an indication bar 3. Here, some parts of the slider 22 installed on the indication bar 3 can have any sections, while these parts had better be bent circularly along a surface of a rotor 1. On the other hand, a terminal of the slider 22 is in a shape of a bar. Next, as shown in FIG. 8, a third guide rail 13 is installed on the same rotation axis 6 as one of a second guide rail 12 after the slider 22 was passed through a slit 21 of the third guide rail 13. It is here good for an installation part 27 of the third guide rail 13 and the slit 21 to be formed as the base 2 and the slit 21 make orthogonal. Note that although FIG. 8 shows a case that an angle τ, which the slit 21 and the installation part 27 make, becomes 90 degrees, it can prevent the installation part 27 from protruding much toward a lower side of the base 2 if the angle τ is designed so as to be over 90 degrees during rotation of the third guide rail 13. Moreover, the slit 21 had better be inclined toward the outside as the slider 22 slides smoothly. Finally, these guide rails may be installed on the base 2 in a shape of a nest, or they may be installed on the base 2 alternatively.

Now, as shown in FIG. 8, suppose that a second guide rail 12 and a third guide rail 13 make parallel. In this case, if a slider 22 slides in a slit 21 of the third guide rail 13, an indication bar 3 also can move parallel to these guide rails. Moreover, the indication bar 3 does not rotate centering around its extension line because a gap of these guide rails is constant. Consider here a case that these guide rails rotate centering around a rotation axis 6 passing through two shafts 4, where the gap keeps constant. If the rotor 1 rotates centering around the rotation axis 6, the indication bar 3 pushes and pulls a second guide rail 12. Therefore, the guide rail also rotate only with the same rotation angle as one of the rotor 1, centering around the rotation axis 6. Oppositely, in a case that the guide rail rotates centering around the rotation axis 6, the guide rail pushes and pulls the indication bar 3. Therefore, the rotor 1 also rotates only with the same rotation angle as one of the guide rail, centering around the rotation axis 6.

Consider here a case that a second guide rail 12 and a third guide rail 13 rotate independently. In this case, a gap of these guide rails becomes wide or narrow. When a gap of these guide rails becomes wide in terms of rigidity of a slider 22, an indication bar 3 rotates toward a direction that an angle θ, which the slider 22 and these guide rails make (refer to FIG. 1 and FIG. 2), approaches to 90 degrees. Oppositely, in a case that a gap of these guide rails becomes narrow, the indication bar 3 rotates toward a direction that an angle θ, which the slider 22 and the guide rails make, approaches to 0 degrees. Therefore, when a rotor 1 rotated centering around an extension line of the indication bar 3, an angle made by these guide rails becomes big or small according to a rotation direction. In addition, by making an angle made by these guide rails big or small, the rotor 1 can also rotate centering around an extension line of the indication bar 3. The rotor 1 here can rotate within a range of 0 degree to 180 degrees for these guide rails. In a case of using only the difference of rotation angles of these guide rails, however, a rotation angle can be specified within only a range of 0 degree to 90 degrees. Suppose here that both of these guide rails are similar to a shape like FIG. 4, these guide rails are installed on a base 2 in a shape of a nest, and an outer guide rail can step over an indication bar 3. Only in this case, a rotation angle can be specified within a range of 0 degree to 180 degrees.

Figure 9:
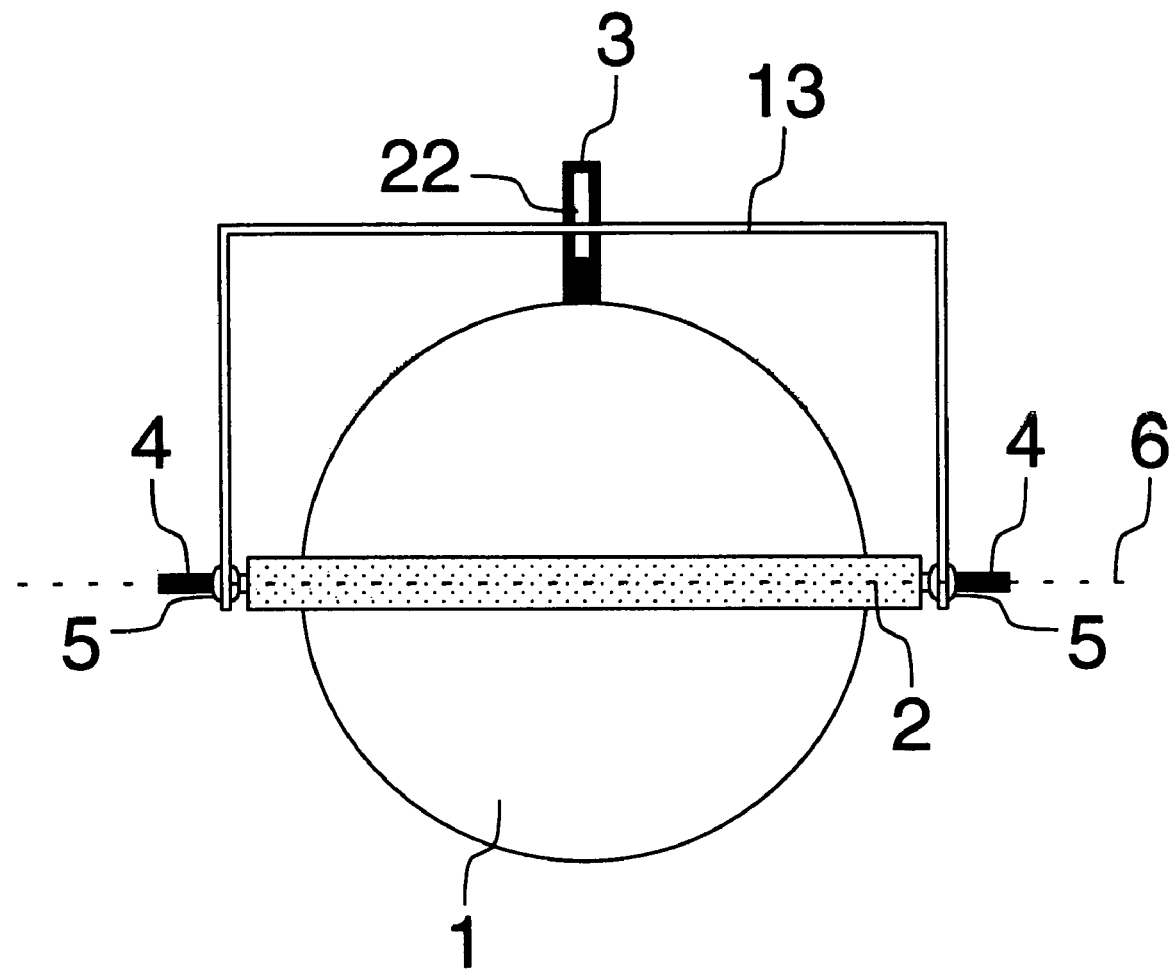
FIG. 9 is an explanation view for a third guide rail bent in a shape of a character, blacket.

Now, in a case that a second guide rail 12 and a third guide rail 13 rotate independently, a problem that a gap of these guide rails varies happens according to a position of an indication bar 3 even though the difference of rotation angles of these guide rails is constant. If such a change can be corrected by using a computer system and so on, there are no serious problems. Otherwise, a certain compensation means is desired. In order to make a slit 21 of these guide rails parallel to a base 2, therefore, a third guide rail 13 bent like a shape of a character, bracket is used, as shown in FIG. 9. Note that a second guide rail 12 is also bent in a shape of a character, bracket, similarly. By bending these guide rails like this, these guide rails move parallel along an arc centering around a rotation axis 6 even though these guide rails rotate independently centering around the rotation axis 6. Therefore, if the difference of rotation angles of these guide rails is constant, a gap of these guide rails also keeps constant in spite of a position of the indication bar 3. Note that a transfer area of the indication bar 3 becomes narrow.

Figure 10:
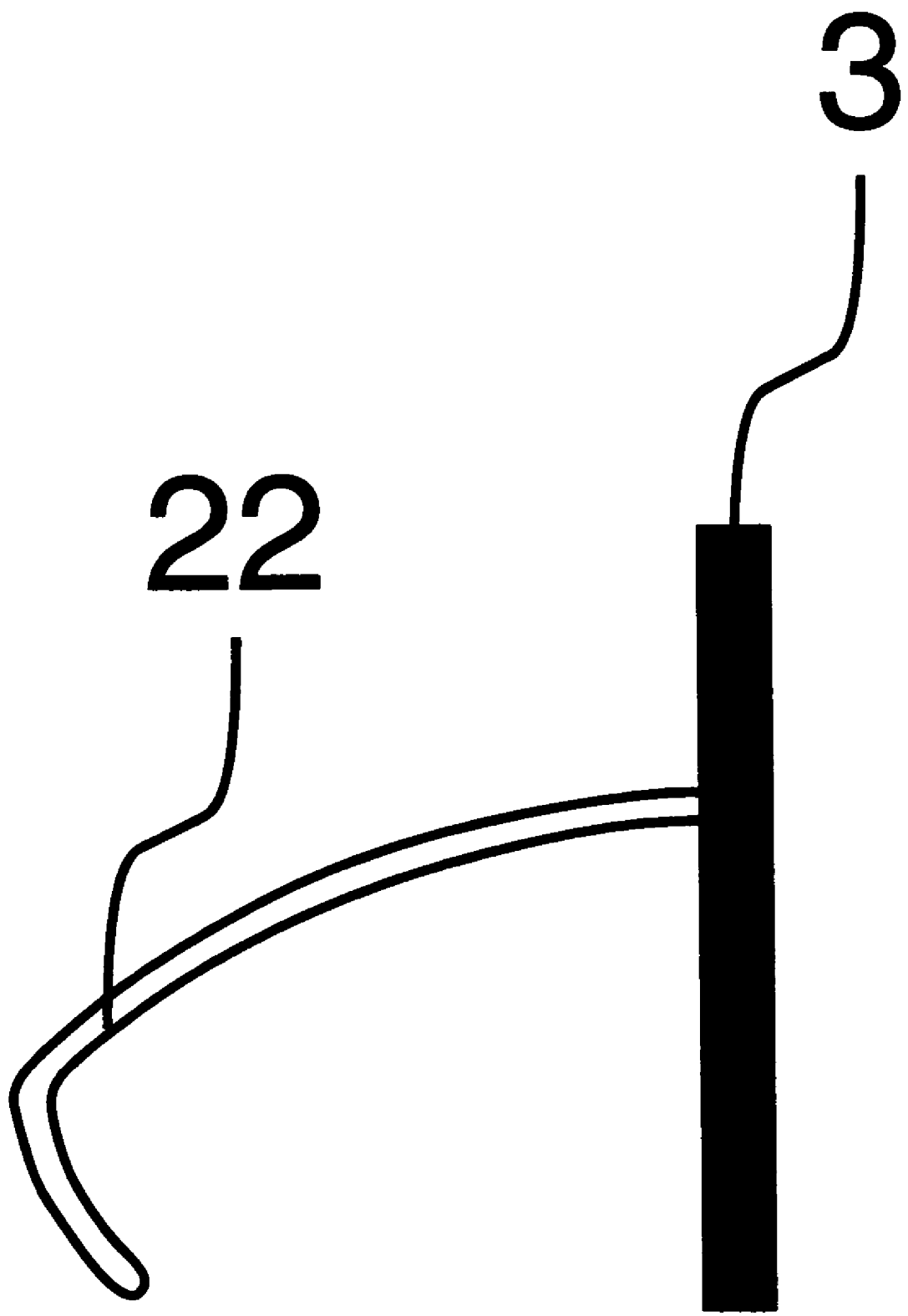
FIG. 10 is an explanation view for a case that a terminal of a slider is bent.
Figure 11:
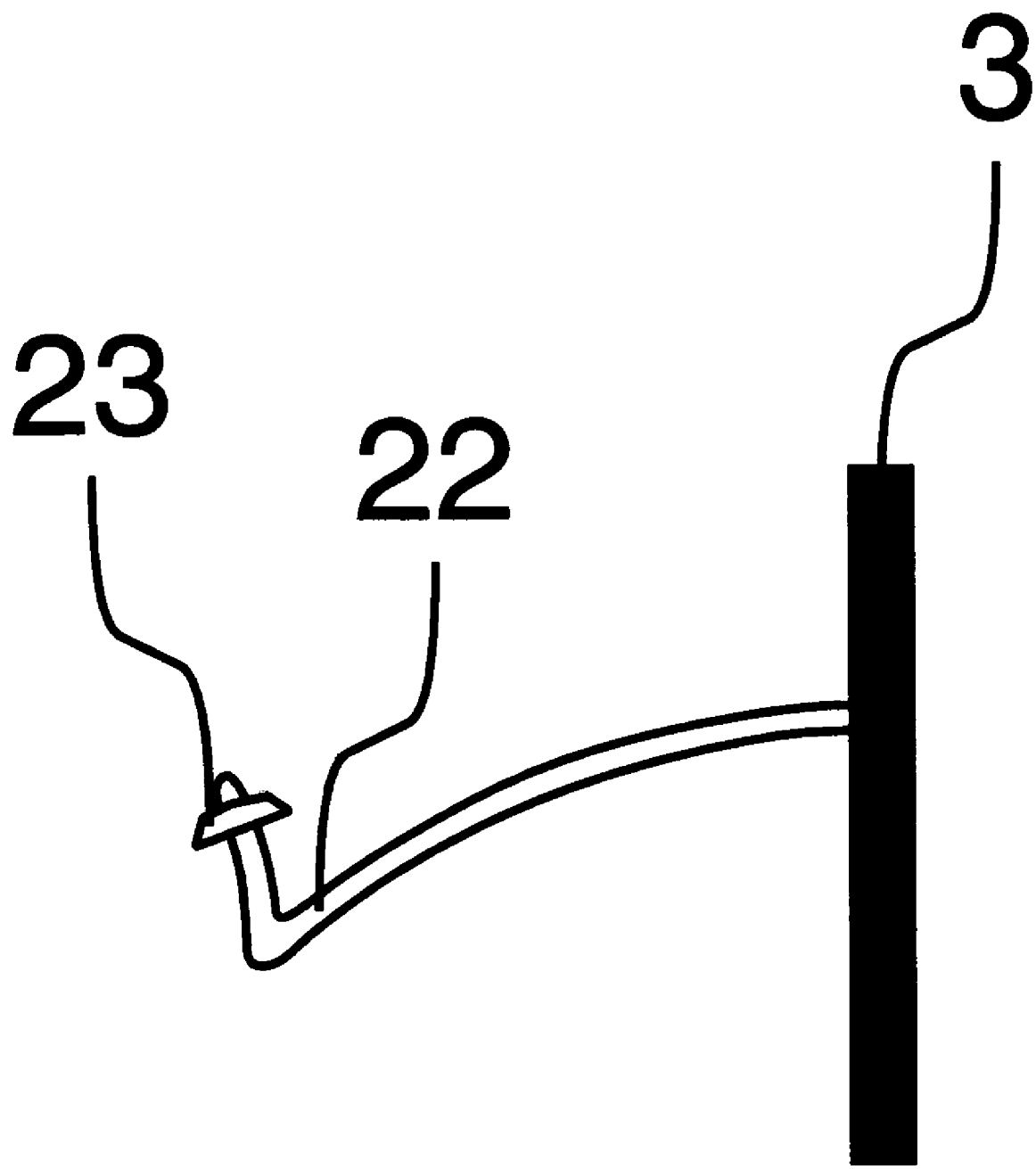
FIG. 11 is an explanation view for a case that a stopper is installed on a terminal of a slider, for FIG. 7.

It has been described above about a case that a slider 22 bent toward the outside, as shown in FIG. 7, was used. Instead of this, however, a slider 22 bent toward the inside, as shown in FIG. 10, may be used. Note that, in this case, the slider 22 passes through these slits 21 from the outside of a third guide rail 13. As shown in FIG. 11, moreover, installation of a stopper on a terminal of a slider 22 can prevent the slider 22 from getting out of a slit 21 of the third guide rail 13.

Figure 21:
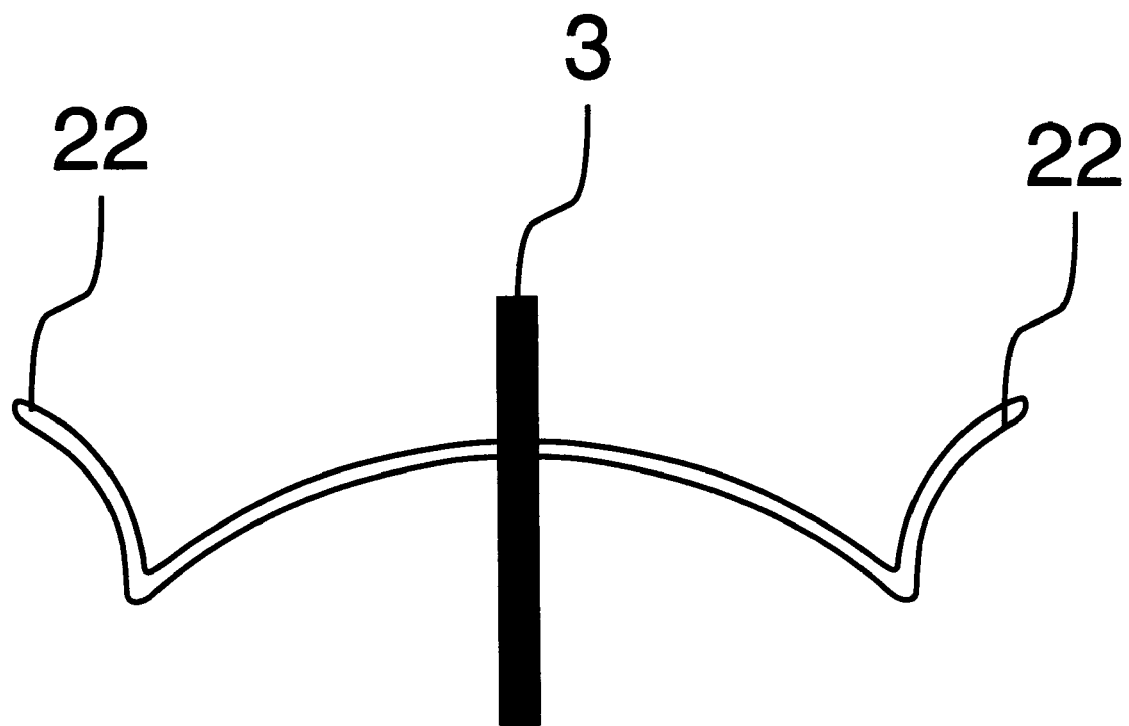
FIG. 21 is an explanation view for a case that terminals of two sliders are bent toward the outside.
Figure 25:
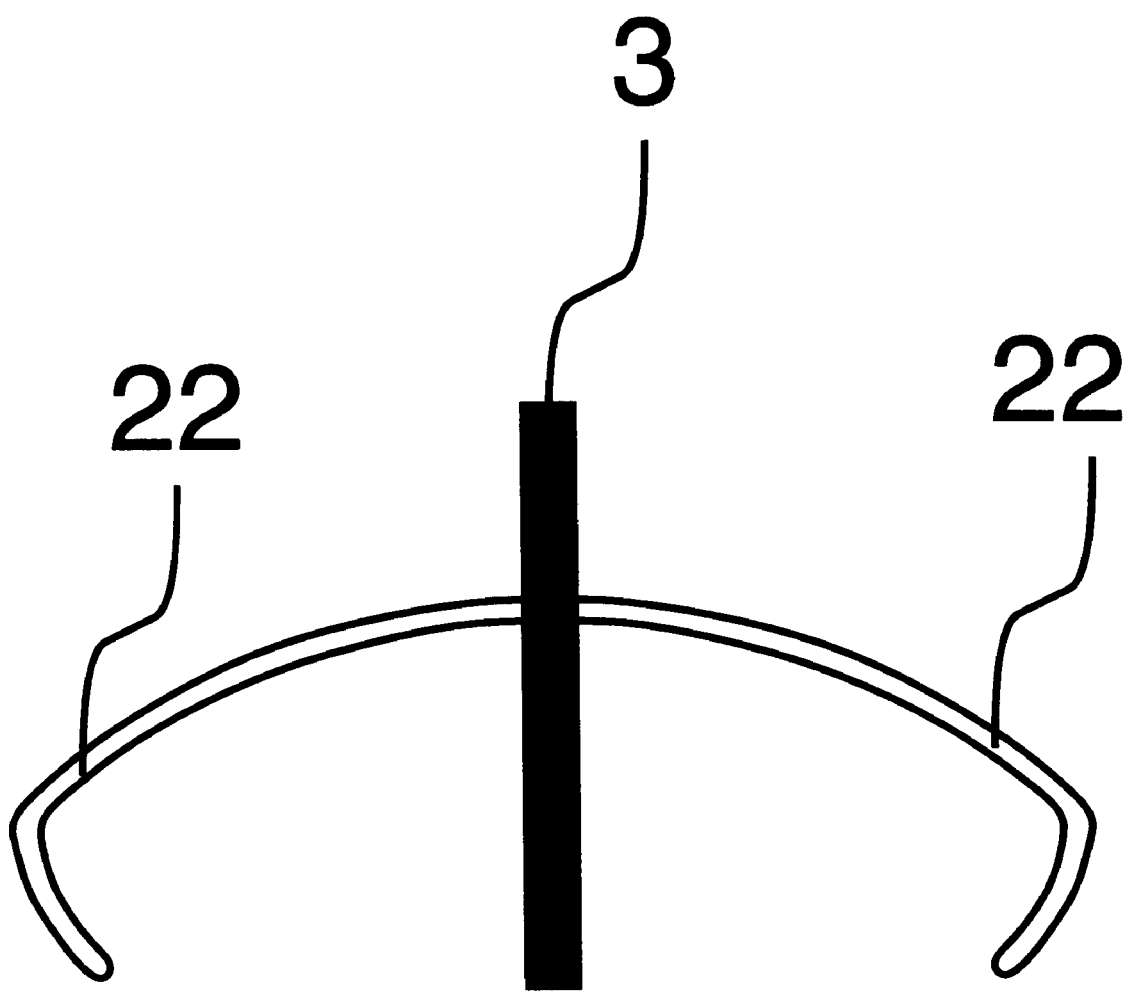
FIG. 25 is an explanation view for a case that terminals of two sliders are bent toward the inside.

As shown in FIG. 1 and FIG. 2, then, an enforcement form of a rotation system with three degrees of freedom for an invention described in claim 1 has a first guide rail 11, and a second guide rail 12 and a third guide rail 13 which are orthogonal. In particular, in an enforcement form of a rotation system with three degrees of freedom for an invention described in claim 11, all shafts 4 are installed on a base 2. Note that, in FIG. 1, the second guide rail 12 and the third guide rail 13 are installed on the base 2 alternatively. In addition, in FIG. 2, these guide rails are installed on the base 2 in a shape of a nest. Since some sliders 22 as shown in FIG. 21 are used in FIG. 1 and FIG. 2, a first guide rail 11 is installed at the inside of the second guide rail 12 and the third guide rail 13. The reason is that it prevents terminals of the sliders 22 from getting caught on the first guide rail 11. Therefore, in a case that a slider 22 as shown in FIG. 25 was used, a first guide rail 11 had better be installed at the outside of the second guide rail 12 and the third guide rail 13. In addition, as shown in FIG. 1 and FIG. 2, in a case that the second guide rail 12 and the third guide rail 13 make parallel, suppose that these guide rails are installed on a base 2 as the slider 22 inclines 45 degrees against these guide rails. We can here calculate easily a rotation angle of a rotor 1 centering around an extension line of an indication bar 3, from the difference of rotation angles of these guide rails.

It has been described above about a case that four shafts 4 were embedded in a base 2 or a case that they were cut out from the base 2. However, at least one of the shafts 4 may be installed on or formed as either one terminal of a first guide rail 11, a second guide rail 12 and a third guide rail 13. In this case, at least one bearing 5 is installed on a position of at least one shaft 4 to be installed on the base 2. Suppose here that a ball bearing is used for a bearing 5 installed on the base 2. In this case, it becomes difficult for some of these guide rails, which the shafts 4 were installed on, to separate from a base 2, moreover assembly of a rotation system with three degrees of freedom becomes easily. In particular, an enforcement form of a rotation system with three degree of freedom for an invention described in claim 12 shows effect when a second guide rail 12 and a third guide rail 13 are alternative. On the other hand, an enforcement form of a rotation system with three degrees of freedom for an invention described in claim 13 shows effect when a second guide rail 12 and a third guide rail 13 are in a shape of a nest.

Now, although an enforcement form of a rotation system with three degrees of freedom for an invention described in the first invention can rotate a rotor 1 in spite of the small number of parts, there is a problem that a form of a slider 22 is complex. In order for the rotation system with three degrees of freedom to rotate the rotor 1 stably, therefore, a slider 22 processed with fine accuracy is desired. As a result, the rotation system with three degrees of freedom becomes expensive. It is explained here about a rotation system with three degrees of freedom which does not use the slider 22 whose shape is complex.

Figure 12:
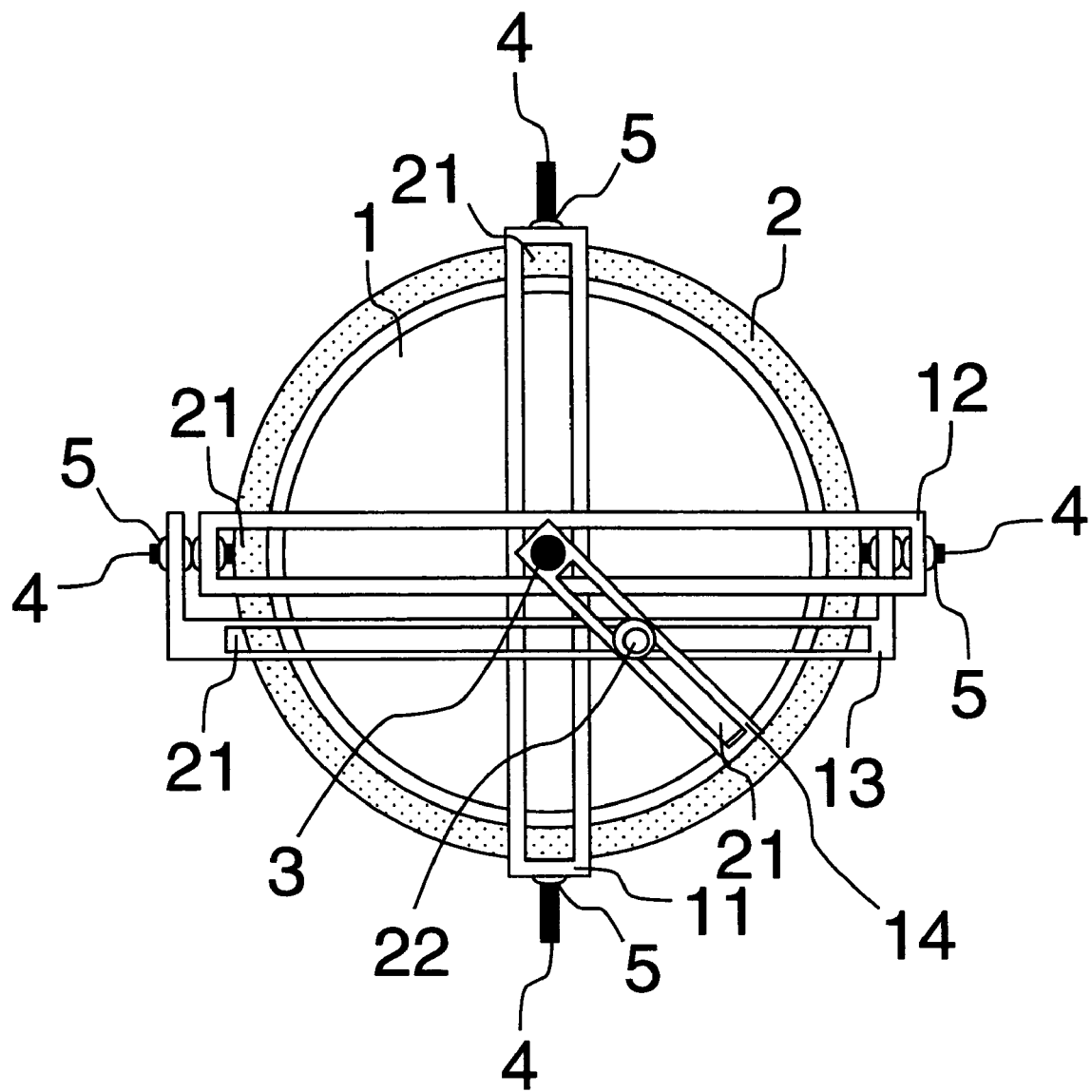
FIG. 12 is an explanation view for a rotation system with three degrees of freedom, in which a slider slides along a slit of a fourth guide rail installed on an indication bar.
Figure 13:
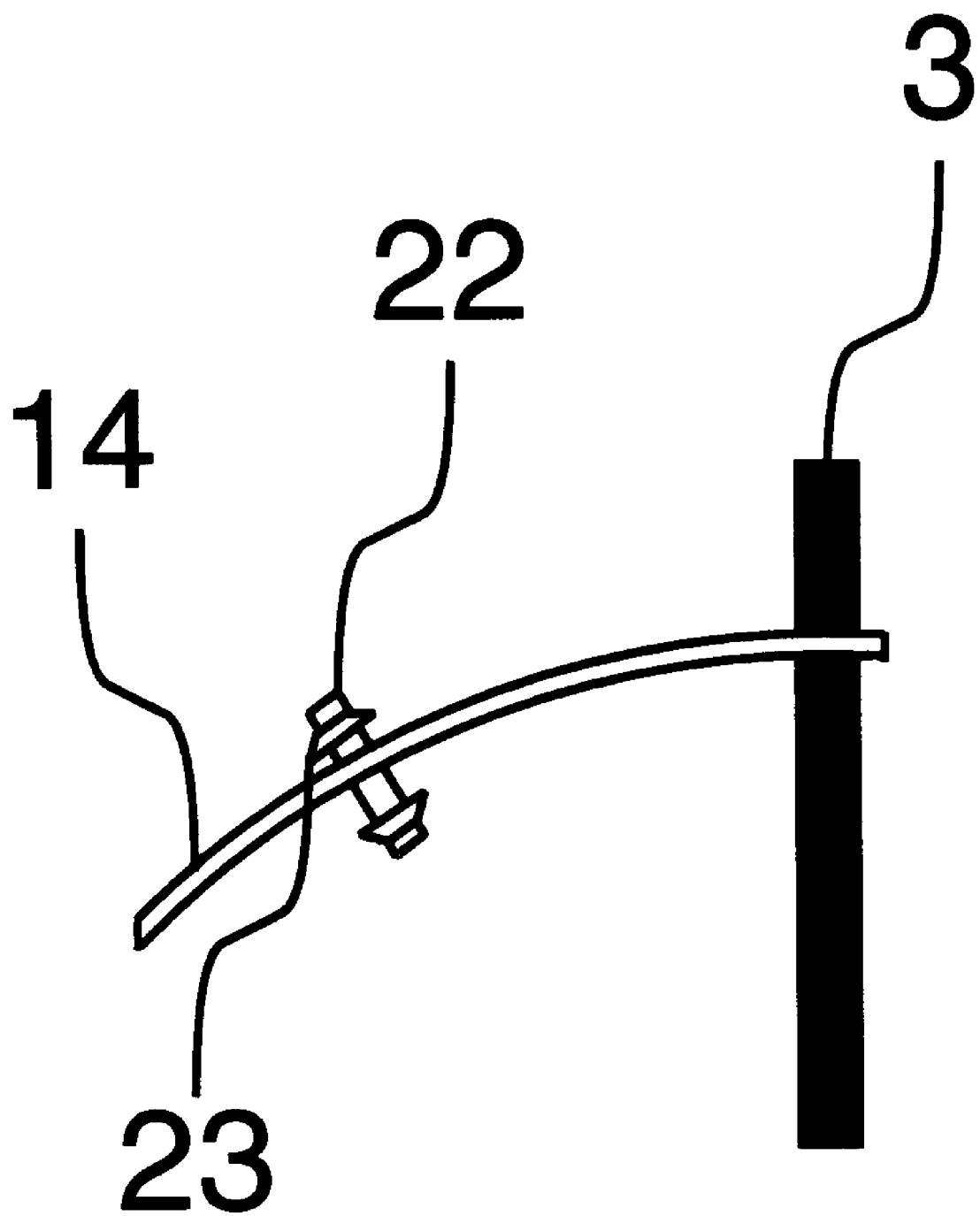
FIG. 13 is an explanation view for a case that a fourth guide rail, in which a slit is opened, is installed on an indication bar.

First, as shown in FIG. 12, a fourth guide rail 14 bent in a shape of an arc along a surface of a rotor 1 is installed on an indication bar 3. A slit 21 is opened in the fourth guide rail 14 and a slider 22 slides in the slit 21. Note that both terminals of the slider 22 are processed so as to swell out, or as shown in FIG. 13, stoppers 23 are installed on the both terminals. Therefore, the slider 22 does not get out of the slit 21.

As shown in FIG. 12, then, in an enforcement form of a rotation system with three degrees of freedom for an invention described in claim 3, a slider 22 is installed on a cross point of a third guide rail 13 and a fourth guide rail 14. Suppose here that inclination of these guide rails is adjusted as an extension line of the slider 22 passes through a center of a rotor 1. In this case, since the slider 22 always becomes vertical against these guide rails, the slider 22 can slide smoothly in slits 21 of these guide rails. That is, since a first guide rail 11 rotates centering around two corresponding shafts 4, the slider 22 slides in a slit 21 of the third guide rail 13. Therefore, the rotor 1 can also rotate centering around the shafts 4. In addition, since the second guide rail 12 rotates centering around two corresponding shafts 4, the third guide rail 13 also rotates together. Therefore, the rotor 1 can also rotate centering around the shafts 4. Moreover, since the slider 22 slides in a slit 21 of the fourth guide rail 14, by varying a gap of the second guide rail 12 and the third guide rail 13, the rotor 1 can rotate centering around an indication bar 3.

Figure 14:
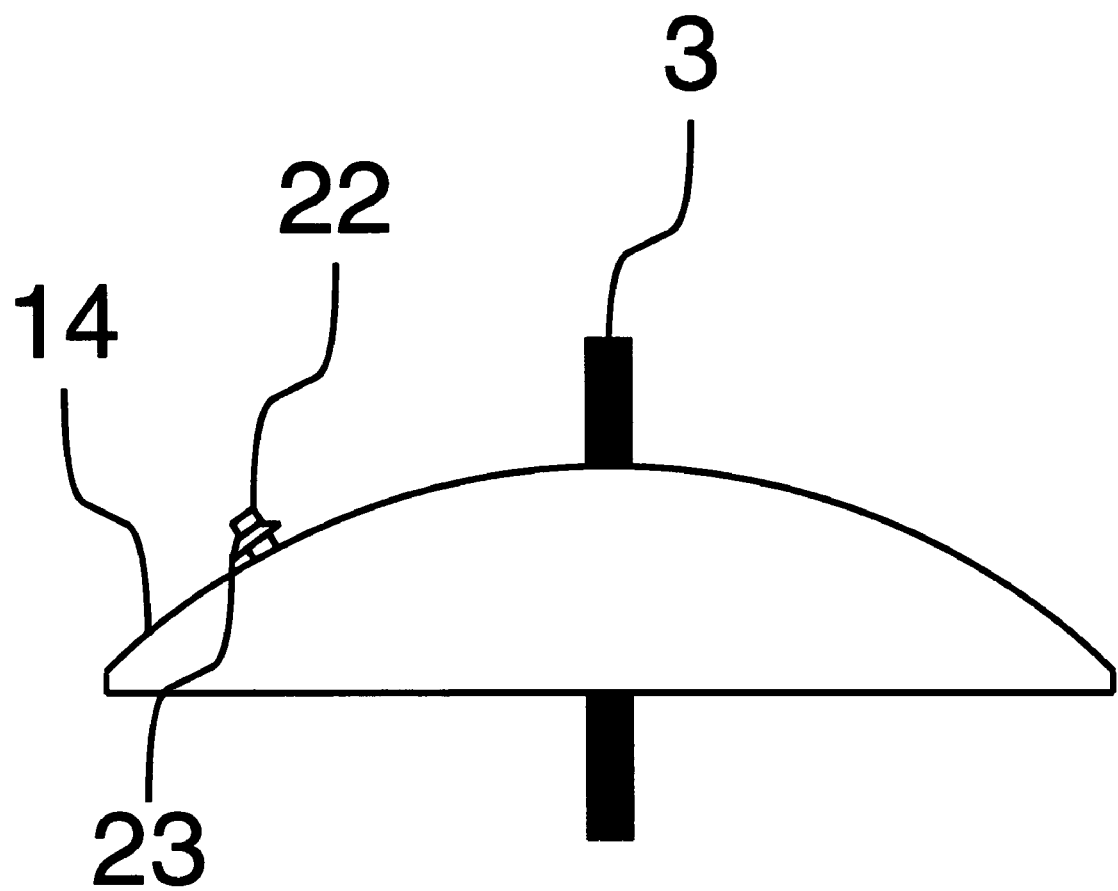
FIG. 14 is an explanation view for a case that a fourth guide rail whose shape is like an umbrella is installed on an indication bar.

By the way, the slits 21 overlap doubly at a place of the slider 22. Therefore, in a case that at least one of these guide rails rotates centering around shafts 4, respectively, load is charged for only a part of the slider 22. The guide rails, thus, are possible to bend. As shown in FIG. 14, then, a fourth guide rail 14 becomes strong if the fourth guide rail 14 is formed as an umbrella. Of course, a form of the fourth guide rail 14 may be a whole or a part of the umbrella.

Now, it has been described above about a case that a slit 21 was opened in all guide rails. In this case, all sliders 22 slide in slits 21 of these guide rails. However, the sliders 22 can slide along the guide rails even though the slits 21 do not exist. It is explained here about a case that at least one of the guide rails is in a shape of a bar.

Figure 15:
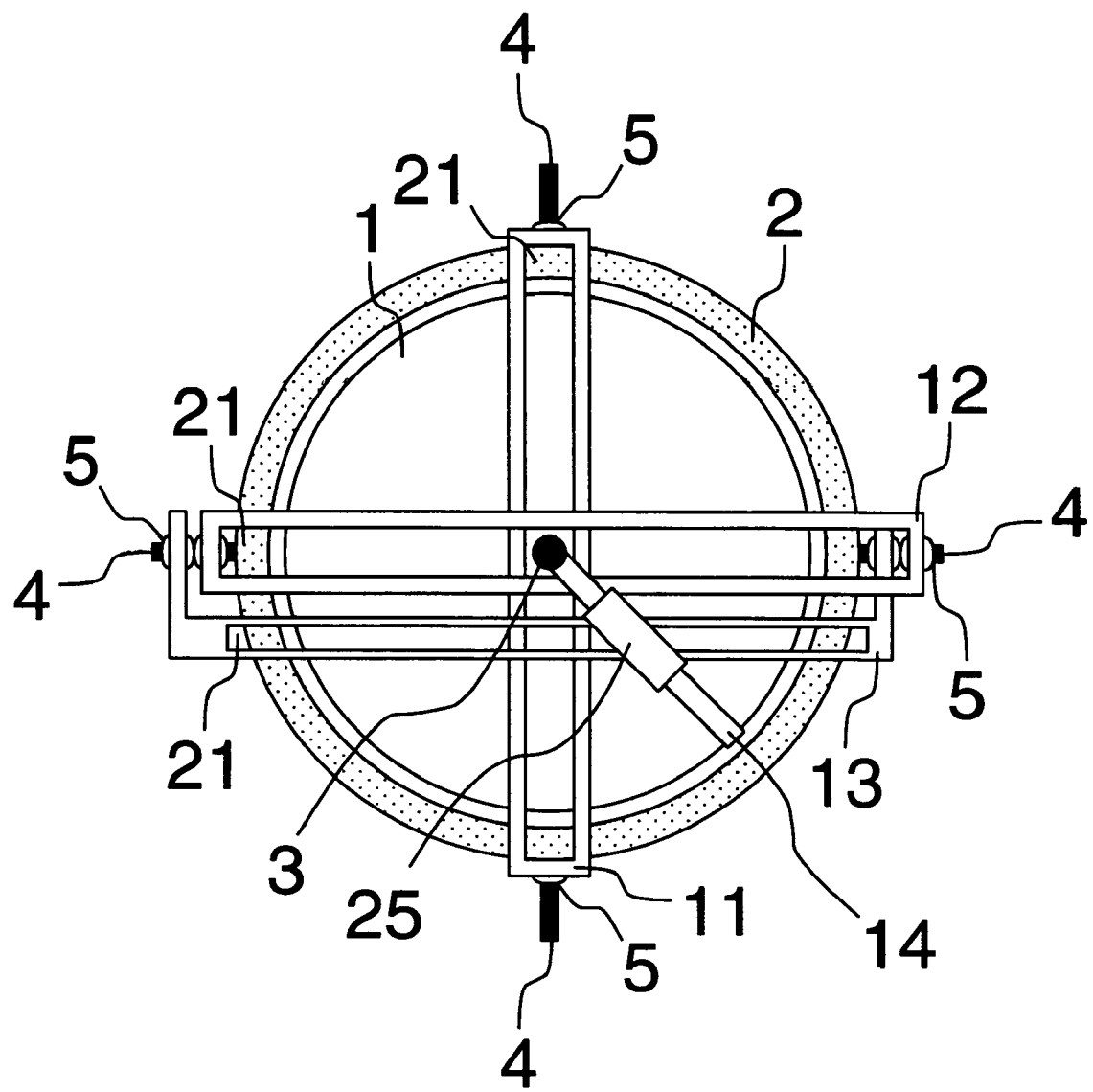
FIG. 15 is an explanation view for a case that a pipe slider slides along a fourth guide rail whose shape is like a bar.
Figure 16:
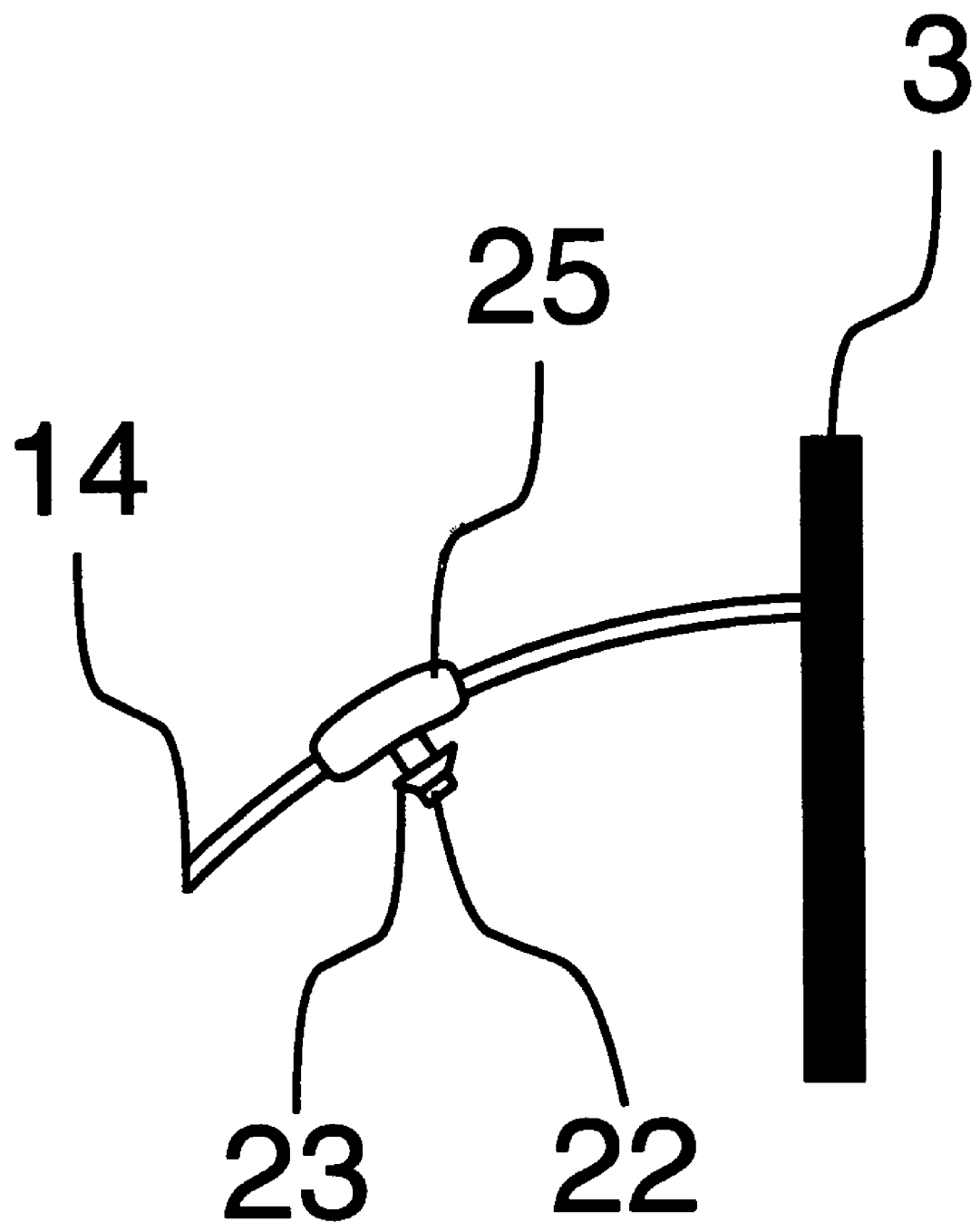
FIG. 16 is an explanation view for a case that a slider is installed on a pipe slider.
Figure 17:
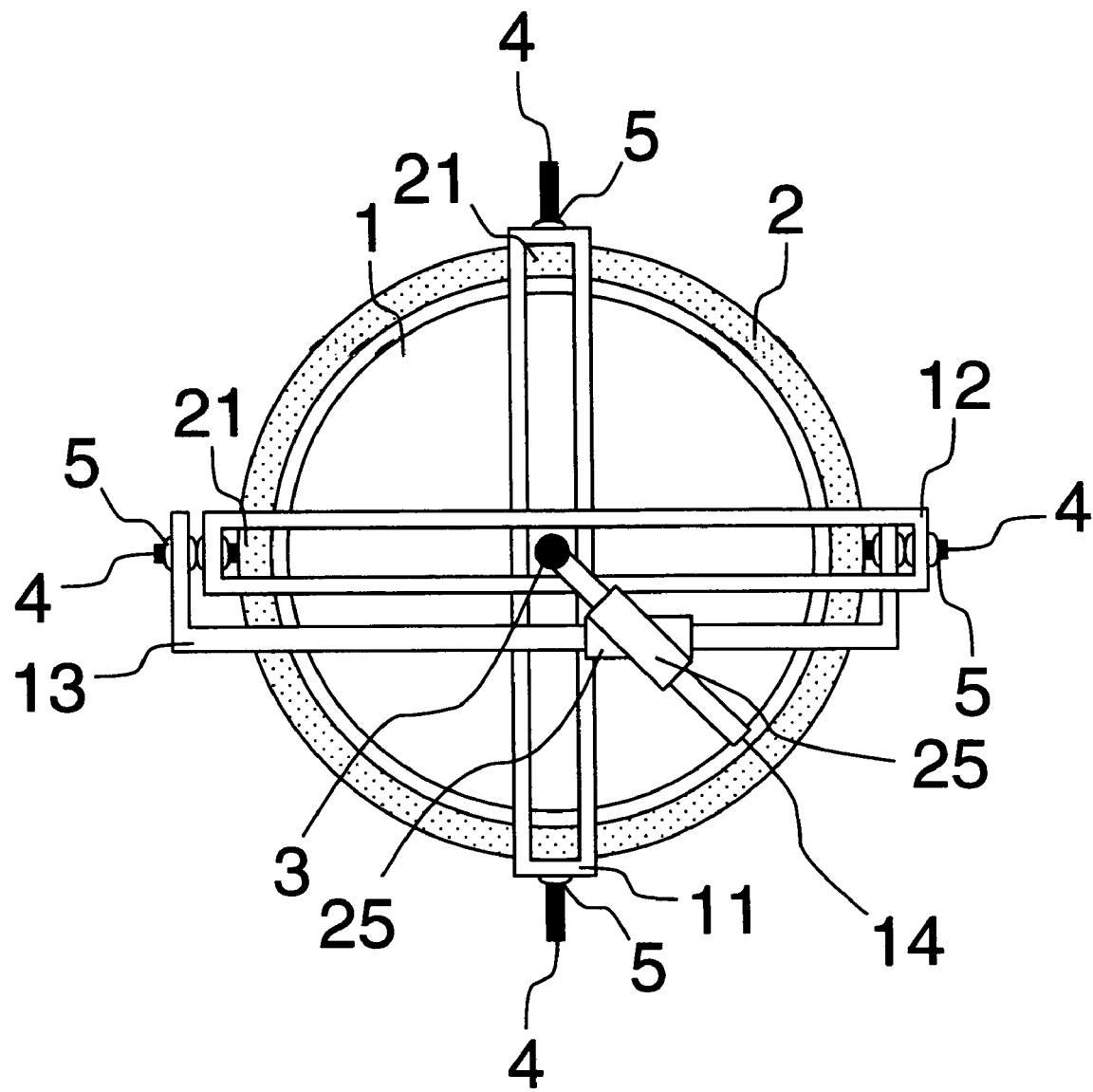
FIG. 17 is an explanation view for a case that two pipe sliders slide along a third guide rail and a fourth guide rail whose shapes are like a bar, respectively, for FIG. 1.
Figure 18:
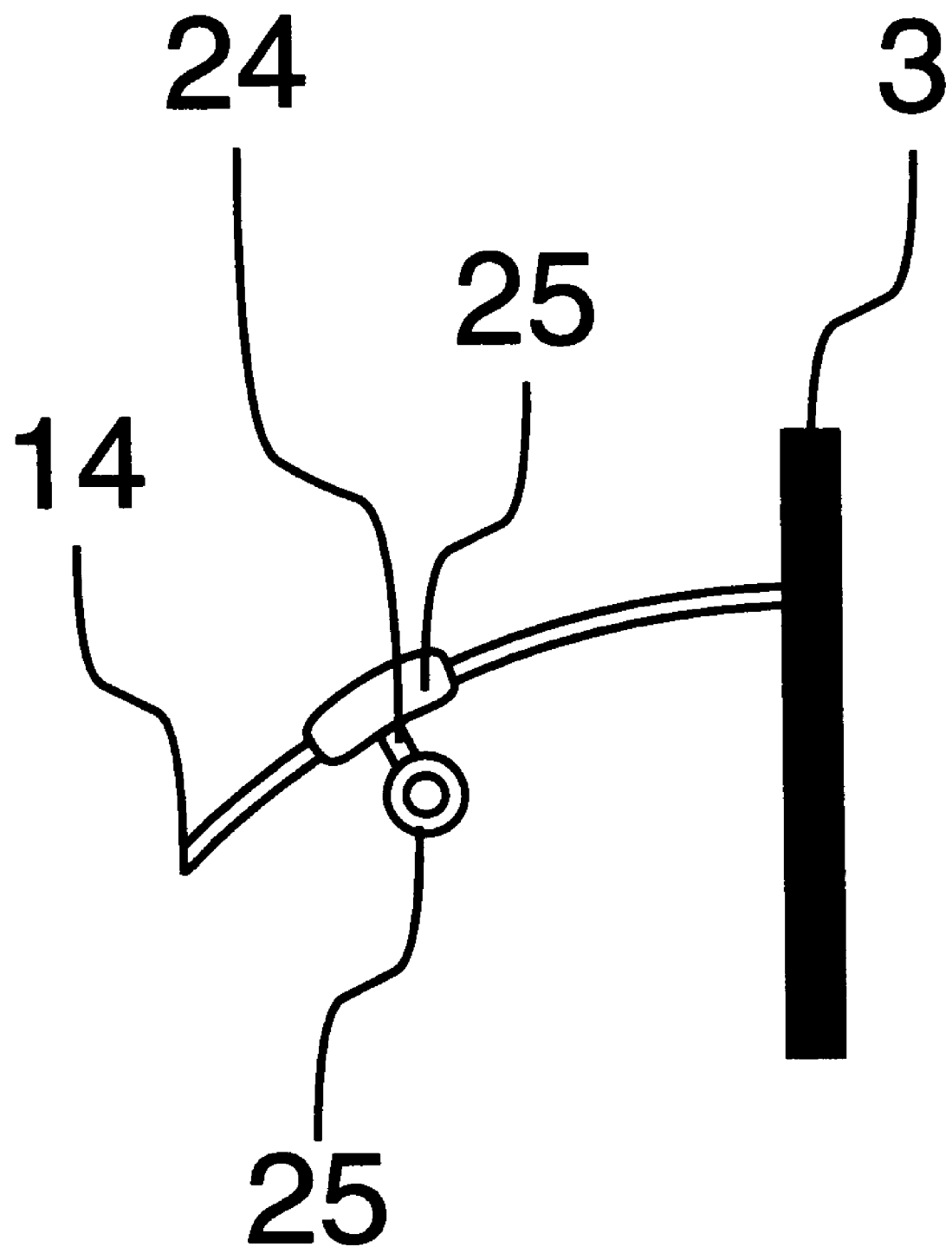
FIG. 18 is an explanation view for a case that a pipe slider slides along a fourth guide rail whose shape is like a bar, and another pipe slider is concatenated with this pipe slider by a concatenation shaft.
Figure 19:
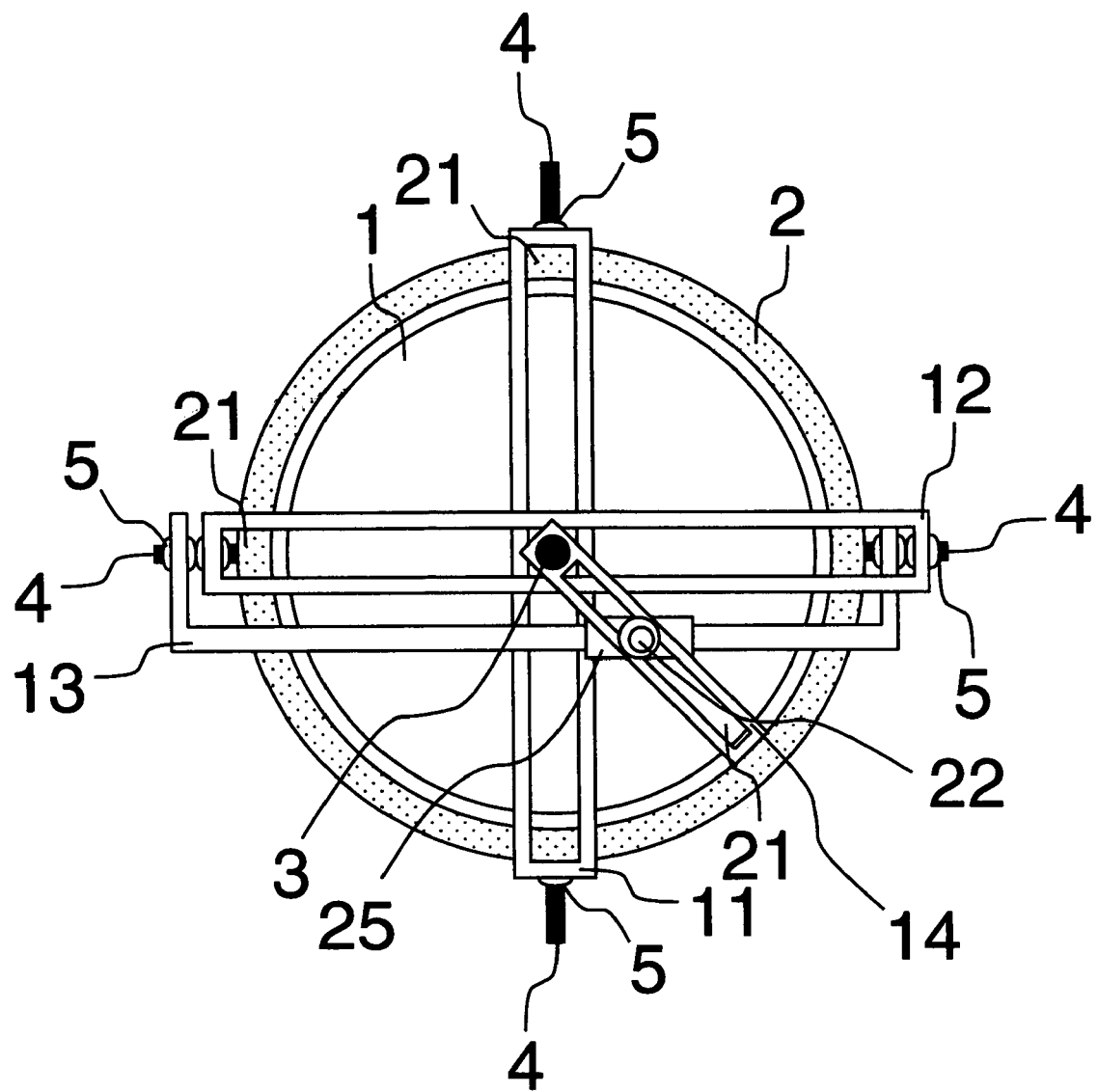
FIG. 19 is an explanation view for a case that a pipe slider slides along a fourth guide rail whose shape is like a bar, and a slider installed on this pipe slider slides along a fourth guide rail.
Figure 20:
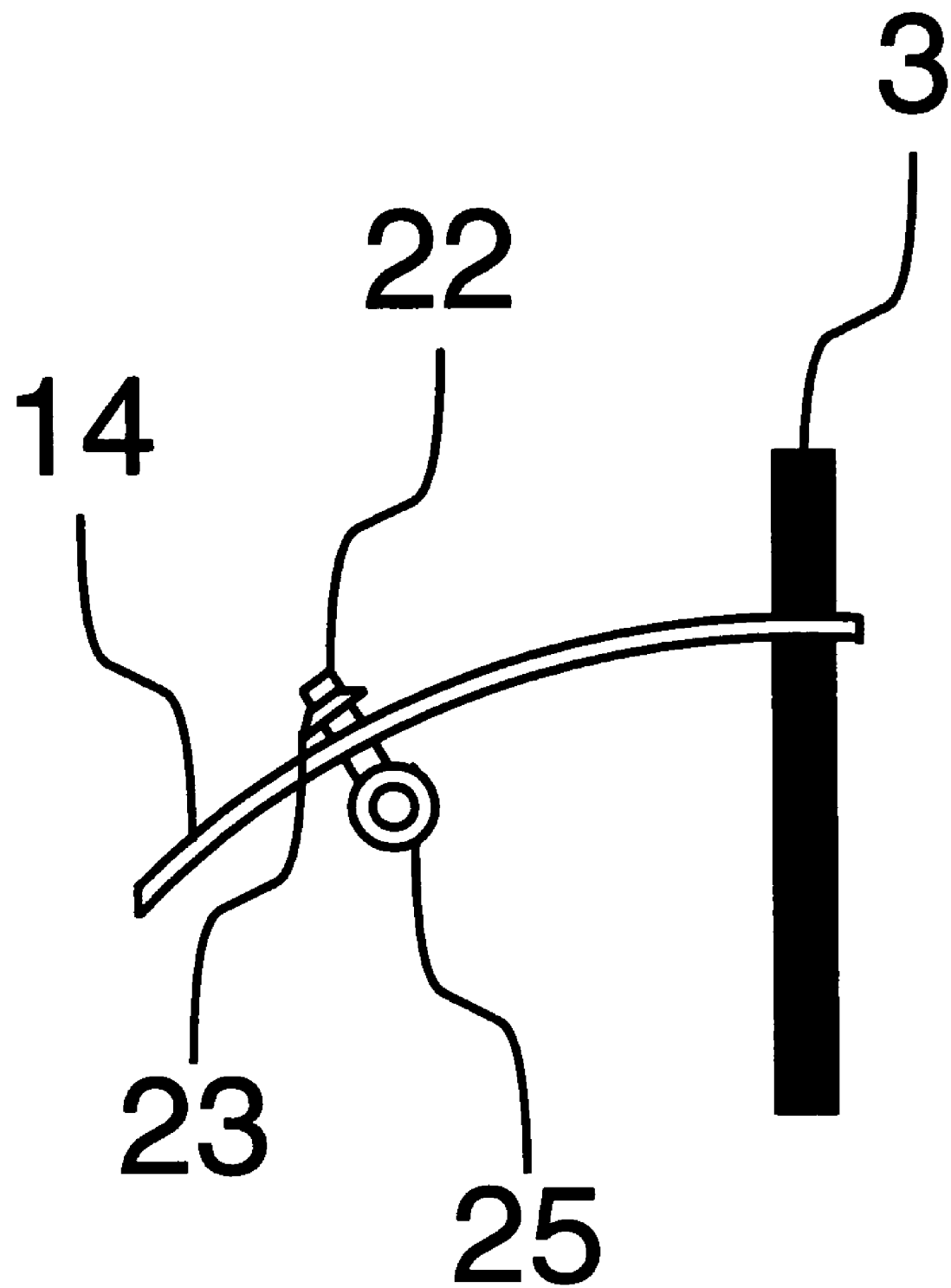
FIG. 20 is an explanation view for a case that a pipe slider is installed on a slider.

For example, as shown in FIG. 15, suppose that a fourth guide rail 14 is in a shape of a bar. In this case, as shown in FIG. 16, a pipe slider 25 can slide smoothly along the fourth guide rail 14 by installing a slider 22 on the pipe slider 25. Note that the pipe slider 25 bends along the fourth guide rail 14. Therefore, the slider 22 can also slide smoothly in a slit 21 of a third guide rails 13. Moreover, as shown in FIG. 17, suppose that a third guide rail 13 is also in a shape of a bar. In this case, as shown in FIG. 18, if two pipe sliders 25 are connected by a concatenation shaft 24, the pipe sliders 25 can slide smoothly along the guide rails, by rotating freely centering around the concatenation shaft 24. Note that the pipe sliders 25 bend along the guide rails, respectively. In addition, as shown in FIG. 19, suppose that a third guide rail 13 is in a shape of a bar, and a fourth guide rail 14 provides a slit 21. In this case, as shown in FIG. 20, since a pipe slider 25 slides along the third guide rail 13, a slider 22 installed on the pipe slider 25 can slide smoothly in the slit 21 of the fourth guide rail 14, where the pipe slider 25 bends along the third guide rail 13.

As is clear from FIG. 1 to FIG. 20, note that an enforcement form of a rotation system with three degrees of freedom for an invention described in the tenth invention can take out all wires from a rotor 1, without twining at least one wire round all guide rails, by using an indication bar 3 which is in a shape of a pipe. In this case, these wires comes to an end without adding unnecessary load to all guide rails, by rolling a part of the wires in a shape of a coil. Therefore, since any parts can be installed on the rotor 1, an application area of a rotation system with three degrees of freedom expands widely.

Besides this, an enforcement form of a rotation system with three degrees of freedom for an invention described in the first invention can also slide a pipe slider 25 installed on any place of an indication bar 3 via a concatenation shaft 24 or a bearing along a first guide rail 11 which is in a shape of a bar. Note that the pipe slider 25 bends along the first guide rail 11.

Now, it has been described above about a case that a slider 22 or at least one pipe slider 25 is installed on a indication bar 3, or it is concatenated to the indication bar 3. However, in such a case, the indication bar 3 is unstable because a force is added to the indication bar 3 from one direction. It is explained here about a method that forces are added evenly to the indication bar 3 from two opposite directions.

Figure 22:
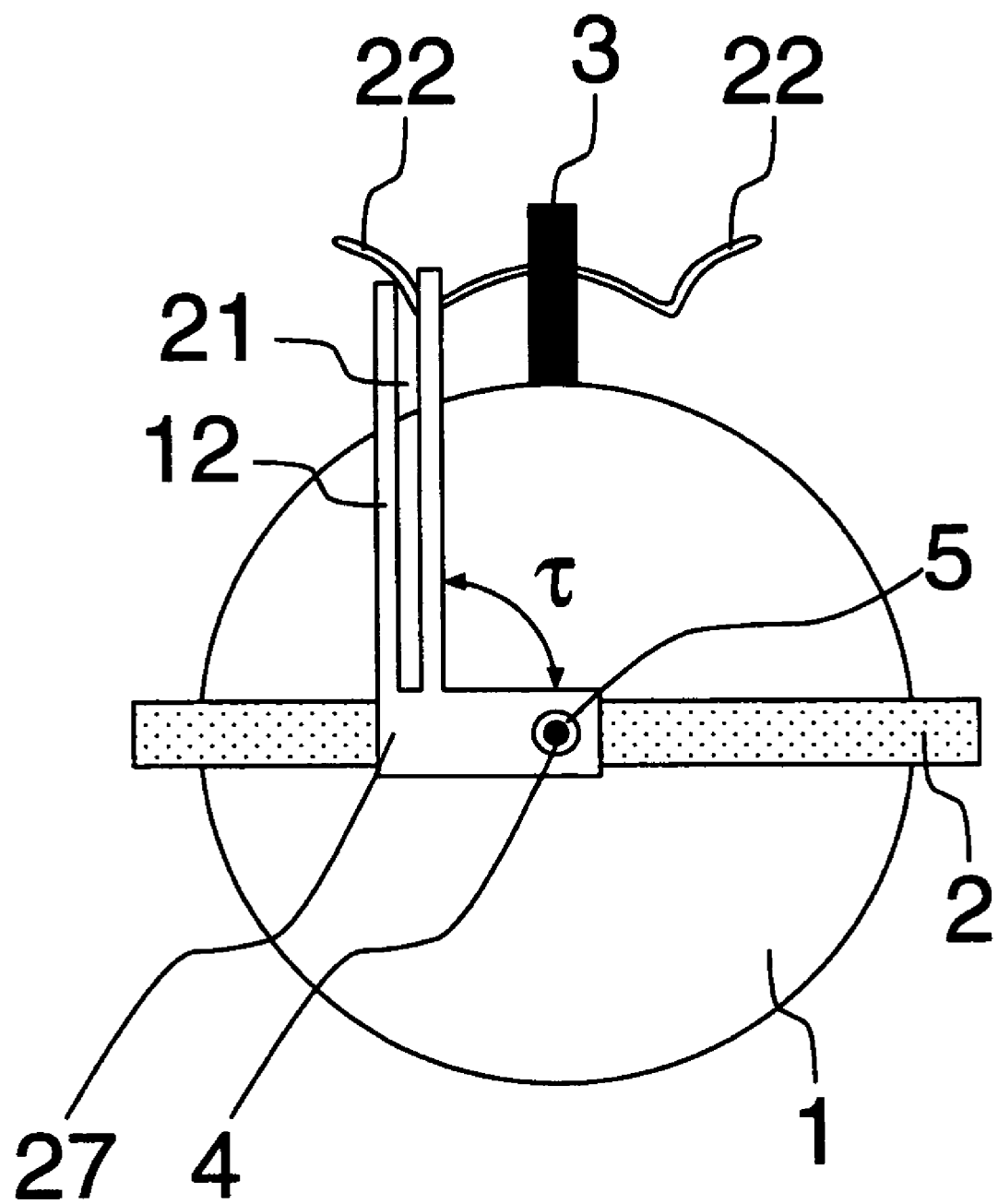
FIG. 22 is an explanation view for a slider passing through a slit of a second guide rail.
Figure 23:
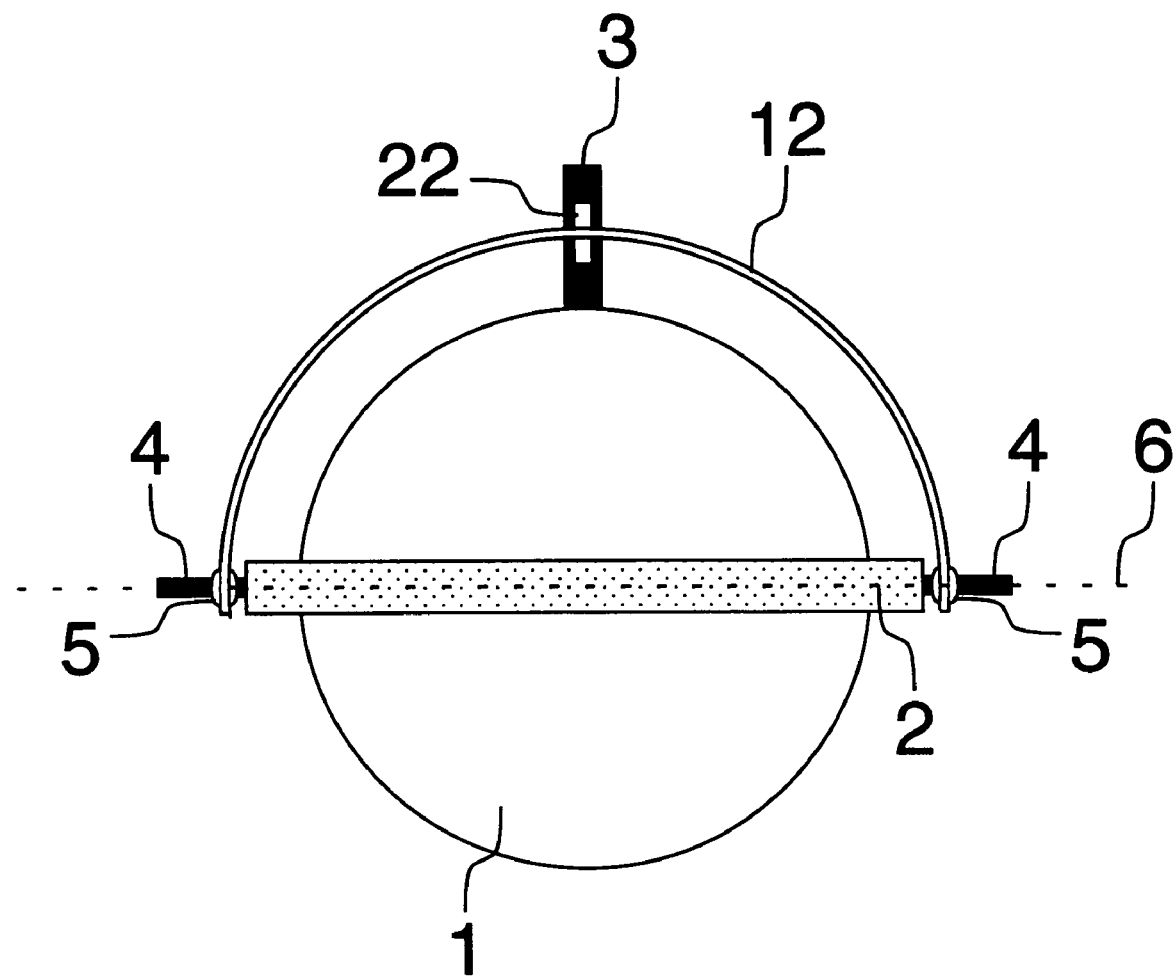
FIG. 23 is an explanation view for a second guide rail installed on a base.
Figure 24:
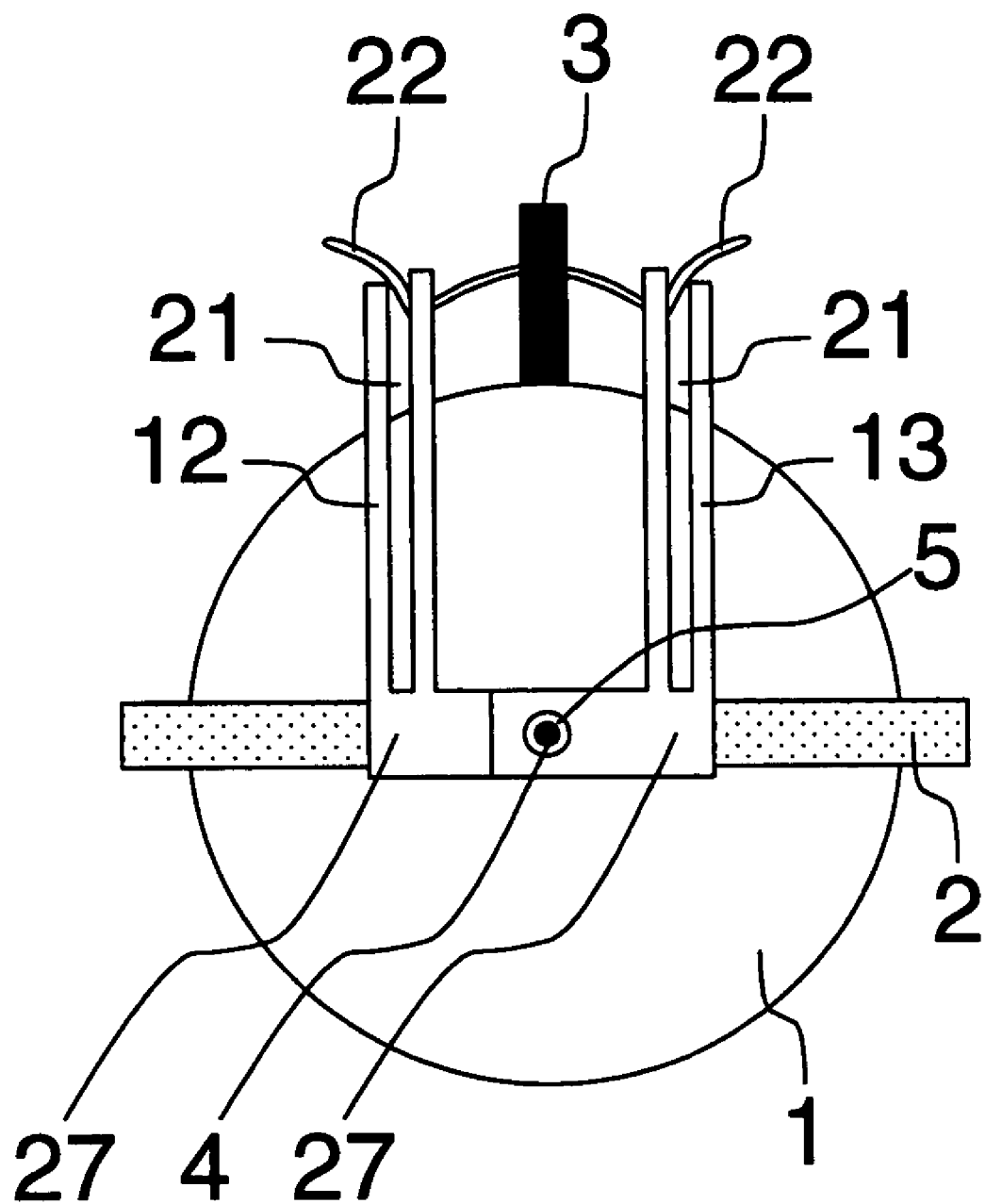
FIG. 24 is an explanation view for a slider passing through a slit of a third guide rail.

First, as shown in FIG. 21, two sliders 22 whose terminals are bent toward the outside are installed on an indication bar 3. Here, some parts of each slider 22 installed on the indication bar 3 can have any sections, while these parts had better be bent circularly along a surface of a rotor 1. On the other hand, terminals of the sliders 22 are in a shape of a bar. An angle made by the terminals is set up 180 degrees or less a little, centering around the indication bar 3. Next, after a slider 22 was passed through a slit 21 of a second guide rail 12 as shown in FIG. 22, the second guide rail 12 is installed on a base 2, similarly to a first guide rail 11, as shown in FIG. 23. It is here good for an installation part 27 of the second guide rail 12 and the slit 21 to be formed as the base 2 and the slit 21 make orthogonal. Note that although FIG. 22 shows a case that an angle $\tau$, which the slit 21 and the installation part 27 make, becomes 90 degrees, it can prevent the installation part 27 from protruding much toward a lower side of the base 2 if the angle $\tau$ is designed so as to be over 90 degrees during rotation of the second guide rail 12. Moreover, the slit 21 had better be inclined toward the outside as the slider 22 slides smoothly. Finally, as shown in FIG. 24, suppose that a third guide rail 13 is installed on the base 2, similarly to the second guide rail 12. In this case, these guide rails may be installed on the base 2 in a shape of a nest, or they may be installed on the base 2 alternatively.

Now, as shown in FIG. 24, suppose that a second guide rail 12 and a third guide rail 13 make parallel. In this case, if two sliders 22 slide in slits 21 of these guide rails, respectively, an indication bar 3 also can move parallel to these guide rails. Moreover, the indication bar 3 does not rotate centering around its extension line because a gap of these guide rails is constant. Consider here a case that these guide rails rotate centering around a rotation axis 6 passing through two shafts 4, where the gap keeps constant. If the rotor 1 rotates centering around the rotation axis 6, two sliders 22 installed on the indication bar 3 push and pull these guide rails. Therefore, these guide rails also rotate only with the same rotation angle as one of the rotor 1, centering around the rotation axis 6. Oppositely, in a case that these guide rails rotate centering around the rotation axis 6, these guide rails push and pull the sliders 22. Therefore, the rotor 1 also rotates only with the same rotation angle as one of these guide rails, centering around the rotation axis 6.

Consider here a case that a second guide rail 12 and a third guide rail 13 rotate independently. In this case, a gap of these guide rails becomes wide or narrow. When a gap of these guide rails becomes wide by rigidity of two sliders 22, an indication bar 3 rotates toward a direction that an angle $\theta$, which the sliders 22 and these guide rails make (refer to FIG. 1 and FIG. 2), approaches to 90 degrees. Oppositely, in a case that a gap of these guide rails becomes narrow, the indication bar 3 rotates toward a direction that an angle $\theta$, which the sliders 22 and the guide rails make, approaches to 0 degrees. Therefore, when a rotor 1 rotated centering around an extension line of the indication bar 3, an angle made by these guide rails becomes big or small according to a rotation direction. In addition, by making an angle made by these guide rails big or small, the rotor 1 can also rotate centering around an extension line of the indication bar 3. The rotor 1 here can rotate within a range of 0 degree to 180 degrees for these guide rails. In a case of using only the difference of rotation angles of these guide rails, however, a rotation angle can be specified within only a range of 0 degree to 90 degrees. Then, by making an angle made by terminals of the sliders 22 a little smaller than 180 degrees, centering around the indication bar 3, we can stop that the rotor 1 rotates over 90 degrees even though the gap of these guide rails became the biggest.

Now, in a case that a second guide rail 12 and a third guide rail 13 rotate independently, a problem that a gap of these guide rails varies happens according to a position of an indication bar 3 even though the difference of rotation angles of these guide rails is constant. If such a change can be corrected by using a computer system and so on, there are no serious problems. Otherwise, a certain compensation means is desired. In order to make a slit 21 of these guide rails parallel to a base 2, therefore, a second guide rail 12 and a third guide rail 13 bent like a shape of a character, bracket are used, as shown in FIG. 9. By bending these guide rails like this, these guide rails move parallel along an arc centering around a rotation axis 6 even though these guide rails rotate independently centering around the rotation axis 6. Therefore, if the difference of rotation angles of these guide rails is constant, a gap of these guide rails also keeps constant in spite of a position of the indication bar 3. Note that a transfer area of the indication bar 3 becomes narrow.

It has been described above about a case that two sliders 22 bent toward the outside, as shown in FIG. 21, were used. Instead of this, however, two sliders 22 bent toward the inside, as shown in FIG. 25, may be used. Note that, in this case, each slider 22 passes through these slits 21 from the outside of a second guide rail 12 and a third guide rail 13.

Figure 26:
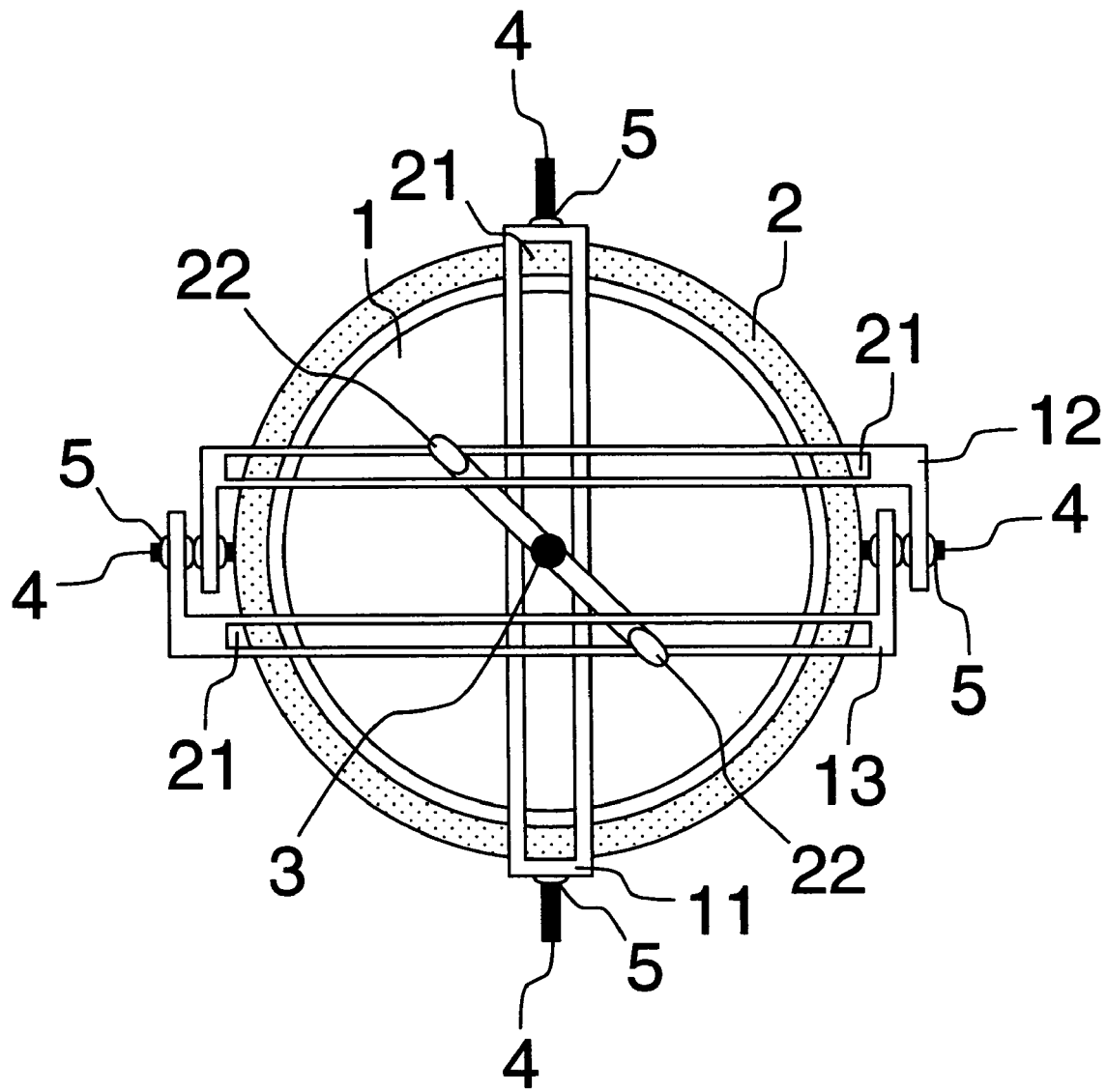
FIG. 26 is an explanation view for a rotation system with three degrees of freedom, in which a second guide rail and a third guide rail are installed on a base alternately.
Figure 27:
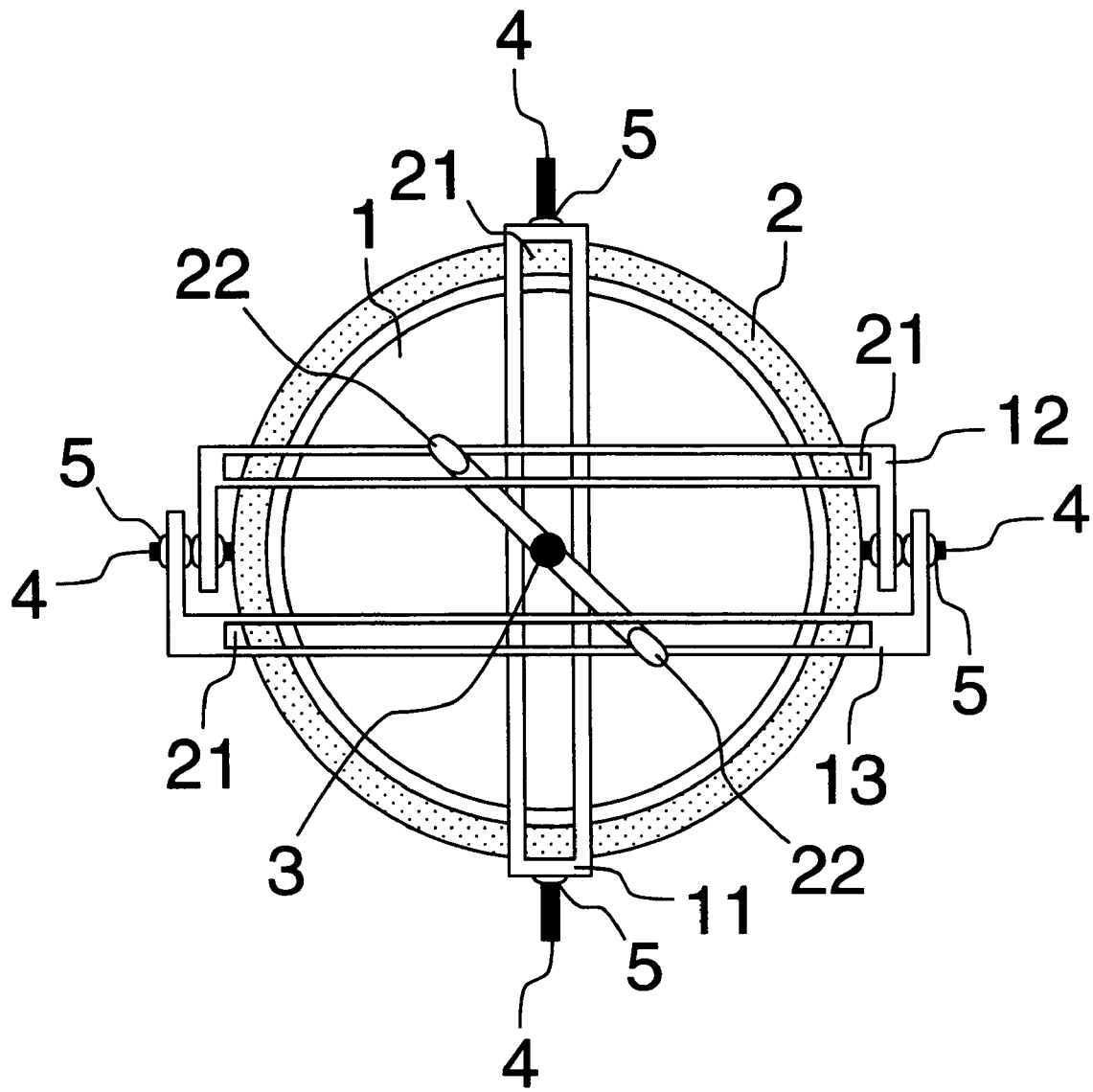
FIG. 27 is an explanation view for a rotation system with three degrees of freedom, in which a third guide rail is installed on a base so as to be located at the outside of a second guide rail.

As shown in FIG. 26 and FIG. 27, then, an enforcement form of a rotation system with three degrees of freedom for an invention described in claim 4 has a first guide rail 11, and a second guide rail 12 and a third guide rail 13, which are orthogonal. In particular, in an enforcement form of a rotation system with three degrees of freedom for an invention described in claim 11, all shafts 4 are installed on a base 2. Note that, in FIG. 26, the second guide rail 12 and the third guide rail 13 are installed on the base 2 alternatively. In addition, in FIG. 27, these guide rails are installed on the base 2 in a shape of a nest. Since two sliders 22 as shown in FIG. 21 are used in FIG. 26 and FIG. 27, a first guide rail 11 is installed at the inside of the second guide rail 12 and the third guide rail 13. The reason is that it prevents terminals of the sliders 22 from getting caught on the first guide rail 11. Therefore, in a case that two sliders 22 as shown in FIG. 25 were used, a first guide rail 11 had better be installed at the outside of the second guide rail 12 and the third guide rail 13. In addition, as shown in FIG. 26 and FIG. 27, in a case that the second guide rail 12 and the third guide rail 13 make parallel, suppose that these guide rails are installed on a base 2 as the sliders 22 incline 45 degrees against these guide rails. We can here calculate easily a rotation angle of a rotor 1 centering around an extension line of an indication bar 3, from the difference of rotation angles of these guide rails.

It has been described above about a case that four shafts 4 were embedded in a base 2 or a case that they were cut out from the base 2. However, at least one of the shafts 4 may be installed on or formed as either one terminal of a first guide rail 11, a second guide rail 12 and a third guide rail 13. In this case, at least one bearing 5 is installed on a position of at least one shaft 4 to be installed on the base 2. Suppose here that a ball bearing is used for a bearing 5 installed on the base 2. In this case, it becomes difficult for some of these guide rails, which the shafts 4 were installed on, to separate from a base 2, moreover assembly of a rotation system with three degrees of freedom becomes easily. In particular, an enforcement form of a rotation system with three degree of freedom for an invention described in the twelfth invention shows effect when a second guide rail 12 and a third guide rail 13 are alternative. On the other hand, an enforcement form of a rotation system with three degrees of freedom for an invention described in claim 13 shows effect when a second guide rail 12 and a third guide rail 13 are in a shape of a nest.

Now, although an enforcement form of a rotation system with three degrees of freedom for an invention described in the fourth invention can rotate a rotor 1 in spite of the small number of parts, there is three following problem: First, a form of two sliders 22 is complex. Second, since an area at which the sliders 22 contacts with a second guide rail 12 and a third guide rail 13 is narrow, the sliders 22 slip easily. Third, since an indication bar 3 staggers in a slit 21 of a first guide rail 11, the rotor 1 can not be stabilized. In order for the rotation system with three degrees of freedom to rotate the rotor 1 stably, therefore, two sliders 22 processed with fine accuracy are desired. As a result, the rotation system with three degrees of freedom becomes expensive. It is explained here about a rotation system with three degrees of freedom which does not use the sliders 22 whose shape is complex.

Figure 28:
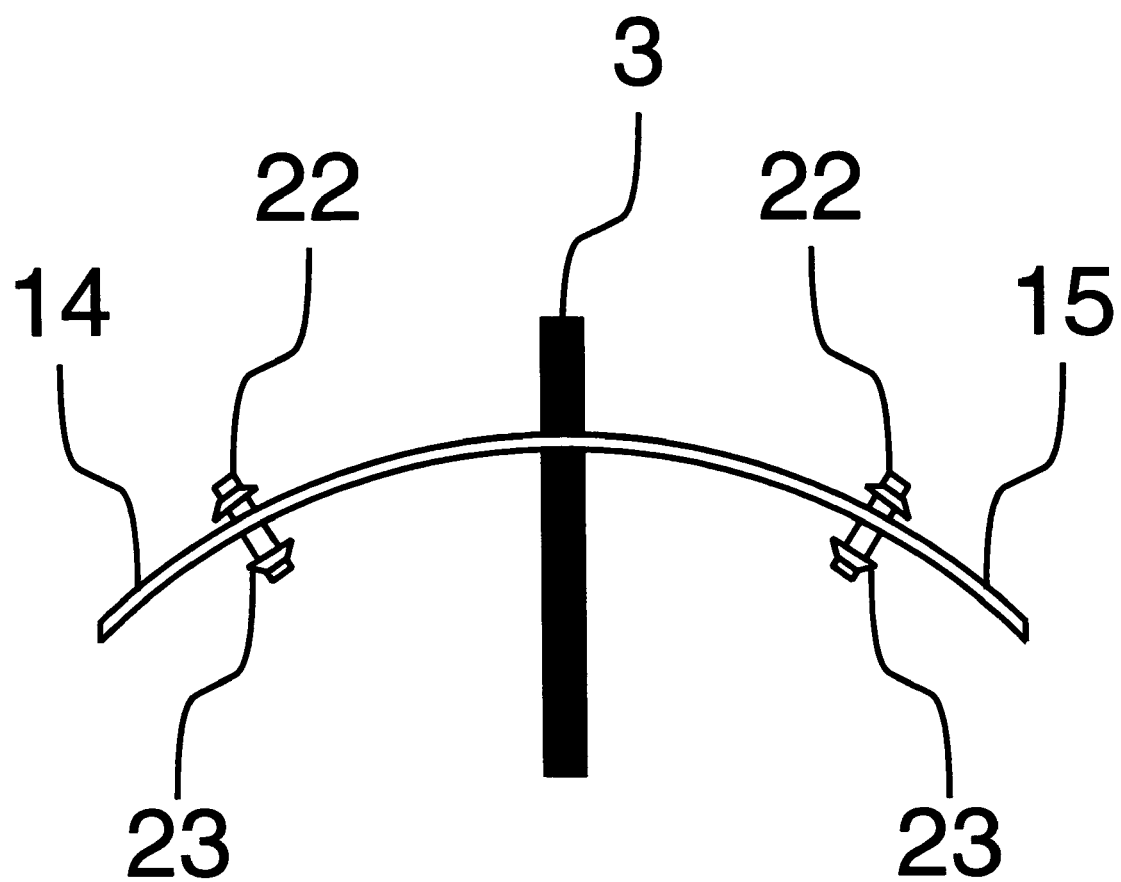
FIG. 28 is an explanation view for a case that a fourth guide rail and a fifth guide rail are installed on an indication bar.

First, as shown in FIG. 28, a fourth guide rail 14 and a fifth guide rail 15 bent in a shape of an arc along a surface of a rotor 1 is installed on an indication bar 3. Here, these guide rails may be made from a plate, or each guide rail may be installed on the indication bar 3. Slits 21 are opened in these guide rails, respectively, and a slider 22 slides in each slit 21. Note that both terminals of each slider 22 are processed so as to swell out, or as shown in FIG. 28, stoppers 23 are installed on the both terminals. Therefore, the sliders 22 do not get out of the slits 21. Next, suppose that a first guide rail 11 and a second guide rail 12 share a bearing 5 at each of both terminals of them, and are installed on the corresponding shafts 4. Here, as shown in FIG. 23, these guide rails are bent in a shape of an arc along a surface of a rotor 1. Moreover, as shown in FIG. 22, these guide rails are adhered or made from a plate so as to make a part of these guide rails bent in a shape of an arc vertical against a base 2 Therefore, these guide rails become parallel.

Figure 29:
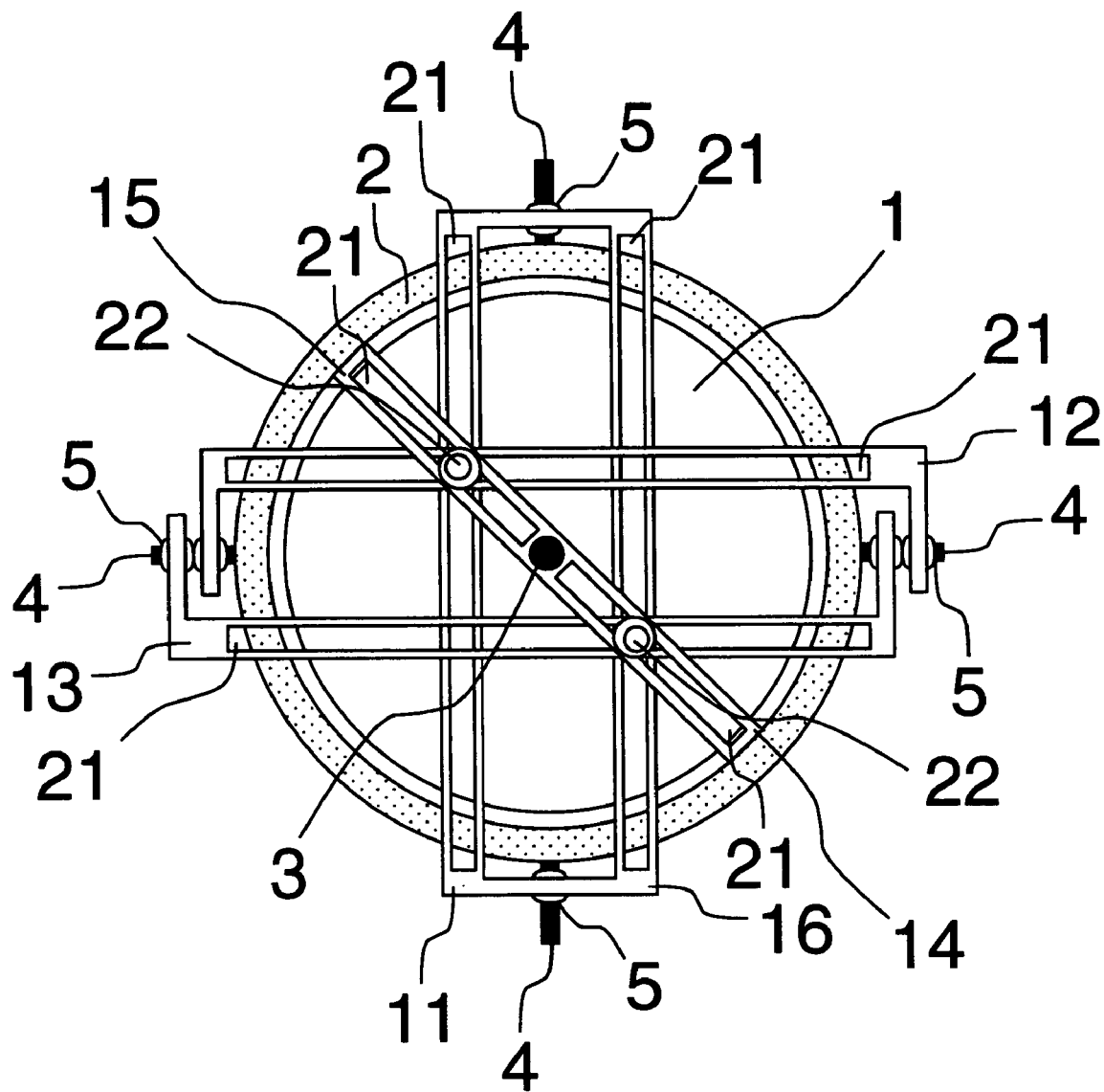
FIG. 29 is an explanation view for a case that a first guide rail and a sixth guide rail are installed on a base, in a body.

As shown in FIG. 29, then, in an enforcement form of a rotation system with three degrees of freedom for an invention described in the seventh invention, a first guide rail 11 overlaps a cross point of a second guide rail 12 and a fifth guide rail 15, a sixth guide rail 16 overlaps a cross point of a third guide rail 13 and a fourth guide rail 14, moreover a slider 22 is installed on each cross point. Of course, sliders 22 may be installed on the cross point of the second guide rail 12 and the fourth guide rail 14, and the cross point of a third guide rail 13 and the fifth guide rail 15, respectively. Suppose here that inclination of these guide rails is adjusted as extension lines of the sliders 22 pass through a center of a rotor 1. In this case, since the sliders 22 always become vertical against these guide rails, the sliders 22 can slide smoothly in slits 21 of these guide rails. That is, since the fifth guide rail 15 and the fourth guide rail 14 rotate centering around the corresponding shafts 4, the sliders 22 slide in a slit 21 of the second guide rail 12 and a slit 21 of the third guide rail 13, respectively. Therefore, the rotor 1 can also rotate centering around the shafts 4. In addition, since the second guide rail 12 and the third guide rail 13 rotate centering around the corresponding shafts 4, the sliders 22 slide in a slit 21 of the fifth guide rail 15 and a slit 21 of the fourth guide rail 14, respectively. Therefore, the rotor 1 can also rotate centering around the shafts 4. Moreover, the sliders 22 slide in the fifth guide rail 15 and the fourth guide rail 14, respectively, by varying a gap of the second guide rail 12 and the third guide rail 13, the rotor 1 can rotate centering around an indication bar 3. In addition, the sliders 22 slide in a slit 21 of the first guide rail 11 and a slit 21 of the sixth guide rail 16, respectively. Therefore, the rotor 1 can rotate centering around an indication bar 3.

By the way, the slits 21 overlap triply at a place of each slider 22. Therefore, in a case that at least one of these guide rails rotates centering around shafts 4, respectively, load is charged for only a part of the sliders 22. The guide rails, thus, are possible to bend. It is explained here about a method of controlling distortion of these guide rails.

Figure 30:
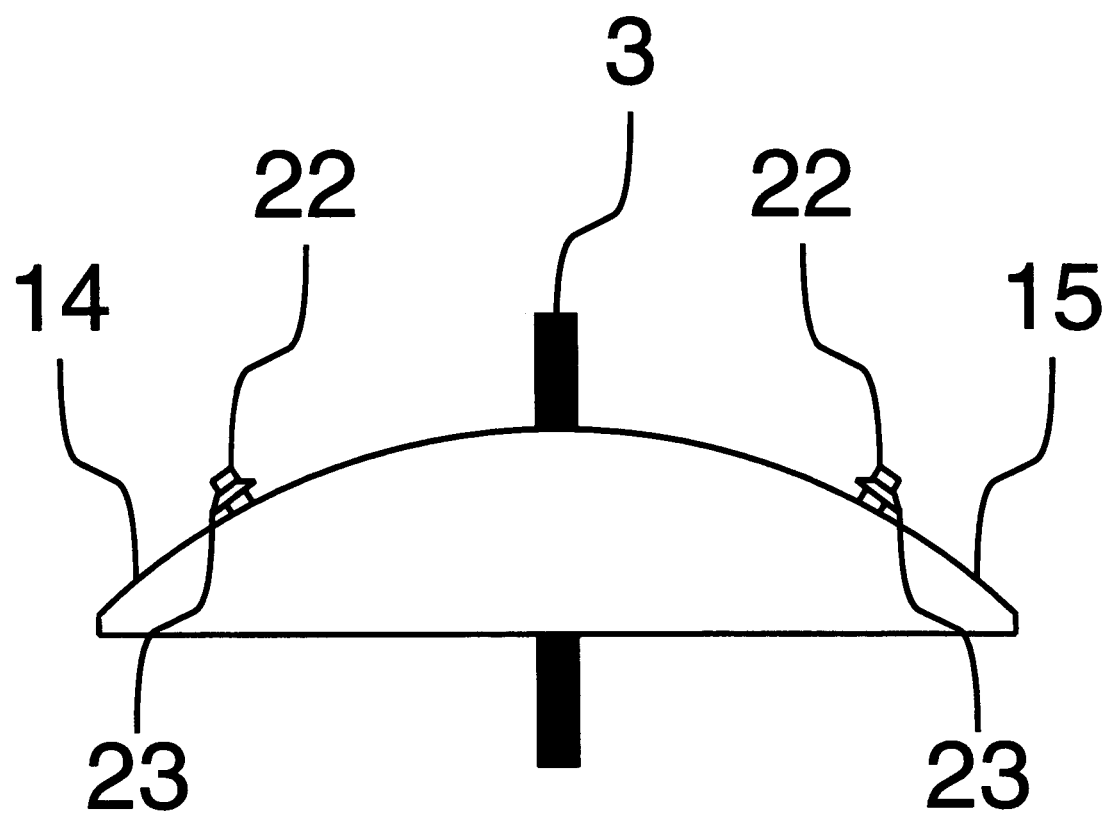
FIG. 30 is an explanation view for a case that a fourth guide rail and a fifth guide rail are formed in a shape of an umbrella.

First, as shown in FIG. 30, a fourth guide rail 14 and a fifth guide rail 15 are formed in a shape of an umbrella. Therefore, terminals of the guide rails do not bend. This method is the simplest, and extremely effective because it can control distortion of other guide rails together.

Figure 31:
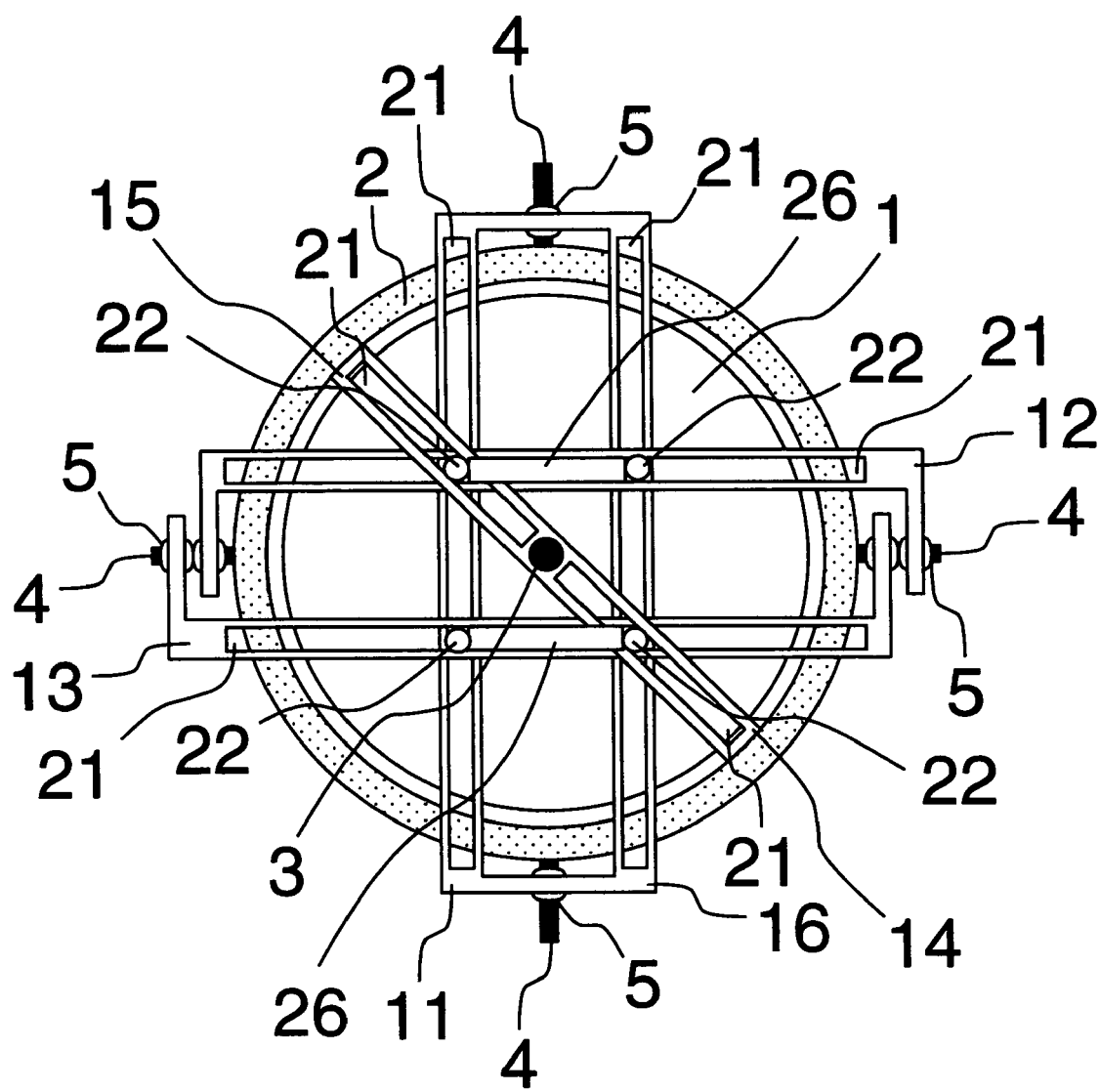
FIG. 31 is an explanation view for a case that two pairs of sliders are concatenated by concatenation shafts, respectively, for FIG. 29.

Next, as shown in FIG. 31, in an enforcement form of a rotation system with three degrees of freedom for an invention described in the seventh invention, a first guide rail 11 overlaps a cross point of a second guide rail 12 and a fifth guide rail 15, a sixth guide rail 16 overlaps a cross point of a third guide rail 13 and a fourth guide rail 14. Moreover, sliders 22 are installed on the cross point of the second guide rail 12 and the first guide rail 11, and the cross point of a third guide rail 13 and the first guide rail 11, the cross point of the second guide rail 12 and the sixth guide rail 16, and the cross point of a third guide rail 13 and the sixth guide rail 16, respectively. Suppose here that inclination of these guide rails is adjusted as extension lines of the sliders 22 pass through a center of a rotor 1. Moreover, one side of terminal of each of two sliders 22, which slides in a slit 21 of the second guide rail 12, is concatenated with each other by a concatenation shaft 26. Similarly, one side of terminal of each of two sliders 22, which slides in a slit 21 of the third guide rail 13, is concatenated with each other by another concatenation shaft 26. Therefore, since the first guide rail 11 and the sixth guide rail 16 do not bend, the slits 21 of these guide rails keep parallel. In addition, since the fourth guide rail 14 and the fifth guide rail 15 do not bend, the rotor 1 rotates precisely centering around an indication bar 3.

Figure 32:
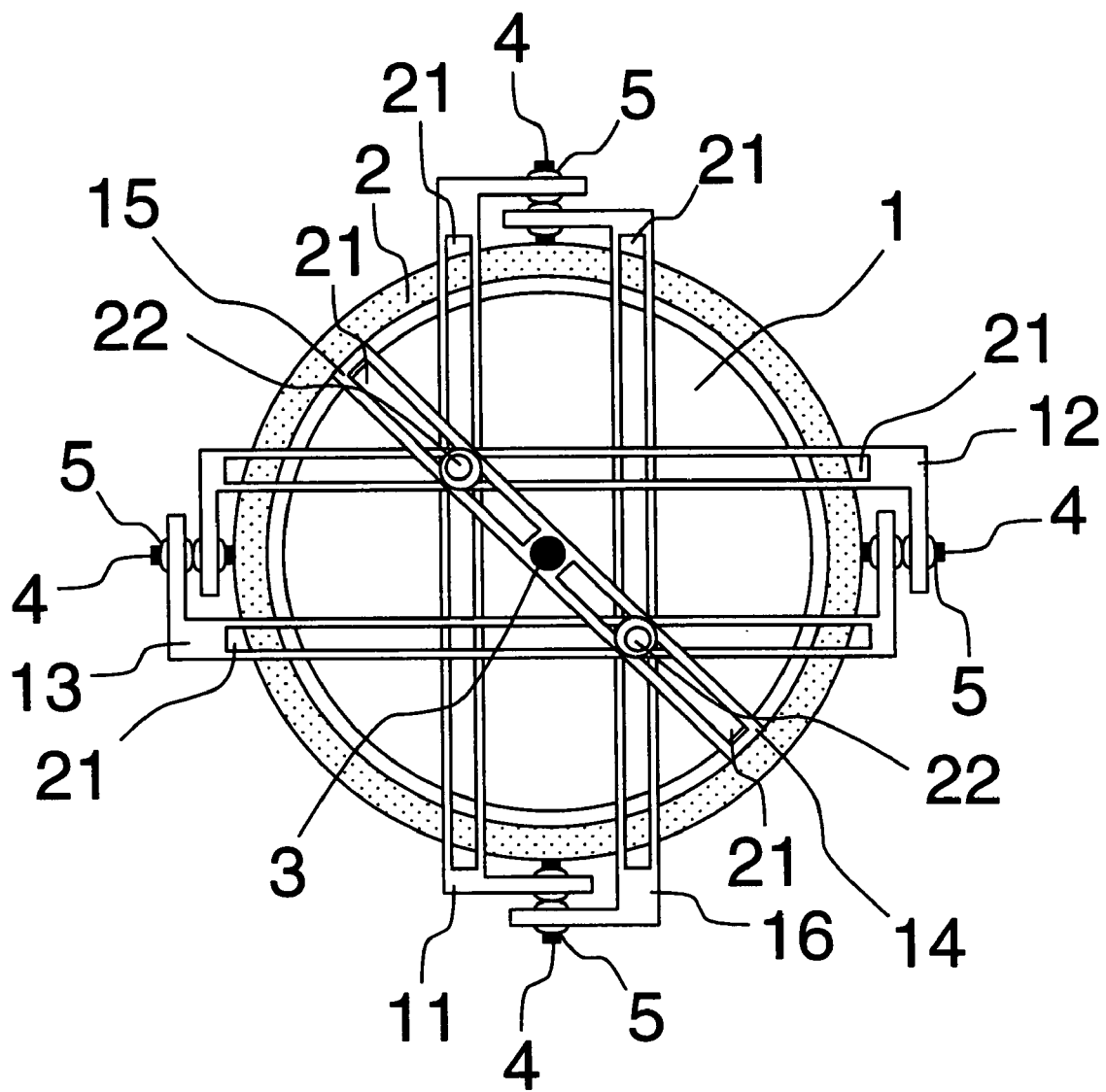
FIG. 32 is an explanation view for a case that a first guide rail and a sixth guide rail are installed individually on a base, respectively, for FIG. 29.

Besides this, as shown in FIG. 32, an enforcement form of a rotation system with three degrees of freedom for an invention described in the seventh invention rotates independently a first guide rail 11 and a sixth guide rail 16, respectively. Therefore, by rotating a first guide rail 11, a second guide rail 12, a third guide rail 13 and a sixth guide rail 16 finely, the rotation system with three degrees of freedom can rotate a rotor 1 with three degrees of freedom, without bending all guide rails. Oppositely, in a case that the rotor 1 rotated with three degrees of freedom, a first guide rail 11, a second guide rail 12, a third guide rail 13 and a sixth guide rail 16 rotate independently. Therefore, forces added to these guide rails via two sliders 22 can be distributed.

Now, it has been described above about a case that slits 21 are opened in all guide rails. In this case, all sliders 22 slide in slits 21 of these guide rails. However, the sliders 22 can slide along the guide rails even though the slits 21 do not exist. It is explained here about a case that at least one of the guide rails is in a shape of a bar.

Figure 33:
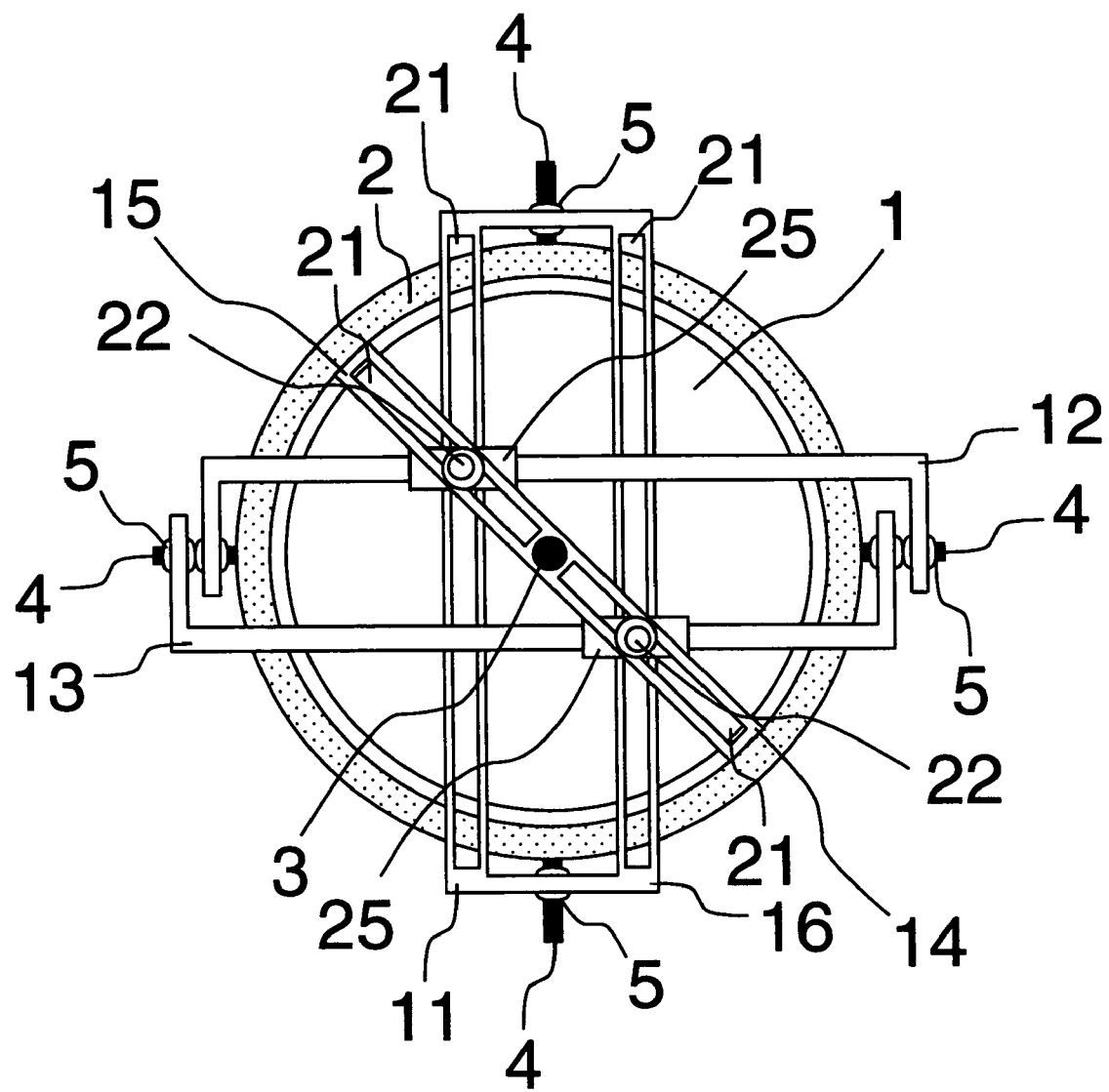
FIG. 33 is an explanation view for a case that two pipe sliders slide along a second guide rail and a third guide rail whose shape is like a bar, respectively, for FIG. 29.

For example, as shown in FIG. 33, suppose that a second guide rail 12 and a third guide rail 13 are in a shape of a bar. In this case, in an enforcement form of a rotation system with three degrees of freedom for an invention described in the seventh invention, two sliders 22 slide along these guide rails. Here, each slider 22 has a pipe slider 25, and these guide rails pass through the pipe sliders 25, respectively. Since each pipe slider 25 installs at least one roll body at the inside of it, the pipe sliders 25 can slide smoothly along the guide rails, respectively. Note that the pipe sliders 25 are processed in a shape of an arc along these guide rails. Therefore, when a gap of these guide rails is big, the sliders 22 slide along a first guide rail 11 and a sixth guide rail 16, respectively. That is, the sliders 22 slide along a fifth guide rail 15 and a fourth guide rail 14. As a result, a rotor 1 rotates clockwisely. Oppositely, when a gap of the second guide rail 12 and the third guide rail 13 are small, the rotor 1 rotates counter-clockwisely. In a case that the pipe sliders 25 were used like this, the pipe sliders 25 show effect similar to two concatenation shafts 26, as shown in FIG. 31, Therefore, the guide rails do not bend. Here, since the concatenation shafts 26 are not desired, a fourth guide rail 14 and a fifth guide rail 15 can be processed in a shape of an umbrella.

Figure 34:
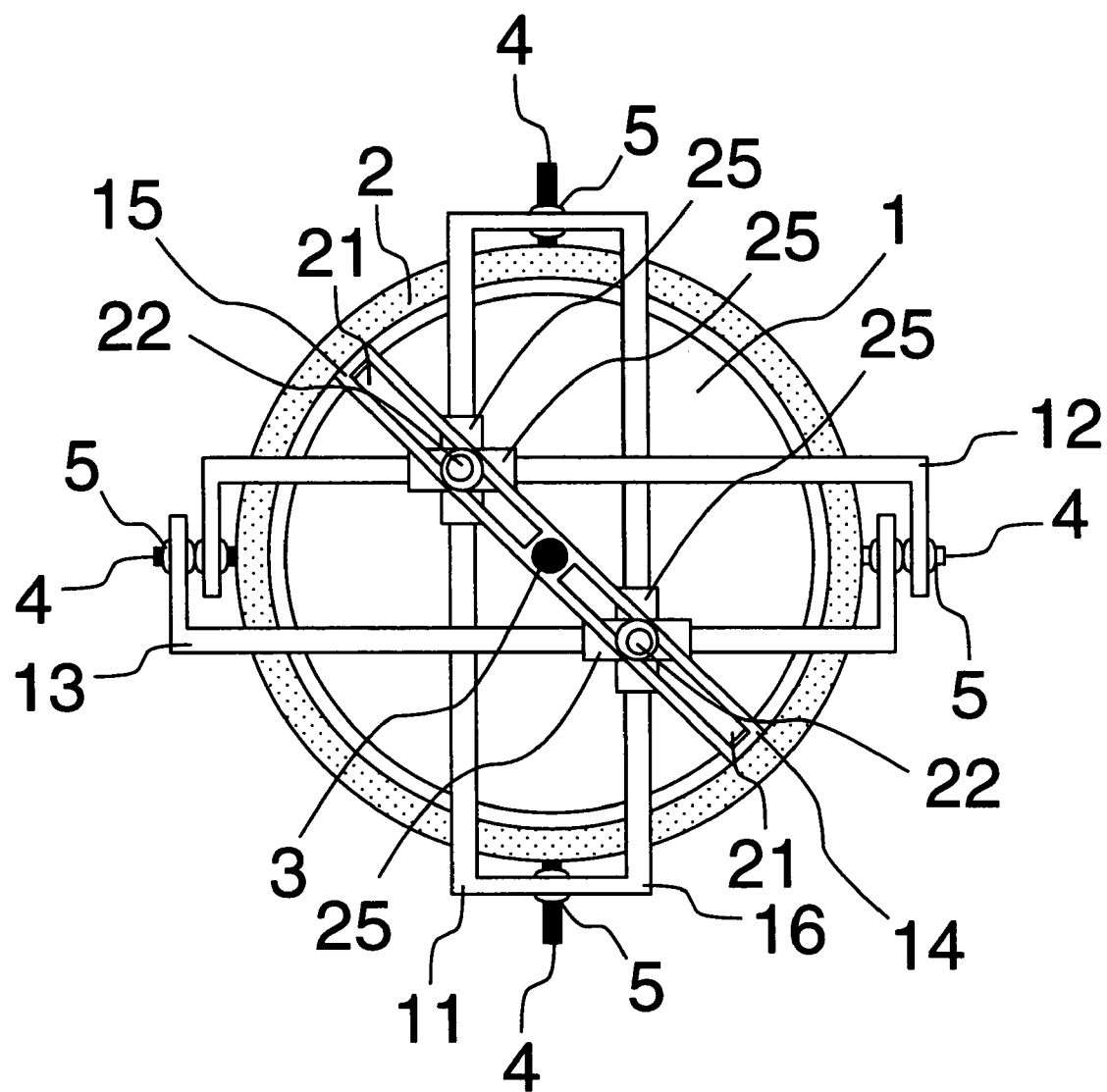
FIG. 34 is an explanation view for a case that two pipe sliders slide along a first guide rail and a sixth guide rail whose shape is like a bar, respectively, for FIG. 33.

As shown in FIG. 34, moreover, in a case that a first guide rail 11, a second guide rail 12, a third guide rail 13 and a sixth guide rail 16 are in a shape of a bar, two pipe sliders 25 are installed to each slider 22 so as to be orthogonal. Note that the pipe sliders 25 are processed in a shape of an arc along the guide rails. Therefore, the guide rails do not bend, moreover an extension line of each slider 22 always passes through a center of a rotor 1. Of course, if a fourth guide rail 14 and a fifth guide rail 15 are processed in a shape of an umbrella, these guide rails also do not bend.

Figure 35:
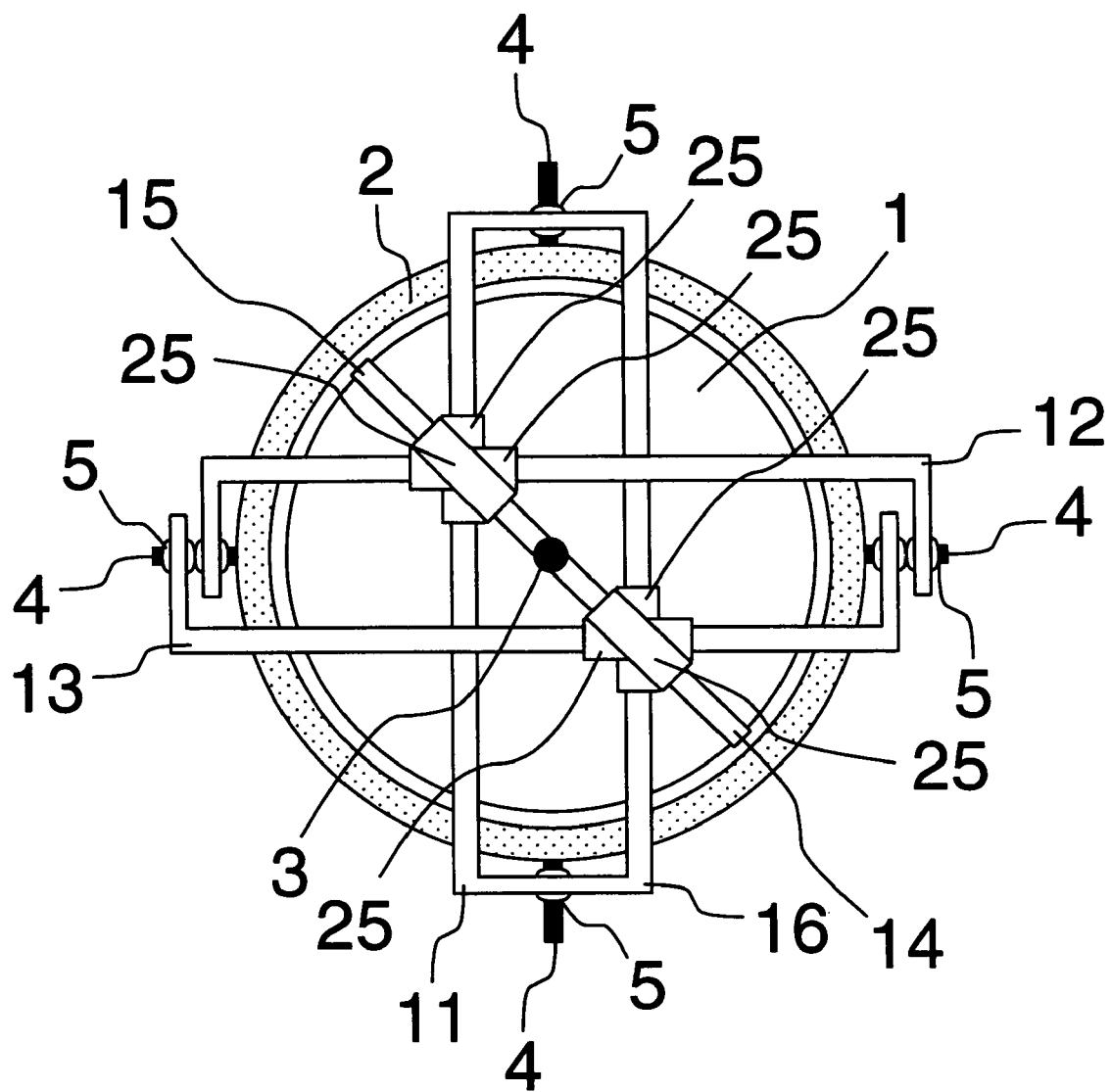
FIG. 35 is an explanation view for a case that two pipe sliders slide along a fourth guide rail and a fifth guide rail whose shape is like a bar, respectively, for FIG. 34.
Figure 36:
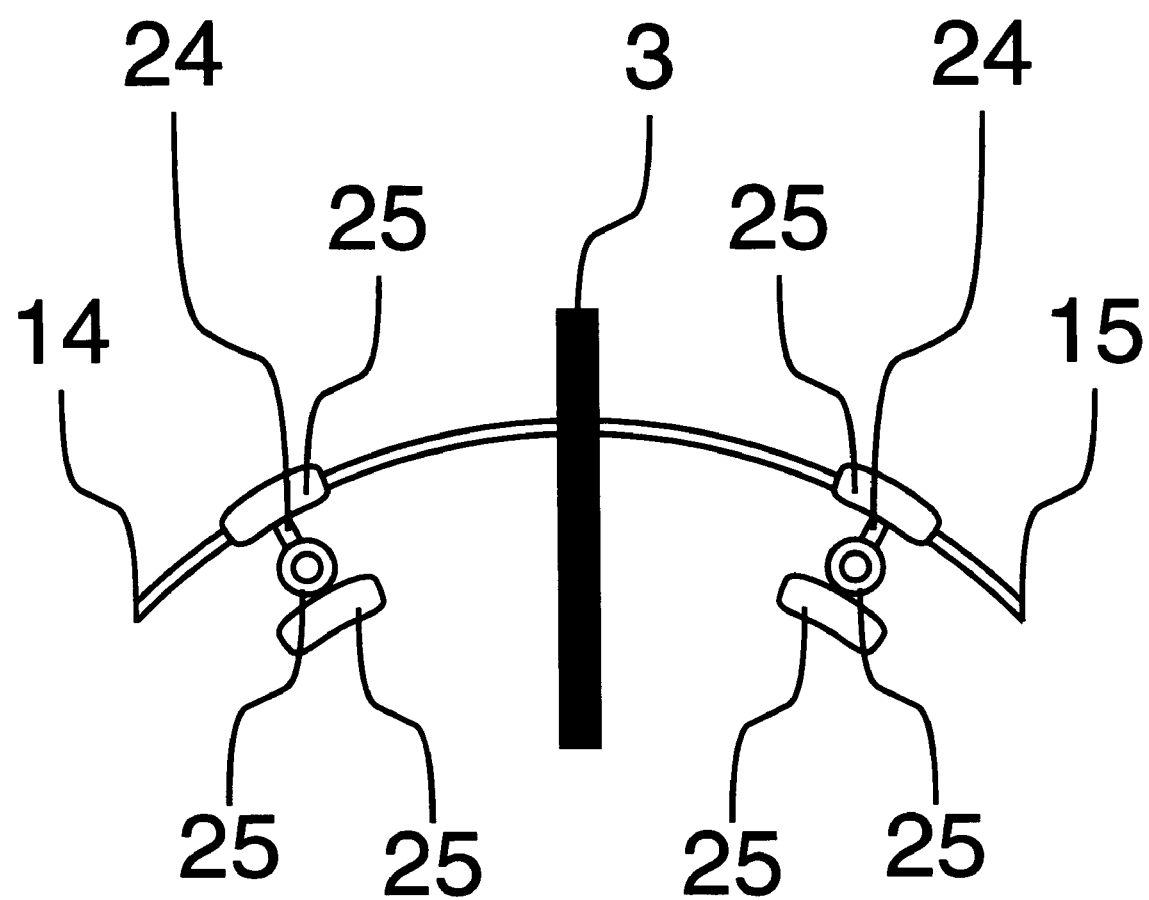
FIG. 36 is an explanation view for a case that two pipe sliders slide along a fourth guide rail and a fifth guide rail whose shape is like a bar, respectively, and two other pipe slides are concatenated with each of the pipe sliders by concatenation shafts, respectively.

By the way, what happens when a fourth guide rail 14 and a fifth guide rail 15 are in a shape of a bar. For example, in a case that first to sixth guide rails are in a shape of a bar, as shown in FIG. 35, an enforcement form of a rotation system with three degrees of freedom for an invention described in the seventh invention uses two sliders 22 installing three pipe sliders 25, respectively. Note that a rotor 1 can not rotate in a case that the pipe sliders 25 were fixed because directions of the fifth guide rail 15 and the fourth guide rail 14 are constant even though a gap of the second guide rail 12 and the third guide rail 13 varies. As shown in FIG. 36, suppose then that two pipe sliders 25 passing through the fifth guide rail 15 and the fourth guide rail 14 are concatenated with remaining pipe sliders 25 by concatenation shafts 26, respectively. In this case, the pipe sliders 25 passing through the first guide rail 11 and the sixth guide rail 16 can rotate against the remaining pipe sliders 25 each other, centering around the concatenation shafts 26, respectively. Therefore, the rotor 1 can rotate centering around an indication bar 3 if a gap of the second guide rail 12 and the third guide rail 13 varies. Thus, in an enforcement form of a rotation system with three degrees of freedom for an invention described in the seventh invention, suppose that at least one of a first guide rail 11 and a sixth guide rail 16 is in a shape of a bar. If at least one of the remaining guide rails is in a shape of a bar, plurality of pipe sliders 25 have only to be concatenated by the concatenation shaft 26.

For brief explanation, here, it has been described about a rotation system with three degrees of freedom as shown in FIG. 33, FIG. 34 and FIG. 35. Of course, in a case that at least one guide rail is in a shape of a bar, the same number of pipe sliders 25 as these guide rails can be used. If each pipe slider 25 installs at least one roll body at the inside of it, the pipe sliders 25 can slide smoothly along the corresponding guide rails, respectively.

Besides this, as is clear from FIG. 26 to FIG. 35, an enforcement form of a rotation system with three degrees of freedom for an invention described in the tenth invention can take out all wires from a rotor 1, without twining at least one wire round all guide rails, by using an indication bar 3 which is in a shape of a pipe. In this case, these wires comes to an end without adding unnecessary load to all guide rails, by rolling a part of the wires in a shape of a coil. Therefore, since any parts can be installed on the rotor 1, an application area of a rotation system with three degrees of freedom expands widely.

Now, it has been described above about a relation between a slider 22 and the first to sixth guide rails. It is explained here about a detecting method of a rotation angle of a rotor 1 and a driving method of the rotor 1, by using a rotation system with three degrees of freedom, as shown in FIG. 26.

Figure 37:
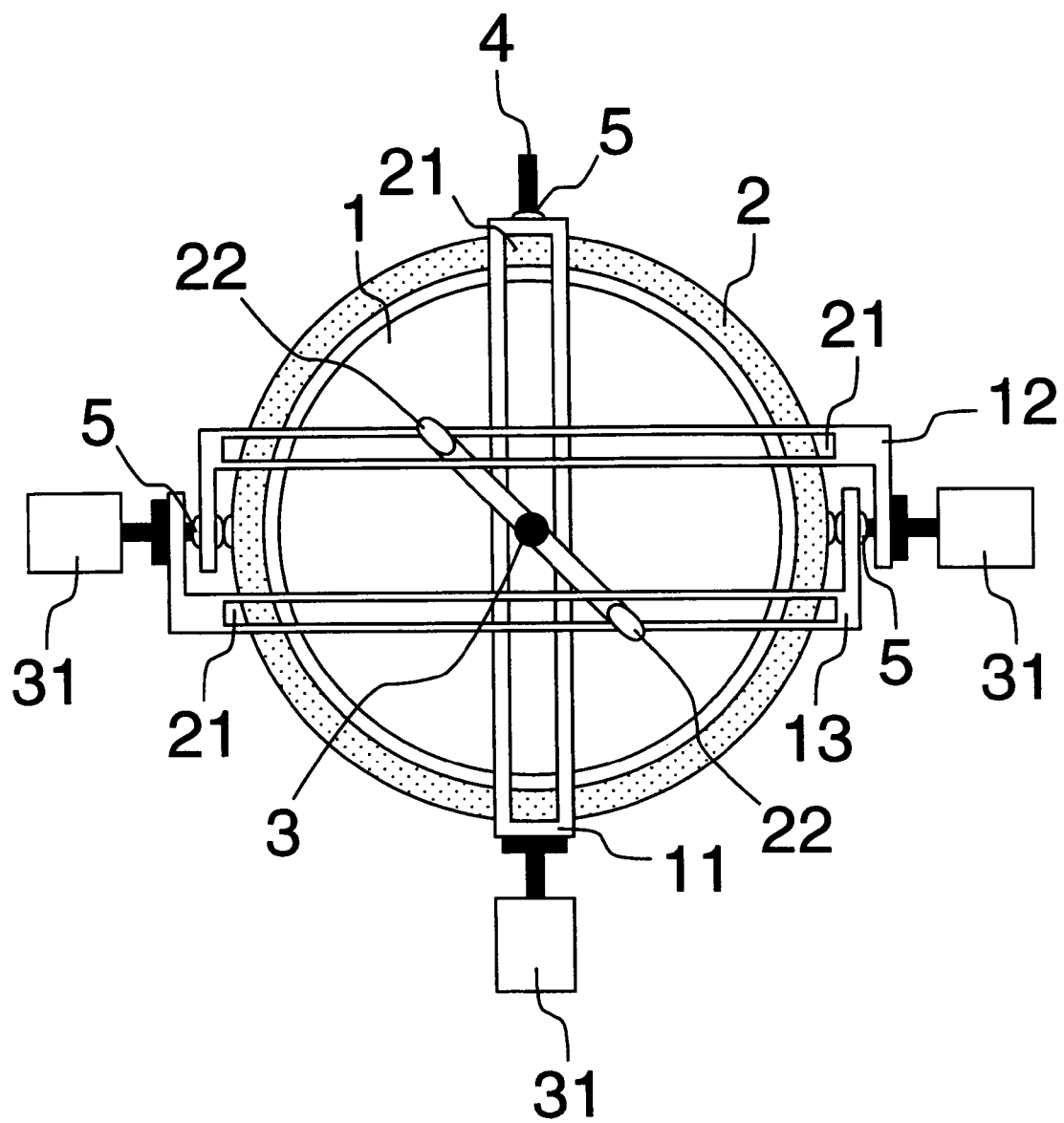
FIG. 37 is an explanation view for a case that encoders are connected directly with a first guide rail, a second guide rail and a third guide rail, for FIG. 26.

As shown in FIG. 37, in an enforcement form of a rotation system with three degrees of freedom for an invention described in the fourteenth invention, suppose that at least one shaft 4 is installed on at least one terminal, for each of a first guide rail 11, a second guide rail 12 and a third guide rail 13. In this case, plurality of encoders 31 and plurality of actuators and so on are installed on the shafts 4 easily. Of course, in a case that the shafts 4 is not installed directly on these guide rails, the encoders 31 and the actuators may be installed directly on these guide rails.

Figure 38:
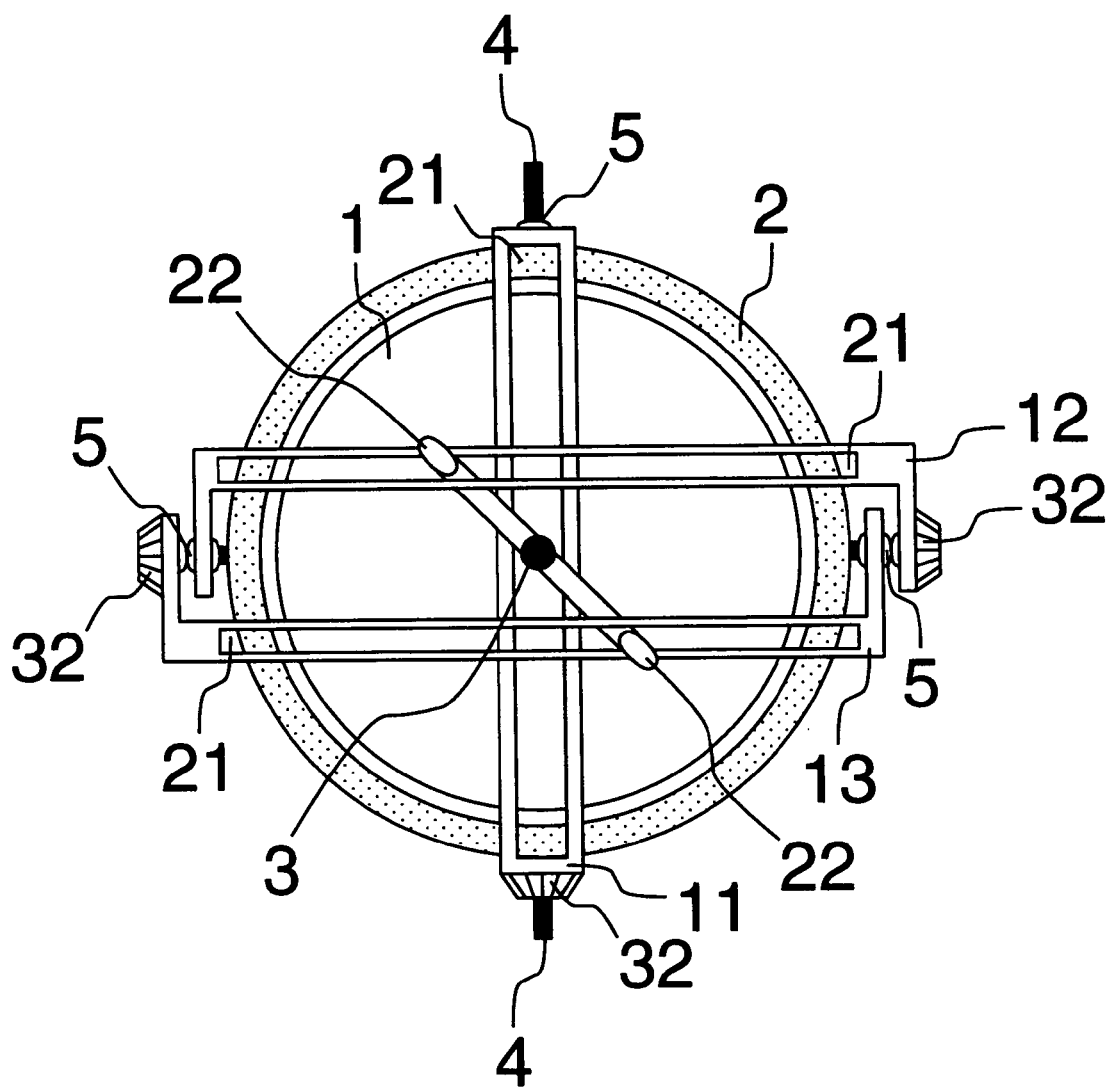
FIG. 38 is an explanation view for gears installed on a first guide rail, a second guide rail and a third guide rail, for FIG. 26.

By the way, as shown in FIG. 37, suppose that an encoder 31 is installed directly on a shaft 4, for each of a first guide rail 11, a second guide rail 12 and a third guide rail 13. In this case, the encoder 31 must be arranged on an extension line of the shaft 4. Moreover, since large load is added to these guide rails in order to rotate the encoder 31, the strength of these guide rails, an indication bar 3 and two sliders 22 must be large. However, a rotation system with three degrees of freedom becomes large and heavy with this. As shown in FIG. 38, therefore, for each of these guide rails, a gear 32 is installed on at least one of a guide rail, a shaft 4 and a bearing 5. Suppose here that the gear 32 is fixed as a rotation axis of the gear 32 coincides with a rotation axis 6 of the shaft 4. Therefore, each encoder 31 can be arranged toward any direction. Moreover, by adjusting a gear ratio, the encoders 31 can rotate with a little torque. Note that, instead of a gear 32, a crank or a cam can be used.

Figure 39:
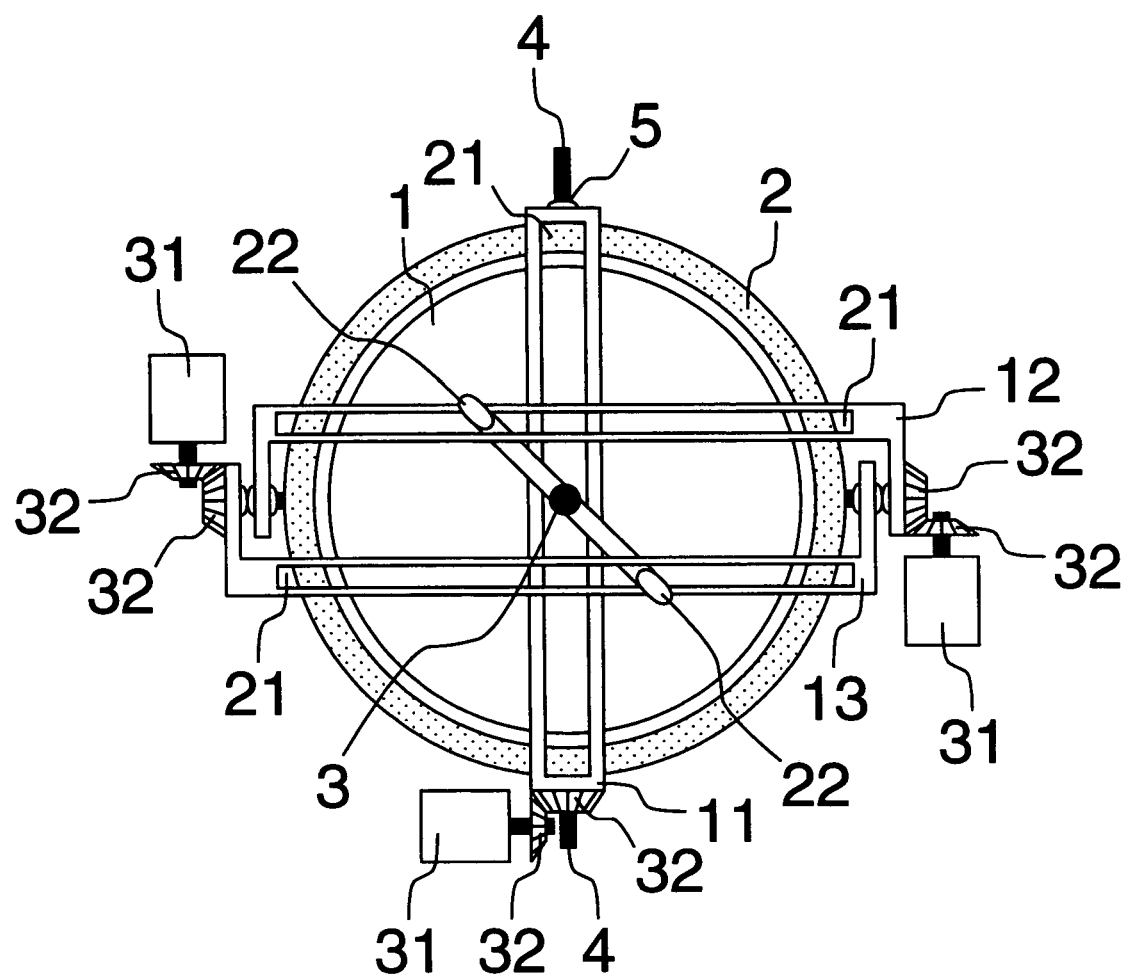
FIG. 39 is an explanation view for a case that encoders are connected via gears installed on a first guide rail, a second guide rail and a third guide rail, for FIG. 26.

As shown in FIG. 39, then, an enforcement form of a rotation system with three degrees of freedom for an invention described in the fifteenth invention can arrange each encoder 31 at any place. Although two Bevel gear 32 concatenate between each guide rail and the corresponding encoder 31 in FIG. 39, of course, a Spur gear, a cylindrical gear and a Worm gear can be used. In addition, instead of a gear 32, a crank or a cam also can be used. As is clear from FIG. 39, any encoders 31 do not move together with a rotor 1 even though the rotor 1 rotates with three degrees of freedom. In short, the encoders 31 can be fixed easily to a base 2 and a case. Therefore, a user of the present invention can design a rotation system with three degree of freedom easily. Moreover, an enforcement form of a rotation system with three degrees of freedom for an invention described in claim 16 carries an actuator for each of at least one encoder 31. Therefore, the present invention not only detect rotation angles of three degrees of freedom of the rotor 1 but also can rotate the rotor 1 with three degrees of freedom. The present invention, thus, is also suitable for an application so as to take a picture of any place, specifying a location taking a picture, like a moving camera which carries a camera 41 in the rotor 1. Of course, like an enforcement form for inventions described in the seventeenth and eighteenth inventions, it is possible to concatenate only an actuator with each of a first guide rail 11, a second guide rail 12 and a third guide rail 13. In particular, in a case of using a stepping motor for an actuator, it is possible to control an angle of the rotor 1 finely without using the encoders 31.

Finally, in a rotation system with three degrees of freedom, the difference of rotation angles of two encoders 31 connecting with a second guide rail 12 and a third guide rail 13, respectively, must be calculated in order to derive a rotation angle of a rotor 1. In addition, in a case that two sliders 22 slide in slits 21 of these guide rails, a rotation angle must be corrected according to a position of an indication bar 3. Therefore, an enforcement form of a rotation system with three degrees of freedom for an invention described in the nineteenth invention carries out these calculations by using a computer system. Moreover, in a case of rotating the rotor 1 by using at least one actuator, too, a rotation angle of each actuator has to be controlled finely. Therefore, an enforcement form of a rotation system with three degrees of freedom for an invention described in the twentieth invention controls these actuators by using a computer system. By using a computer system like this, a user of the present invention can use a rotation system with three degrees of freedom easily.

It has been above about a case that three encoders 31 and three actuators are used. However, in a case that a fourth guide rail 14 and a fifth guide rail 15 rotate independently, respectively, two encoders 31 and two actuators are installed on these guide rails, two shafts 4 supporting these guide rails and two bearings 5 installed on the shafts 4. Suppose here that these guide rails are installed on the shafts 4 as the guide rails are alternative. In this case, installation of the encoders 31 and the actuators becomes easily.

Now, it has been described above about a rotation system with three degrees of freedom. It is explained here about applications of the rotation system with three degrees of freedom.

Figure 40:
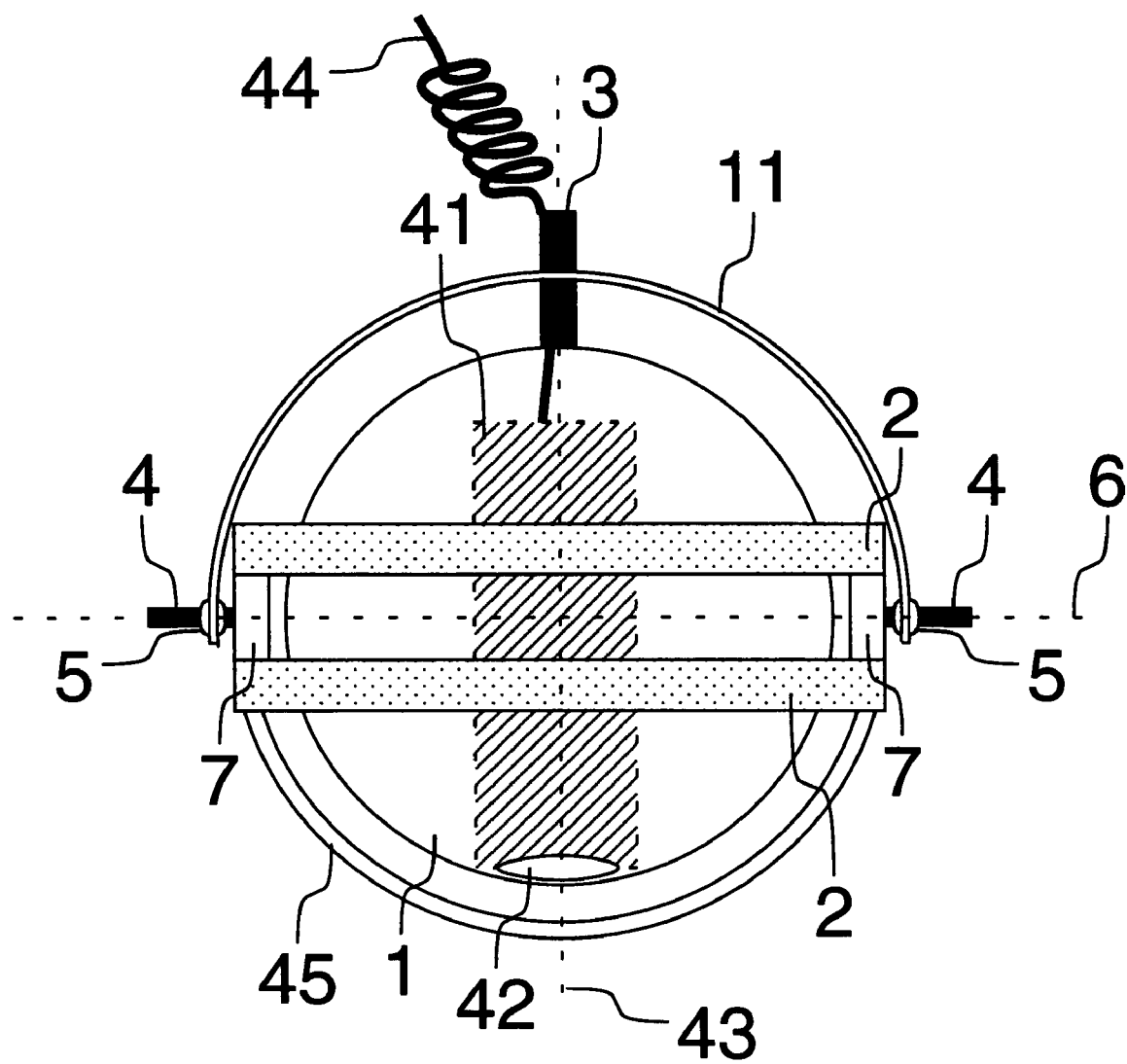
FIG. 40 is an explanation view for an artificial eye in which a camera is embedded in a rotor.

As shown in FIG. 40, an enforcement form of an artificial eye for an invention described in the twenty-first invention is a rotation system with three degrees of freedom whose rotor 1 a camera 41 is embedded in. Note that, in FIG. 40, the camera 41 is appeared by slashes, moreover all guide rails except a first guide rail 11 are omitted. Suppose here that a lens 42 of the camera 41 turns to a direction opposite to an indication bar 3, and the camera 41 is embedded in the rotor 1 as an optical axis 43 of the lens 42 passes through the indication bar 3. In this case, by detecting the direction of the indication bar 3 by a computer system, the computer system can derive a direction of the optical axis 43 easily. In addition, since plurality of electric cables 44 of the camera 41 pass through the indication bar 3, the electric cables 44 do not twine round any guide rails. Therefore, an optical axis 43 of the lens 42 can also move until the indication bar 3 is disturbed by a base 2. Thus, the artificial eye can take a picture over a wide area. Moreover, by shifting a position of the base 2 from a center of the rotor 1 and by installing a hemispherical cover 45 on the base 2 so as to cover the rotor 1, the cover 45 can protect the rotor 1 from dust, water and so on, without disturbing movement of all guide rails. Therefore, a user of the present invention can carry an artificial eye easily even in a narrow space like a cell phone.

Now, it has been described above about a case that a rotation system with three degrees of freedom rotates a rotor 1 up to about 90 degrees, centering around an indication bar 3. However, with this, a camera 41 embedded in the rotor 1 also can rotate only up to about 90 degrees, centering around an optical axis 43 of the camera 41. It is explained here about a method rotating an image taken by the camera 41 with any angle.

First, an image taken by a camera 41 embedded in a rotor 1 is once memorized by a computer system. Note that each pixel of the image is memorized by turns in a memory of the computer system. Here, any kind of image processing like gamma correction is also carried out for these pixels. Next, the computer system outputs these pixels by turns as the image rotates every 90 degrees. Note that the computer system has only to read these pixels in a specific order from either of four corners of the image because these pixels are memorized by turns in the memory. In short, the computer system does not have to perform affine transform. Therefore, the computer system can rotate the image every 90 degrees, only by reading and writing these pixels for the memory. Suppose then that the computer system rotates a camera 41 up to about 90 degrees by using a rotation system with three degrees of freedom. As a result, an image taken by the camera 41 can be rotated within almost 360 degrees. In this method, power consumption does not vary even though the image is rotated at any angle. Therefore, this is suitable for equipments like a cell phone, in which low power consumption is desired.

While the invention has been shown by example, it should be understood, however, that the description herein of specific embodiments is not intended to limit the invention to the particular forms disclosed, but on the contrary, the invention is to cover all modifications equivalents, and alternative falling within the spirit and scope of the invention as defined by the appended claims.

INDUSTRIAL APPLICABILITY

As suggested by the first through thirteenth inventions, three rotation angles of a rotor 1 can be specified in spite of rotating the rotor 1 with three degrees of freedom. Oppositely, by rotating first to sixth guide rails suitably, an indication bar 3 can be moved so as to turn to a specific direction and to coincide with a specific rotation angle centering around the indication bar 3. Therefore, the rotor 1 also can be rotated in a suitable direction. In the present invention, these guide rails are connected with a base 2 via shafts 4 and bearings 5, respectively. That is, a base 2 itself does not have to rotate in order to rotate a rotor 1 in a specific direction, like a traditional moving system with three degrees of freedom. Therefore, a manufacturer of the present invention can make a rotation system with three degrees of freedom, by using a little number of parts, by a simple and small structure and cheaply.

As suggested by the tenth invention, all wires can be taken out to an external part, by passing the wires through an indication bar 3. Moreover, the wires may be electric cables 44. By installing a camera 41 on a rotor 1, then, a designer of a moving camera 41 can design a moving camera and an artificial eye easily, without twining all wires round all guide rails. In addition, in a case that a manufacturer of a joy stick installed a linear encoder on a rotor 1 vertically, a user of the joy stick also can control zoom of a moving camera, only by sliding the linear encoder forward and backward.

As suggested by the fourteenth, fifteenth and nineteenth inventions, three rotation angles of a rotor 1 can be detected by combining output results of three encoder 31. Therefore, in a case that a user of the present invention rotated the rotor 1 like a trackball, the present invention can detect rotation angles of the rotor 1. In addition, in a case that a user of the present invention rotated an indication bar 3 like a joy stick, the present invention can also detect rotation angles of the indication bar 3. Moreover, even in a case of rotating the rotor 1 by using a traditional actuator with multi degrees of freedom, the present invention can detect rotation angles of the rotor 1. Therefore, by carrying the present invention in a small information terminal like a cell phone, a designer of the terminal can realize cheaply a small and light user interface controlling a moving camera. In addition, by embedding a camera 41 in the rotor 1, a user of the present invention can use the present invention for a moving camera and an artificial eye. Here, by forming an indication bar 3 as a pipe, signal lines of the camera 41 can be taken out from the rotor 1 easily. Therefore, the present invention is very effective for a moving camera and an artificial eye.

As suggested by the sixteenth, nineteenth and twentieth inventions, three rotation angles of a rotor 1 can be detected by combining output results of three encoder 31, moreover a rotor 1 can be rotated according to these rotation angles. Therefore, by installing supports on the rotor 1 and a base 2, respectively, a user of the present invention can use the present invention for a joint of a robot. In addition, by embedding a camera 41 on the rotor 1, a user of the present invention can use the present invention for a moving camera and an artificial eye. Here, by forming an indication bar 3 as a pipe, signal lines of the camera 41 can be taken out from the rotor 1 easily. Therefore, the present invention is very effective for the moving camera and the artificial eye. Moreover, in a case that a joy stick was made by using the present invention, suppose that a user of the joy stick controls the moving camera from a remote place, while a direction of the moving camera is reflected to the joy stick. In this case, the user can realize bi-directional interface, by which he can experience a direction of the moving camera.

As suggested by the seventeenth, eighteenth and twentieth inventions, a rotor 1 can be rotated according to rotation angles of three actuators, by rotating them independently, respectively. Therefore, a user of the present invention can use the present invention for a platform. In addition, by installing a source of light on the rotor 1, a user of the present invention can use the present invention for a search light. Moreover, by installing a mirror on the rotor 1, a user of the present invention can use the present invention for an electric back mirror and an electric side mirror. Besides this, by using a stepping motor for an actuator, moreover by embedding a camera 41 in the rotor 1, a user of the present invention can use the present invention for a moving camera and an artificial eye. Here, by forming an indication bar 3 as a pipe, signal lines of the camera 41 can be taken out from the rotor 1 easily. Therefore, the present invention is very effective for the moving camera and the artificial eye.

As suggested by the twenty-first invention, by embedding a camera 41 in a rotor 1, an artificial eye can control a direction of an optical axis 43 of the camera 41 with three degrees of freedom without increasing a volume of the rotor 1, by using a computer system. Therefore, a designer of a cell phone can carry the artificial eye in the cell phone with which a miniaturization is called for.

As suggested by the twenty-second invention, an artificial eye can rotate an image taken by a camera 41 with any angle without using a special image processing like affine transform and so on. That is, even though a size of the image became big, the artificial eye does not have to consume too much power, in order to rotate the image with any angle. Therefore, a designer of a cell phone can carry the artificial eye in the cell phone with which a low power consumption is called for.

The invention claimed is:

1. A rotation system with three degrees of freedom comprising a rotor comprising a part or a whole of a sphere, an indication bar, at least one slider, at least one base, four shafts, six bearings, and three first to third guide rails,
wherein
said rotor includes said indication bar,
said first guide rail is installed on said base by using two said shafts and two said bearings,
said second guide rail and said third guide rail are installed on said base by using two remaining said shafts and four remaining said bearings, and
at least one said slider is installed on or concatenated with said indication bar, moreover wherein
said second guide rail rotates centering around two said shafts supporting said second guide rail, sliding said indication bar along said first guide rail, said first guide rail rotates centering around two said shafts supporting said first guide rail, sliding said indication bar along said second guide rail, and said rotor rotates centering around said indication bar, sliding at least one said slider along said third guide rail.

2. A rotation system with three degrees of freedom according to claim 1, wherein said indication bar passes through slits, which are opened in at least one of said first guide rail and a second guide rail.

3. A rotation system with three degrees of freedom according to claim 1, wherein a fourth guide rail is installed on said indication bar, and said slider slides along said fourth guide rail.

4. A rotation system with three degrees of freedom according to claim 1, wherein said indication bar is a pipe, and at least one wire passes through said indication bar.

5. A rotation system with three degrees of freedom according to claim 1, wherein all said shafts are installed on at least one said base so as to face with each other every two shafts.

6. A rotation system with three degrees of freedom according to claim 1, wherein four said bearings are installed on at least one said base so as to face with each other every two shafts, two said shafts installed on a terminal of said second guide rail and said third guide rail are installed on two said bearings installed on said base, respectively, and two said bearings installed on another terminal of said second guide rail and said third guide rail are installed on said shafts of said third guide rail and said second guide rail, respectively.

7. A rotation system with three degrees of freedom according to claim 1, wherein four said bearings are installed on at least one said base so as to face with each other every two shafts, two said shafts installed on both terminals of said second guide rail are installed on two said bearings installed on said base, respectively, and two said bearings installed on both terminal of said third guide rail are installed on said shafts of said second guide rail, respectively.

8. A rotation system with three degrees of freedom according to claim 1, wherein at least one encoder detects a direction of said rotor, by detecting at least one rotation angle of said guide rails, said shafts and said bearings.

9. A rotation system with three degrees of freedom according to claim 8, wherein at least one encoder detects said direction of said rotor, by concatenating it to at least one of said guide rails, said shafts and said bearings via plurality of gears.

10. A rotation system with three degrees of freedom according to claim 8, wherein each of at least one said encoder comprises an actuator.

11. A rotation system with three degrees of freedom according to claim 10, wherein a computer system rotates said rotor, by connecting at least one said actuator to said computer system.

12. An artificial eye comprising a rotation system with three degrees of freedom according to claim 11, wherein a camera taking a picture in a direction opposite to said indication bar is embedded in said rotor.

13. An artificial eye according to claim 12, wherein an image rotates by that said computer system memorizes said image taken by said camera, and outputs each pixel of said image, exchanging an order of said pixels.

14. A rotation system with three degrees of freedom according to claim 8, wherein a computer system calculates a rotation angle of said rotor, by connecting at least one said encoder to said computer system.

15. A rotation system with three degrees of freedom according to claim 1, wherein at least one actuator rotates said rotor, by rotating at least one of said guide rails, said shafts and said bearings.

16. A rotation system with three degrees of freedom according to claim 15, wherein at least one actuator rotates said rotor, by concatenating it to at least one of said guide rails, said shafts and said bearings via plurality of gears.

17. A rotation system with three degrees of freedom comprising a rotor comprising a part or a whole of a sphere, an indication bar, at least two sliders, at least one base, four shafts, six bearings, and three first to third guide rails, wherein said rotor comprises said indication bar, said first guide rail is installed on said base by using two said shafts and two said bearings, said second guide rail and said third guide rail are installed on said base by using two remaining said shafts and four remaining said bearings, and at least two said sliders are installed on or concatenated with said indication bar, moreover wherein each of said second guide rail and said third guide rail rotates centering around two said shafts supporting said second guide rail, sliding said indication bar along said first guide rail, said first guide rail rotates centering around two said shafts supporting said first guide rail, sliding at least two said sliders along said second guide rail and said third guide rail, and said rotor rotates centering around said indication bar, sliding at least two said sliders along said second guide rail and said third guide rail.

18. A rotation system with three degrees of freedom according to claim 17, wherein said indication bar passes through a slit, which is opened in said first guide rail.

19. A rotation system with three degrees of freedom according to claim 17, wherein a fourth guide rail and a fifth guide rail are installed on said indication bar, and two said sliders slide along these said guide rails, respectively.

20. A rotation system with three degrees of freedom comprising a rotor comprising a part or a whole of a sphere, an indication bar, at least two sliders, at least one base, four shafts, six bearings, and four first to third and sixth guide rails, wherein said rotor comprises said indication bar, said first guide rail and said sixth guide rail are installed on said base by using two said shafts and two said bearings, said second guide rail and said third guide rail are installed on said base by using two remaining said shafts and four remaining said bearings, and at least two said sliders are installed on or concatenated with said indication bar, moreover wherein each of said second guide rail and said third guide rail rotates centering around two said shafts supporting said second guide rail, sliding at least two said sliders along said first rail and said sixth guide rail, each of said first guide rail and said sixth guide rail rotates centering around two said shafts supporting said first guide rail, sliding at least two said sliders along said second guide rail and said third guide rail, and said rotor rotates centering around said indication bar, sliding at least two said sliders along said second guide rail and said third guide rail.

21. A rotation system with three degrees of freedom according to claim 20, wherein at least two said sliders pass through slits, respectively, which are opened in said first guide rail and said sixth guide rail.

22. A rotation system with three degrees of freedom according to claim 20, wherein
a fourth guide rail and a fifth guide rail are installed on said indication bar, and
two said sliders slide along these said guide rails, respectively.

* * * * *